(12) United States Patent
Callahan et al.

(10) Patent No.: US 11,108,770 B2
(45) Date of Patent: Aug. 31, 2021

(54) SYSTEM AND METHOD FOR BIOMETRIC PROTOCOL STANDARDS

(71) Applicant: Veridium IP Limited, London (GB)

(72) Inventors: John Raymond Callahan, Vienna, VA (US); Asem Othman, Shrewsbury, MA (US)

(73) Assignee: VERIDIUM IP LIMITED, London (GB)

( * ) Notice: Subject to any disclaimer, the term of this patent is extended or adjusted under 35 U.S.C. 154(b) by 76 days.

(21) Appl. No.: 16/520,191

(22) Filed: Jul. 23, 2019

(65) Prior Publication Data

US 2020/0036707 A1 Jan. 30, 2020

Related U.S. Application Data

(60) Continuation-in-part of application No. 15/800,748, filed on Nov. 1, 2017, now Pat. No. 10,536,454,
(Continued)

(51) Int. Cl.
*H04L 29/06* (2006.01)
*H04L 9/32* (2006.01)
(Continued)

(52) U.S. Cl.
CPC .......... *H04L 63/0861* (2013.01); *G06F 21/32* (2013.01); *G06F 21/35* (2013.01);
(Continued)

(58) Field of Classification Search
CPC .......... G06F 7/483; G06F 21/32; G06F 21/35; G06F 21/6218; G06K 9/00288;
(Continued)

(56) References Cited

U.S. PATENT DOCUMENTS

| 5,161,204 A | 11/1992 | Hutcheson et al. |
| 6,160,903 A | 12/2000 | Hamid |
| (Continued) |

FOREIGN PATENT DOCUMENTS

| DE | 10 2009 009310 | 10/2009 |
| GB | 2438928 | 12/2007 |
| (Continued) |

OTHER PUBLICATIONS

Kannavara. "Design and Performance Analysis of a Secure Processor Scan-SP with Crypto-Biometric Capabilities." Aug. 17, 2009 (Aug. 17, 2009) Retrieved on Oct. 19, 2020 (Oct. 19, 2020) from <URL: https://corescholar.libraries.wright.edu/etd_all/962/> entire document.
(Continued)

*Primary Examiner* — Abu S Sholeman
(74) *Attorney, Agent, or Firm* — Leason Ellis LLP

(57) ABSTRACT

Secure communications are provided between a user computing device and a server computing device. An enrollment request is received from a user computing device that is configured via a distributed client software application and is processed. The enrollment request is usable to enroll the user computing device in a network and includes an encrypted partial initial biometric vector associated with a user. An authentication request is processed that is subsequently received that includes an encrypted partial second biometric vector and that is associated with a user of the user computing device. A comparison of the encrypted partial initial biometric vector and the encrypted partial second biometric vector is performed, and a value representing the comparison is generated and transmitted to the user computing device. The user computing device is authenticated where the value is above a minimum threshold.

20 Claims, 34 Drawing Sheets

Related U.S. Application Data which is a division of application No. 15/243,411, filed on Aug. 22, 2016, now Pat. No. 9,838,388, application No. 16/520,191, which is a continuation-in-part of application No. 16/378,044, filed on Apr. 8, 2019, now abandoned, which is a continuation of application No. 15/592,542, filed on May 11, 2017, now Pat. No. 10,255,040.

(60) Provisional application No. 62/241,392, filed on Oct. 14, 2015, provisional application No. 62/208,328, filed on Aug. 21, 2015.

(51) Int. Cl.
*G06F 21/32* (2013.01)
*G06F 21/62* (2013.01)
*G06F 21/35* (2013.01)
*H04L 29/08* (2006.01)

(52) U.S. Cl.
CPC ........ *G06F 21/6218* (2013.01); *H04L 9/3231* (2013.01); *H04L 9/3268* (2013.01); *H04L 63/0428* (2013.01); *H04L 63/0823* (2013.01); *H04L 63/102* (2013.01); *H04L 63/0815* (2013.01); *H04L 67/06* (2013.01)

(58) Field of Classification Search
CPC ............... G06K 9/4628; G06K 9/6273; H04L 63/0823; H04L 63/0861; H04L 9/3231; H04L 9/3268; H04L 63/0428
See application file for complete search history.

(56) References Cited

U.S. PATENT DOCUMENTS

| | | | |
|---|---|---|---|
| 6,735,695 B1 | 5/2004 | Gopalakrishnan et al. | |
| 6,763,459 B1 | 7/2004 | Corella | |
| 7,007,298 B1 | 2/2006 | Shinzaki | |
| 7,571,485 B1 | 8/2009 | Mccorkendale et al. | |
| 7,711,152 B1 | 5/2010 | Davida | |
| 7,844,827 B1 | 11/2010 | Itoi | |
| 7,995,995 B2 | 8/2011 | Novack et al. | |
| 8,094,872 B1 | 1/2012 | Yagnik | |
| 8,255,699 B2 | 8/2012 | Tagscherer | |
| 8,280,740 B2 | 10/2012 | Di Mambro et al. | |
| 8,316,237 B1 | 11/2012 | Felsher | |
| 8,369,595 B1 | 2/2013 | Derakhshani et al. | |
| 8,380,177 B2 | 2/2013 | Laracey | |
| 8,417,001 B2 | 4/2013 | Niinuma | |
| 8,443,202 B2 | 5/2013 | White et al. | |
| 8,457,367 B1 | 6/2013 | Sipe et al. | |
| 8,548,206 B2 | 10/2013 | Sahin et al. | |
| 8,632,000 B2 | 1/2014 | Laracey | |
| 9,112,858 B2 | 8/2015 | Sahin et al. | |
| 9,202,028 B2 | 12/2015 | White et al. | |
| 9,202,032 B2 | 12/2015 | White et al. | |
| 9,202,102 B1 | 12/2015 | Sahin et al. | |
| 9,612,910 B2 | 4/2017 | Kulkarni | |
| 9,838,388 B2 | 12/2017 | Mather | |
| 10,296,764 B1 | 5/2019 | Batishchev | |
| 2002/0062451 A1 | 5/2002 | Scheidt et al. | |
| 2002/0174344 A1 | 11/2002 | Ting | |
| 2002/0176583 A1 | 11/2002 | Buttiker | |
| 2004/0034773 A1 | 2/2004 | Balabine et al. | |
| 2004/0129787 A1 | 7/2004 | Saito et al. | |
| 2004/0148509 A1 | 7/2004 | Wu | |
| 2004/0164848 A1 | 8/2004 | Hwang et al. | |
| 2005/0086683 A1 | 4/2005 | Meyerson | |
| 2005/0114666 A1 | 5/2005 | Sudia | |
| 2005/0166041 A1* | 7/2005 | Brown ............... H04L 63/0823 713/150 |
| 2006/0123241 A1 | 6/2006 | Martinian | |
| 2006/0206725 A1 | 9/2006 | Milgramm et al. | |
| 2006/0242701 A1 | 10/2006 | Black et al. | |
| 2006/0251029 A1 | 11/2006 | Fritsch et al. | |
| 2006/0293891 A1 | 12/2006 | Pathuel | |
| 2007/0038867 A1 | 2/2007 | Verbauwhede | |
| 2007/0266427 A1 | 11/2007 | Kevenaar | |
| 2007/0283154 A1 | 12/2007 | Zhang et al. | |
| 2008/0034231 A1 | 2/2008 | Ginter et al. | |
| 2008/0049984 A1 | 2/2008 | Poo et al. | |
| 2008/0235515 A1 | 9/2008 | Yedidia | |
| 2008/0298642 A1 | 12/2008 | Meenen | |
| 2008/0298645 A1 | 12/2008 | Meenen | |
| 2009/0074259 A1 | 3/2009 | Baltatu et al. | |
| 2009/0080708 A1 | 3/2009 | Mellen | |
| 2009/0165085 A1 | 6/2009 | Naka | |
| 2009/0183008 A1 | 7/2009 | Jobmann | |
| 2010/0014720 A1 | 1/2010 | Hoyos et al. | |
| 2010/0017618 A1 | 1/2010 | Golic | |
| 2010/0017619 A1 | 1/2010 | Errico | |
| 2010/0097178 A1 | 4/2010 | Pisz et al. | |
| 2010/0241845 A1 | 9/2010 | Alonso | |
| 2011/0047384 A1 | 2/2011 | Jacobs et al. | |
| 2011/0209200 A2 | 8/2011 | White | |
| 2011/0296440 A1 | 12/2011 | Laurich | |
| 2011/0302420 A1 | 12/2011 | Davida | |
| 2012/0086550 A1 | 4/2012 | LeBlanc | |
| 2012/0102332 A1 | 4/2012 | Mullin | |
| 2012/0109829 A1 | 5/2012 | McNeal | |
| 2012/0110341 A1 | 5/2012 | Beigi | |
| 2012/0192254 A1 | 7/2012 | Garcia Perez | |
| 2012/0197808 A1 | 8/2012 | Niwa | |
| 2012/0198241 A1 | 8/2012 | O'Hare et al. | |
| 2012/0314974 A1 | 12/2012 | Yankg | |
| 2012/0331088 A1* | 12/2012 | O'Hare ............... G06F 21/6227 709/214 |
| 2013/0013931 A1 | 1/2013 | O'Hare | |
| 2013/0042314 A1 | 2/2013 | Kelley | |
| 2013/0081119 A1 | 3/2013 | Sampas | |
| 2013/0215083 A1 | 8/2013 | Kritt | |
| 2013/0227286 A1 | 8/2013 | Brisson | |
| 2013/0239109 A1 | 9/2013 | Ferwerda et al. | |
| 2013/0343616 A1* | 12/2013 | Forero ............... G06K 9/00335 382/115 |
| 2014/0026208 A1 | 1/2014 | Coons | |
| 2014/0032909 A1 | 1/2014 | Steele et al. | |
| 2014/0068722 A1 | 3/2014 | Hayat | |
| 2014/0090039 A1 | 3/2014 | Bhow | |
| 2014/0101453 A1 | 4/2014 | Senthurpandi | |
| 2014/0115324 A1 | 4/2014 | Buer | |
| 2014/0115666 A1 | 4/2014 | Garcia Morchon | |
| 2014/0140682 A1 | 5/2014 | Wang | |
| 2014/0149293 A1 | 5/2014 | Laracey | |
| 2014/0191028 A1 | 7/2014 | Laracey | |
| 2014/0281561 A1 | 9/2014 | Etchegoyen | |
| 2014/0281567 A1 | 9/2014 | Rane | |
| 2014/0289833 A1 | 9/2014 | Briceno | |
| 2014/0298475 A1 | 10/2014 | Granstrom | |
| 2014/0304765 A1 | 10/2014 | Nakamoto et al. | |
| 2014/0355757 A1 | 12/2014 | Shrivastava et al. | |
| 2015/0143483 A1 | 5/2015 | Wong | |
| 2015/0178167 A1 | 6/2015 | Kulkarni | |
| 2015/0188911 A1 | 7/2015 | Hoyos et al. | |
| 2015/0188912 A1* | 7/2015 | Hoyos ............... G06F 21/33 726/10 |
| 2015/0278642 A1 | 10/2015 | Chertok et al. | |
| 2015/0356704 A1 | 12/2015 | Lipman | |
| 2016/0094348 A1* | 3/2016 | Takahashi ............... H04L 9/3247 713/175 |
| 2016/0149905 A1 | 5/2016 | Wang | |
| 2016/0248526 A1 | 8/2016 | Wang | |
| 2016/0373440 A1 | 12/2016 | Mather | |
| 2017/0076138 A1 | 3/2017 | Bartels | |
| 2017/0076145 A1 | 3/2017 | Gottemukkula | |
| 2017/0104752 A1 | 4/2017 | Sakemi | |
| 2017/0124263 A1 | 5/2017 | Crafts, Jr. | |
| 2017/0140207 A1 | 5/2017 | Zhu et al. | |
| 2017/0351909 A1 | 12/2017 | Kaehler | |
| 2018/0165545 A1 | 6/2018 | Matsunami | |

(56) References Cited

U.S. PATENT DOCUMENTS

| | | | |
|---|---|---|---|
| 2018/0176216 A1 | 6/2018 | Mather | |
| 2018/0330179 A1 | 11/2018 | Streit | |

FOREIGN PATENT DOCUMENTS

| | | |
|---|---|---|
| JP | 2005-122478 | 5/2005 |
| JP | 2009-533735 | 9/2009 |
| JP | 2009-289253 | 12/2009 |
| JP | 2012-181802 | 9/2012 |
| WO | WO 2004/014017 | 2/2004 |
| WO | WO 2005/069823 | 8/2005 |
| WO | WO 2006/054208 | 5/2006 |
| WO | WO 2007/019351 | 2/2007 |
| WO | WO 2012/123727 | 9/2012 |
| WO | WO 2017/035085 | 3/2017 |

OTHER PUBLICATIONS

Barkathunisha, S et al: "Secure transmission of medical information using IRIS recognition and steganography" 2013 International Conference on Computation of Power. Energy. Information and Communication (ICCPEIC). IEEE. Apr. 17, 2013 (Apr. 17, 2013). pp. 89-92. XP032580793. DOI: 10.1109/ICCPEIC.2013.6778504 [retrieved on Mar. 25, 2014] p. 89-p. 91.

Barni, Mauro et al: "Privacy Protection in Biometric-Based Recognition Systems: A marriage between cryptography and signal processing". IEEE Signal Processing Magazine. IEEE Service Center. Piscataway. NJ. US. [Online] vol. 32. No. 5. Aug. 12, 2015 (Aug. 12, 2015). pp. 66-76. XP011666149. ISSN: 1053-5888. DOI:. 10.1109/MSP.2015.2438131 Retrieved from the Internet: https://ieeexplore.ieee.orgjdocument/7192837> [retrieved on Feb. 22, 2019] p. 66-p. 70.

Bonneau, J., C. Herley, P. C. van Oorschot, and F. Stajano, "The quest to replace passwords: A framework for comparative evaluation of Web authentication schemes," *Proceedings 2012 IEEE Symposium on Security and Privacy, S&P 2012*, San Francisco, CA, pp. 553-567, May 2012.

Slideshare.net, "The 10 Hot Consumer Trends of 2014 Report," Dec. 11, 2013.

Institute for Electrical and Electronics Engineers (IEEE), IEEE 1619 Standard for Cryptographic Protection of Data on Block-Oriented Storage, May 2007.

Open Web Application Security Project (OWASP), The Cryptographic Storage Cheat Sheet, 2016. Last revision Mar. 5, 2017.

IEEE-SA Standards Board, "P2410™/D11 Draft Biometric Open Protocol Standard" IEEE Sep. 2015 (Feb. 2015).

Ross, Arun, Othman, Asem, IEEE Transactions on Information Forensics and Security, vol. 6, Issue 1, Mar. 2011, Visual Cryptography for Privacy.

Bringer, Julien, Chabanne, Herve, Kindarji, Bruno, "Identification with Encrypted Biometric Data", https://arxiv.org/abs/0901.1062, Sep. 7, 2009.

Nielsen, Michael A. "Neural Networks and Deep Learning." Neural Networks and Deep Learning. Determination Press, Jan. 1, 1970. Web. <http://neuralnetworksanddeeplearning.com/chap4.html>.

Trewin, Shari, "Biometric Authentication on a Mobile Device: A Study of User Effort, Error and Task Disruption," ACSAC. Dec. 3-7, 2012.

Akotkar, Atul Sureshpant et al, "Secure of Face Authentication Using Visual Cyptography." International Journal of Innovative Science and Modern Engineering, vol. 2, Issue 5, Apr. 2014.

Joon S. Park and Ravi Sandu, Role-Based Access Control on the web vol. 4, No. 1, Feb. 2001. pp. 37-71.

Open Web Application Security Project (OWASP), "OWASP Top 10 vulnerabilities", Apr. 20, 2015.

Gilad-Bachrach, Ran et al., "CryptoNets: Applying Neural Networks to Encrypted Data with High Throughput and Accuracy", Proceedings of the 33rd International Conference on Machine Learning, vol. 48, Feb. 24, 2016.

Cheon, Jung Hee et al., "Ghostshell: Secure Biometric Authentication using Integrity-based Homomorphic Evaluations", May 19, 2016.

Patsakis, Constantinos et al., "Privacy-Preserving Biometric Authentication and Matching via Lattice-Based Encryption", Jan. 2016.

Aeri et al. "Vein Patterns as Bio-Metric Identifier using Euclidean Distance" In: International Journal of Computer Applications (0975-8887) vol. 89, No. 20, Mar. 2014 [online] 20-22, 24 [retrieved on Jul. 5, 2018 (Jul. 5, 2018)] Retrieved from the Internet <URL: https://pdfs.semanticscholar.org/2914/a4e0ca6ae9709ca512f2e3e2802f057d23dd.pdf>, entire document, especially Abstract; pp. 1-3.

Chan, S. W., and R. Mordani, *Java™ Servlet Specification, Version 3.1*. Redwood Shores, CA: Oracle America, Inc., Apr. 2013.

Handley, M., JAX-RS: Java™ API for RESTful Web Services, Version 1.0. Santa Clara: CA: Sun Microsystems, Inc., Sep. 2008.

Nahamoo, D., "IBM Research," *IBM 5 in 5: Biometric data will be the key to personal security*, Dec. 19, 2011.

PayPal Stories, "PayPal and the National Cyber Security Alliance Unveil Results of New Mobile Security Survey," 2015. Oct. 9, 2013.

U.S. Department of Defense, DoD 5200.28-STD, "Department of Defense Trusted Computer System Evaluation Criteria," Dec. 26, 1985.

National Institute of Standards and Technology (NIST), NIST Special Publication 800-122, Apr. 2010.

The International Organization for Standardization (ISO) and the International Electrotechnical Commission (IEC), ISO/IEC 27001, "Information technology—Security techniques—Information security management systems—Requirements", Second edition, Nov. 2013.

The Directive 95/46/EC of the European Parliament and of the Council, EU Directive 95/46/EC, Oct. 24, 1995.

European Banking Authority (EBA) Discussion Paper on future Draft Regulatory Technical Standards on strong customer authentication and secure communication under the revised Payment Services Directive (PSD2), (EBA/PSD2), Dec. 8, 2015.

The U.S. Department of Commerce, EU-U.S. Privacy Shield Framework Principles Issued by the U.S. Department of Commerce, Feb. 2013.

104th Congress, Public Law 104-191, The Health Insurance Portability and Accountability Act of 1996 (HIPAA), Aug. 21, 1996.

National Institute of Standards and Technology (NIST), NIST Special Publication 800-53 Revision 4 Security and Privacy Controls for Federal Information Systems and Organizations, Apr. 2013.

IEEE-SA Standards Board, "P2410-D1 Draft Standard for Biometric Open Protocol," IEEE Aug. 2016 (Dec. 2016).

Wikipedia, "Convolutional Neural Network" <https://en.wikipedia.org/wiki/Convolutional_neural_network> Last edited May 3, 2017.

Weiss, Martin A. et al., "U.S.-EU Data Privacy: From Safe Harbor to Privacy Shield", Congressional Research Service, May 19, 2016.

Noriaki Yoshiura, Application of One-way Function to Authentication by Biometric Information, IEEJ Transactions on Biometrics, IEEJ, Aug. 1, 2004, vol. 124 No. 8, pp. 1538-1545.

\* cited by examiner

# SYSTEM AND METHOD FOR BIOMETRIC PROTOCOL STANDARDS

CROSS-REFERENCE TO RELATED APPLICATIONS

This patent application is a continuation-in-part of, and is based on and claims priority to U.S. patent application Ser. No. 15/800,748, filed Nov. 1, 2017, entitled "SYSTEM AND METHOD FOR BIOMETRIC PROTOCOL STANDARDS" which is based on and claims priority to U.S. patent application Ser. No. 15/243,411, filed Aug. 22, 2016, now U.S. Pat. No. 9,838,388, which claims priority to U.S. Patent Application Ser. No. 62/208,328, entitled "SYSTEM AND METHOD FOR BIOMETRIC PROTOCOL STANDARDS" filed Aug. 21, 2015, and which claims priority to U.S. Patent Application Ser. No. 62/241,392, filed Oct. 14, 2015, and this application is a continuation-in-part of U.S. patent application Ser. No. 16/378,044, filed Apr. 8, 2019, which claims priority to U.S. patent application Ser. No. 15/592,542 filed May 11, 2017, now U.S. Pat. No. 10,255,040, each of which is hereby incorporated by reference as if set forth in its respective entirety herein.

FIELD OF THE INVENTION

The present invention relates, generally, to security, and, more particularly, to systems and methods for identifying or authenticating a user.

BACKGROUND OF THE INVENTION

Information of all kinds continues to be stored and accessed remotely, such as on storage devices that are accessible over data communication networks. For example, many people and companies store and access financial information, health and medical information, goods and services information, purchase information, entertainment information, multi-media information over the Internet or other communication network. In addition to accessing information, users can engage in monetary transfers (e.g., purchases, transfers, sales or the like) using a proscribed identity. In a typical scenario, a user registers for access to information, and thereafter submits a user name and password to "log in" and access the information. Securing access to (and from) such information and data that is stored on a data/communication network remains a paramount concern.

Furthermore, most user authentication methods and identity proving systems rely on a centralized database. Such information storage presents a single point of compromise from a security perspective. If this system is compromised it poses a direct threat to user's digital identities.

Thus, what is needed in the art are system, methods and computer implemented approaches that overcome the security vulnerabilities inherent in such user identity systems.

SUMMARY

The systems, methods and computer products described herein are directed to user authentication, in which there is no such single point of compromise of user identities. For example, a computer implemented method for registering an identity with an authentication system is provided. The method includes receiving, from a mobile computing device over a data communication network, at least one encrypted cryptographic share of an initial biometric vector (IBV) and a public key of a first public key/private key pair generated mathematically using seeds, the at least one encrypted cryptographic share having been encrypted using a private key of the first public key/private key pair. The described method also includes a step of generating a first identity data set that includes at least an authorization system signature, where the signature is a digital signature, the public key of the first public key/private key pair and at least one encrypted cryptographic share and storing the first identity data set in at least one remote storage location. In one or more further implementations, the method described includes a step of generating an identity reference value associated with the first identity data set, where the identity reference value resolves the storage location of the first identity data set and is cryptographically associated with the generated first identity data set. By way for further example, the method described also includes distributing, among each of a plurality of ledgers stored on respective nodes, a transaction record that includes at least the identity reference value and providing, to the mobile computing device, at least the identity reference value.

In one or more further implementations of the present application, a system for providing a user with access to a resource provider includes a processor having a memory and configured by one or more modules to receive, from a mobile computing device over a data communication network, at least an identity reference value associated with a first identity data set, where the identity reference value resolves the storage location of the first identity data set and is cryptographically associated with the first identity data set, the first identity data set including at least an authorization system specific data value, a public key of an enrollment public key/private key pair generated mathematically using a seed and at least one remote encrypted cryptographic share of an initial biometric vector of a user requesting access. The processor of the system is further configured to receive an authorization system signature value, wherein the signature is a digital signature and the public key of the enrollment public/private key pair. Using the received data, the system is configured to locate, among a plurality of ledgers stored on respective nodes, a transaction record that includes at least the identity reference value and determine, from the located transaction record, a storage location of a corresponding first identity data set. In a particular implementation, the system also includes a processor configured to access the cryptographically associated first identity data set and verify the authorization system signature value and enrollment public key of the first identity data set. In a further implementation, a processor of the system is configured to receive, from the mobile computing device, a current biometric vector and a local encrypted biometric cryptographic share and decrypt the received local encrypted cryptographic share and remote encrypted cryptographic share using the public key of the enrollment public key/private key pair. Here, the processor of the described system is able to combine the decrypted local cryptographic share and the decrypted stored cryptographic share to form a combined cryptographic vector and compare the combined cryptographic vector with the current biometric vector. Where the combined cryptographic vector matches the current biometric vector, the processor of the system described is able to cause the resource provider to provide the user with access to the resource.

In one or more implementations of the present application, secure communications are provided between a user computing device and a server computing device. An enrollment request is received from a user computing device that is configured with a distributed client software application is processed. The enrollment request is usable to enroll the user computing device in a network and includes an encrypted partial initial biometric vector associated with a user. An authentication request is processed that is subsequently received that includes an encrypted partial second biometric vector and that is associated with a user of the user computing device. A comparison of the encrypted partial initial biometric vector and the encrypted partial second biometric vector is performed, and a value representing the comparison is generated and transmitted to the user computing device. The user computing device is authenticated where the value is above a minimum threshold.

In one or more implementations, secure communications are provided between a user computing device and a server computing device. An enrollment request that is received from a user computing device configured with a distributed client software application is processed. The enrollment request is usable to enroll the user computing device in a network and includes a first portion of a first biometric vector associated with a user. The first portion of the first biometric vector is stored, and an authentication request is processed that is subsequently received that includes a second biometric vector and a second portion of the first biometric vector. The first and second portions are combined and compared with the second biometric vector. A value representing the comparison is generated and transmitted to the user computing device. The user computing device is authenticated where the value is above a minimum threshold.

In one or more implementations, a certificate is provided that is included in the enrollment request and the authentication request, wherein the processing the authentication request includes determining that certificate is current and not revoked.

In one or more implementations, an intrusion detection system is provided that provides active monitoring and prevents spoofing of the certificate, including replaying the certificate.

In one or more implementations, processing the authentication request includes performing at least one matching operation in encrypted space as a function of one-way encryption. The one-way encryption can be performed using a random one-way pad.

In one or more implementations, role gathering is provided and defined by one or more rules for access to a digital asset, and the server computing device provides or denies access to the digital asset by the user computing device as a function of the role gathering. Access can be provided as a function of at least one of discretionary access control and mandatory access control.

In one or more implementations, the server computing device processes a second enrollment request that is received from the user computing device configured with a distributed client software application. The second enrollment request is usable to enroll a second user of the user computing device in the network and the second enrollment request including a second encrypted partial initial biometric vector ("IBV") associated with a user of the user computing device. Processing the second enrollment request includes storing the second encrypted partial IBV on non-transitory processor readable media that is accessible by or is part of the server computing device.

In one or more implementations, the server computing device can revoke enrollment of a user.

Other features and advantages of the present invention will become apparent from the following description of the invention that refers to the accompanying drawings.

BRIEF DESCRIPTION OF DRAWINGS/FIGURES

Further aspects of the present disclosure will be more readily appreciated upon review of the detailed description of its various embodiments, described below, when taken in conjunction with the accompanying drawings, of which:

DETAILED DESCRIPTION

By way of overview and introduction, the systems, methods, processes and computer products described herein are directed to and utilize a decentralized biometric credential storage for digital representations of identities using distributed ledgers (e.g. blockchains). Currently in the technical field of user identification, users are forced to relinquish personal information such as credit histories, credentials such as birth certificate, or biometric data such fingerprint template to a third party, with a centralized database. is a new decentralized ecosystem for private and secure identity management that is being implemented by several projects as the replacement of the traditional identity proving systems. To overcome this problem inherent in the use of identifications in various networks (e.g. the Internet), various approaches are described herein to enable end-users, not traditional centralizing organizations, to establish control over user identity data when establishing or engaging in exchanges over networks.

In accordance with one or more implementations of the present patent application, a new set of standards referred to herein, generally, as the Biometric Open Protocol Standards ("BOPS"), is provided that, when combined with a user-controlled authentication system, allows for a framework for authenticating users where the user's identification information is secured by the user and not with a centralizing authority. One or more BOPS implementations can provide one or more modules for identity assertion, role gathering, multi-level access control, assurance, and auditing.

Figure 1:
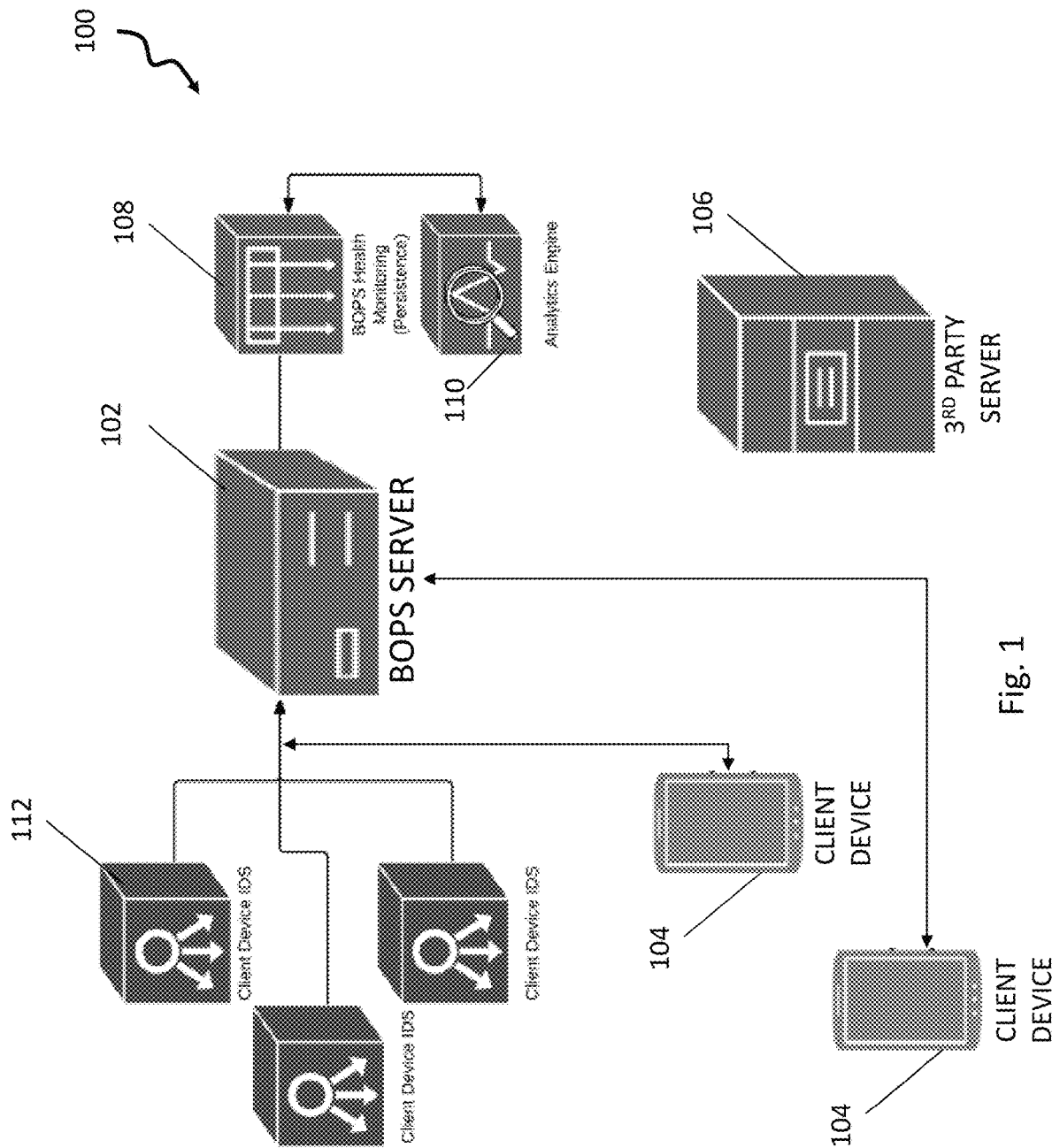
FIG. 1 is a block diagram illustrating a plurality of devices and components with one or more implementations of the present application.

FIG. 1 illustrates an example hardware arrangement 100 and displays data communication in connection with one or more BOPS implementations. Arrangement 100 can include one or more software applications that configure multiple computing devices, such as a client device (e.g., smartphone or mobile device) 104, a server computing device (referred to herein, generally, as a "BOPS Server") 102, third party server 106, and an intrusion detection system ("IDS") which can include a plurality of computing devices 112, to support and enable functionality shown and described herein. Further, BOPS server 102 can be in communication with or connect to Health Monitoring device 108 and Analytics engine device 110. Both devices 108 and 110 can be configured as part of BOPS server 102 or can be individual devices.

The following is a non-limiting list of abbreviations and acronyms referred to herein: admin=administrator, AOP= aspect oriented programming; API=application programming interface; AWS=Amazon Web Services; app a=client application; BOPS=biometric open protocol standard; CPU=central processing unit; CBV=Current Biometric Identifier; CSRF=cross-site request forgery; HSM=hardware security module, ID=identifier; IDS=intrusion detection system; IBV=initial biometric vector; IP=internet protocol; JSON=JavaScript object notation; LDAP=Lightweight Directory Access Protocol; MAC=mandatory access control; MCA=Mobile Client Application; NSA=National Security Agency (U.S.); QR code=Quick Response code; RDBMS=relational database management system; REST=representational state transfer; SSL=secure socket layer; TCSEC=trusted computer system evaluation criteria; TEE=trusted execution environment; TPM=trusted platform module, TLS=transport layer security; URL=uniform resource identifier; XNTP=extended network time protocol; XOR="Exclusive OR" binary operation; 1:M=One-to-Many; 4F=Four fingers, a proprietary biometric technology; 5-tuple=Five tuple data parameters.

An advantage of the present application is that one or more respective BOPS implementations can include components to provide functionality and that can work with or substitute for an enterprise's existing components, thereby providing integration with current operating environments in a relatively very short period of time. Further, one or more respective BOPS implementations provide continuous forms protection, such as to adjudicate access to sensitive and private resources. Service-level security can be provided in BOPS implementations that meet or exceed accepted goals, at least partly as a function of one or more application programming interfaces (APIs) that support implementations as a form of a "point-and-cut" mechanism to add appropriate security to production systems as well as to systems in development.

One or more BOPS implementations can include a BOPS server 102 that can receive via one or more data communication networks from a client device 104 a biometric vector, referred to herein, generally, as the initial biometric vector ("IBV"), and dividing the vector in accordance with an algorithm into a plurality of parts associated with identification. Irrespective of the number of pieces, the IBV can be encrypted, including in a keyless fashion, and a subsequent biometric matching process can optionally occur on the client device 104 or on the server 102, for example, as denoted by an administration parameter.

One or more BOPS implementations may be implemented in various on-line environments, such as on a public cloud (e.g., AMAZON WEB SERVICES) or in a private cloud.

In accordance with the device organizational structure and functionality shown and described herein, user authentication can be provided in lieu of authorization and in a manner such that the server does not retain client information, but rather maintains a sufficient amount of information to enable recognition of one client from another. The components of security considerations in accordance with one or more BOPS implementations can include identity assertion, role gathering, access control, auditing, and assurance. Thus, one or more BOPS implementations largely considers the server-side component in an end-to-end biometric solution.

In connection with identity assertion, one or more BOPS implementations can provide continuous protection of resources, and assure placement and viability of adjudication and other key features. One or more BOPS implementations can further assist in identity assertion to help confirm that named users are who they claim to be, without a direct reliance on human biometrics. The standards shown and described herein include for an interoperable standard that can incorporate virtually any identity asserter or a number of different asserters that are associated with the same named user. The application of an IDS (e.g., via client devices 112) can provide for active monitoring to help prevent spoofing a set of credentials and/or to blacklist a subject or device that determined to have made or is attempting to make one or more malicious attempts.

In addition, role gathering is supported as a function of data confidentiality and privileged access that is based, for example, on rules defined and/or enforced by a known system. For example, in order to determine whether a specific mode of access is allowed, a specific privilege associated with a respective role can be compared to a classification of a group. An object's structure can be defined by access control, and role gathering can occur at the system level or through the client/server call. For example, a BOPS server 102 can store role gathering information to associate a unique user with a unique device 104. Access control can include implementing one or more modules that are executed on a computing device that determine that a given subject (e.g., a person, device, or service (e.g., software program)) is authorized to access and/or take action, such as to read, write, execute, or delete a given object.

Generally, access control can be discretionary, and can also or alternatively include mandatory access control, which can be more granular. Discretionary access control, for example, regards controlling access to one or more objects as a function of named users and named objects (e.g., files and programs). An adjudication mechanism can be, for example, role-based and allow for users and administrators to specify and control sharing of objects by named individuals and/or by defined groups of individuals. Discretionary access control mechanism provides, in one or more implementations, that objects are protected from unauthorized access at the group or individual level across a single or group of objects. Thus, granularity associated with discretionary access can range from individual to group.

One or more BOPS implementations can enforce a mandatory access control policy over all subjects and storage objects (e.g., processes, files, segments, devices) under control within a respective implementation. These subjects and objects can be assigned sensitivity labels, which can be a combination of hierarchical classification levels and non-hierarchical categories. The labels are usable in the adjudication as the basis for mandatory access control decisions. For example, software executing on a client device 104 causes the device to maintain labels or have a BOPS server 102 maintain the data in order to force adherence to labeling of the subject and objects. The BOPS server 102 can maintain a trusted store as a component of a BOPS implementation. As used herein, a trusted store refers, generally, to storing data in a secure way such that access control (DAC or MAC) assures that the subject receives the correct object, and further assures non-repudiation and confidentiality.

The following identifies access control rules and options that are supported in one or more example BOPS implementations. A subject can be provided with access to read an object only in case the hierarchical classification in the subject's security level is greater than or equal to the hierarchical classification in the object's security level. One or more nonhierarchical categories in the subject's security level can include all nonhierarchical categories in the object's security level. A subject can write to and/or execute an object only if the hierarchical classification in the subject's security level is less than or equal to the hierarchical classification in the object's security level and all the non-hierarchical categories in the subject's security level are included in the nonhierarchical categories in the object's security level. Identification and authentication data is usable by the BOPS server device 102 to authenticate a user's identity and assure that the security level and authorization of subjects external to the BOPS implementation that may be created to act on behalf of the individual user are dominated by the clearance and authorization of that user.

The present application operates to increase accountability, including as a function of one or more modules that provide for auditing and verifying that a security model is operational, which is referred to herein, generally, as assurance. In the unlikely event that a computing device within a BOPS implementation is compromised, such module(s) preclude the compromised system from operating undetected. For example, in BOPS implementations auditing requests can be supported at the subject/object level or at the group level, including as a function of aspect-oriented programming, as known in the art. This increases a likelihood that calls are safely written to an audit trail. Moreover, an interface of RESTful web services and JavaScript object notation (JSON) can provide a mechanism to read an audit trail. Auditing can occur at the subject per action, the object per action, or the group per action. For example, a group of users can be designated by a specific name (e.g., "accounting") and can audit all writes to a general ledger. In addition, individuals, e.g., a chief financial officer, can be provided with audit information for reads of the income statement.

One or more in a suite of JUnit tests can be used in one or more BOPS implementations for testing and monitoring boundary conditions, which can include testing boundary components and conditions within a system. In one or more BOPS implementations, security provisions can be met at least in part as a function of API(s). Use of APIs precludes a need for identifying and/or customizing BOPS implementations to conform to an underlying system, such as a relational database management system, a search engine, or virtually any other architecture. Functionality provided by a respective BOPS implementation can offer a "point-and-cut" mechanism to add the appropriate security to systems in production as well as to systems in development. Further, the architecture of one or more BOPS implementations is language-neutral that supports, for example, REST, JSON, and SSL to provide the communication interface. In one or more implementations, the architecture is built on the servlet specification, open SSL, Java, JSON, REST, and a persistent store. Tools can adhere to open standards, allowing maximum interoperability for devices, such as shown in FIG. 1.

In or more BOPS implementations identity assertion, role gathering, multilevel access control, auditing, and assurance are provided. These can be implemented as a function of a combination of at least one specially configured client device 104 (e.g., smartphone or mobile device), a BOPS server 102, and an intrusion detection system (IDS) comprising device(s) 112. In one or more implementations, a client device 104 executes an application and loads a one-time, two-way secure sockets layer ("SSL")/transport layer security ("TLS") key for establishing a secure and initial communication session with the BOPS server 102. The one-time key is replaced, at least functionally, by a subject's two-way SSL/TLS key that is generated and/or provided during an identity phase (referred to herein, generally, "Genesis"). Genesis comprises, generally, an initial or early step in a process that fuses a set of biometrics with a given subject. Another phase, referred to herein generally as Enrollment includes steps associated with registering a user and/or device in a BOPS implementation, and can include issuing a certificate for a client device 104, protecting client certificate and protecting sensitive data stored on the client.

In one or more BOPS implementations, an infrastructure is provided that handles data encryption, and secure client/server communications. The BOPS infrastructure can support decoupling processes of Genesis and Enrollment and coordinating these processes together with various Enrollment elements. These dependencies can identify a BOPS server 102 infrastructure and include: BOPS DNS; BOPS TrustStore; BOPS KeyStore; and BOPS Key Negotiation Protocol. With regard to certificate management, a DNS entry for the BOPS server's 102 hostname can be configured to have a key in the key store for one-way SSL. The TrustStore in one or more BOPS configurations is a two-way SSL mechanism that defines the certificate authority for signing all corresponding certificates. At the transport level, a BOPS identity can occur through the two-way certificate and a trust store by performing a handshake. The keystore supports transport level security via a key in the keystore, and the key in the keystore can use a well-defined and recognized certificate authority, such as VERISIGN, GODADDY or other authority, that is usable to identify a host for encryption on SSL/TLS. As noted herein, one or more BOPS implementations use a one-time password (OTP) process for a client device 104 to request a password that unlocks the two-way SSL certificate. This can be done by the client device 104 and server 102 synchronizing an OTP to pass the key back to unlock the certificate after a two-way SSL session starts.

In one or more implementations, several key Enrollment elements support client certificate authentication when client devices 104 send requests to the BOPS server 102. A token, for example, can be configured as an identifier that links a profile on the server to an identity, such as a function of a data element, e.g., "Common Name." The OTP process includes one or more mechanisms to request the password from the server that unlocks the two-way SSL (x.509) certificate. The password can be changed for each use by a predefined algorithm that is coordinated between the server computing device 102 and the client computing device 104, and the channel used for the OTP is preferably different from the channel used for the individual certificate. For example, a push notification may send a password used to unlock the individual certificate. A different certificate may be used to get the password to unlock the individual certificate. In any event, the mechanism to unlock the certificate may not involve the storage of that password on the client device 104.

In an example, an application uses a default (e.g., preloaded) certificate for Genesis and Enrollment. Subsequent processing can use the default certificate with the current OTP. The result (e.g., a HITP response) can include the password to unlock the certificate. The OTP would then roll forward on the client and the server. In one or more BOPS implementations, a 5-tuple is a high entropy value that is used to prevent replay attacks. The values can occur at Enrollment and become a part of future communications between the client device 104 and the server 102.

Figure 2:
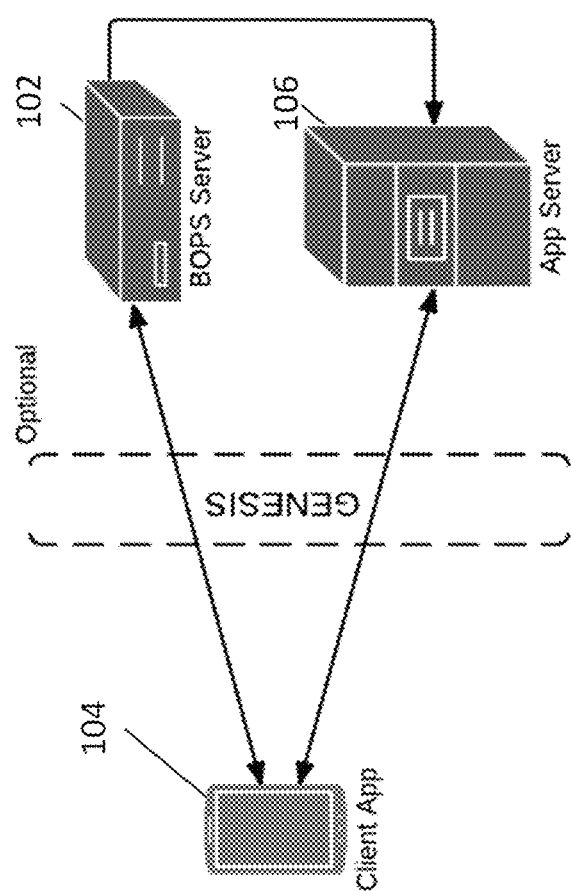
FIGS. 2-6 illustrate devices and information flow therebetween in connection with an example a BOPS implementation.
Figure 3:
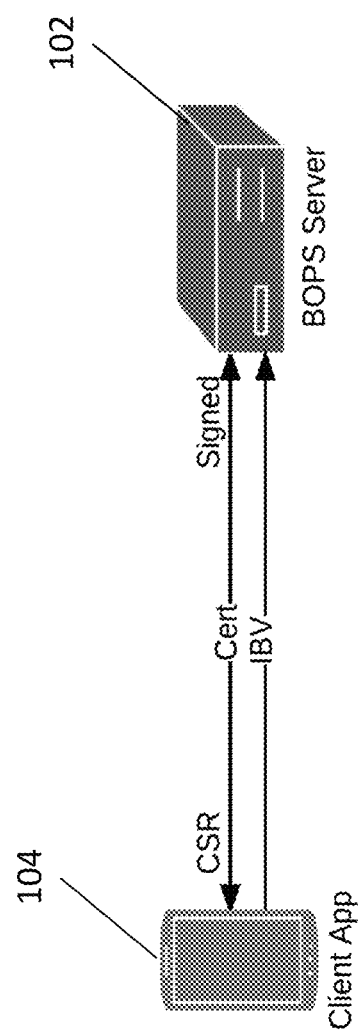
Figure 4:
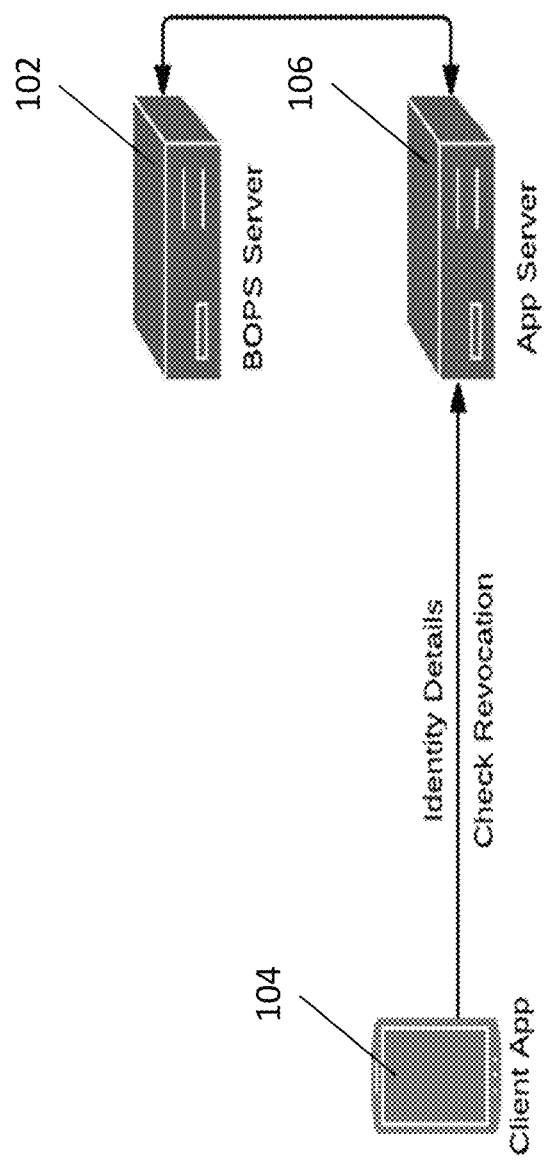
Figure 5:
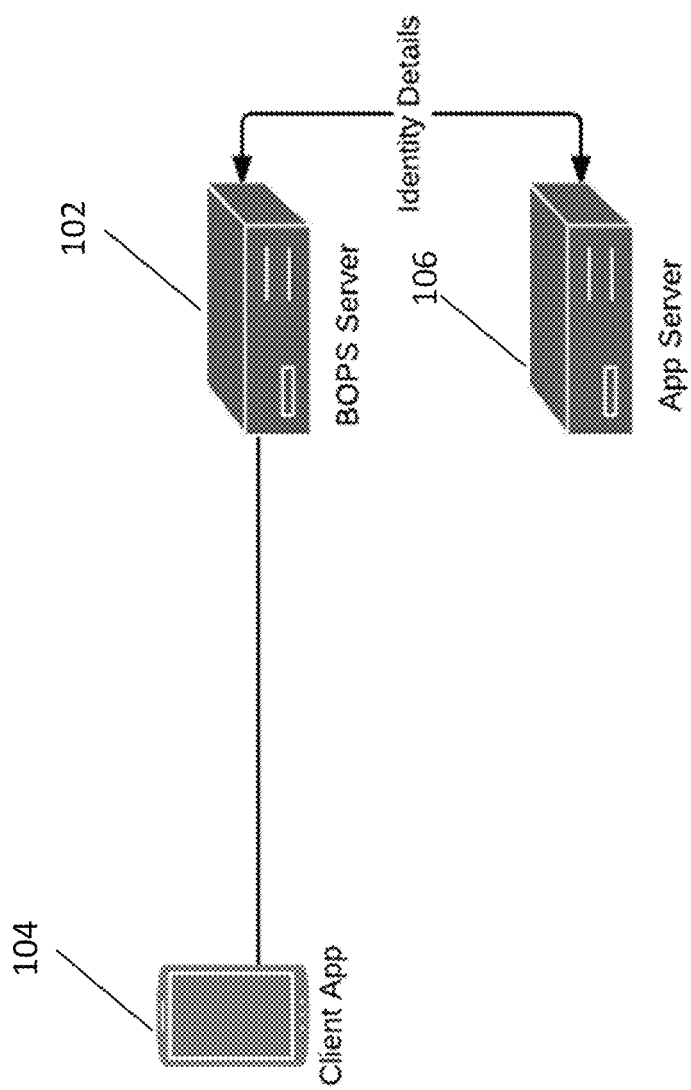

The client/server application's interaction in a BOPS implementation can be considered a three-step process, and at least two possible variations can follow the initial first step. In such case, a BOPS client/server application architecture is described herein with reference to three components: client application executing on a client device 104, an application executing on the BOPS server 102, and a server-side application (referred to as an "App Server" in the drawings). In the examples illustrated in FIGS. 2-6, the server-side application does not necessarily run through the BOPS server 102, as the SSL/TLS connection can terminate at the application server. Further, a respective BOPS implementation deployment does not require the application to trust the BOPS system with the unencrypted content. With reference to FIG. 2, during the Genesis process the client device 104 makes a call to the BOPS server 102 and authenticates the user and client-side application software. Thereafter, the client device 104 receives a certificate that is allocated by the BOPS server 102 and that is specific to the client identity of a specific application.

During the next step (FIG. 3), the client device/application calls the application server directly. The SSL/TLS connection between the client and server parts of the application starts and terminates at these points. Content exchange is preferably not visible outside of the application to the BOPS server 102 or others not trusted within this application entity. During the client session (FIG. 4), the application server 106 calls the BOPS 102 server to get identification details and confirms the certificate has not been revoked previously.

Figure 6:
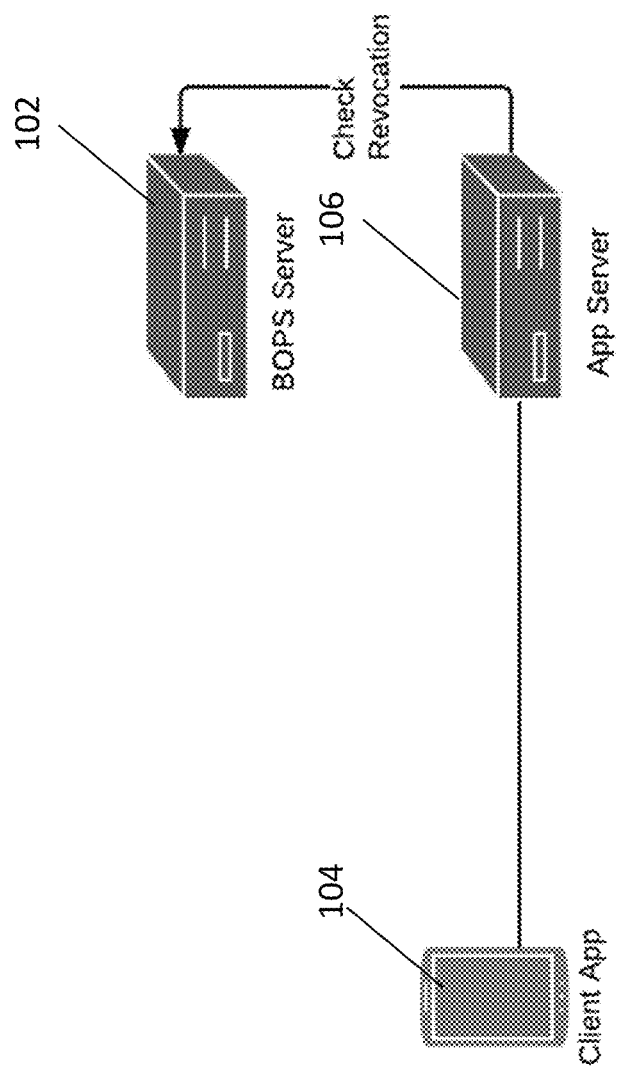

In a second variation (partially represented in FIG. 5), the Genesis steps (including as set forth in FIGS. 2-3) can be the same. Thereafter, the BOPS server 102 contacts the application server 106 component to notify that a new client 104 has been registered and allocated. The flow of the second variation differs from the first variation's flow in at least two ways: the identity details are different, and the revocation check is procured in the client session (FIG. 6). At the third step, when the client device 104 calls the application server 106 directly, the application server 106 calls the BOPS server 102 to confirm that the certificate has not been revoked previously.

The features shown and described herein in connection with example BOPS implementations can be used by or in connection with the access control modules provided herein, or can be added to an identity assertion element of an existing framework. Thus, the BOPS implementation enables trusted processing by performing minimal actions in the production environment and, thereby often precluding a requirement of change of application software.

Figure 7:
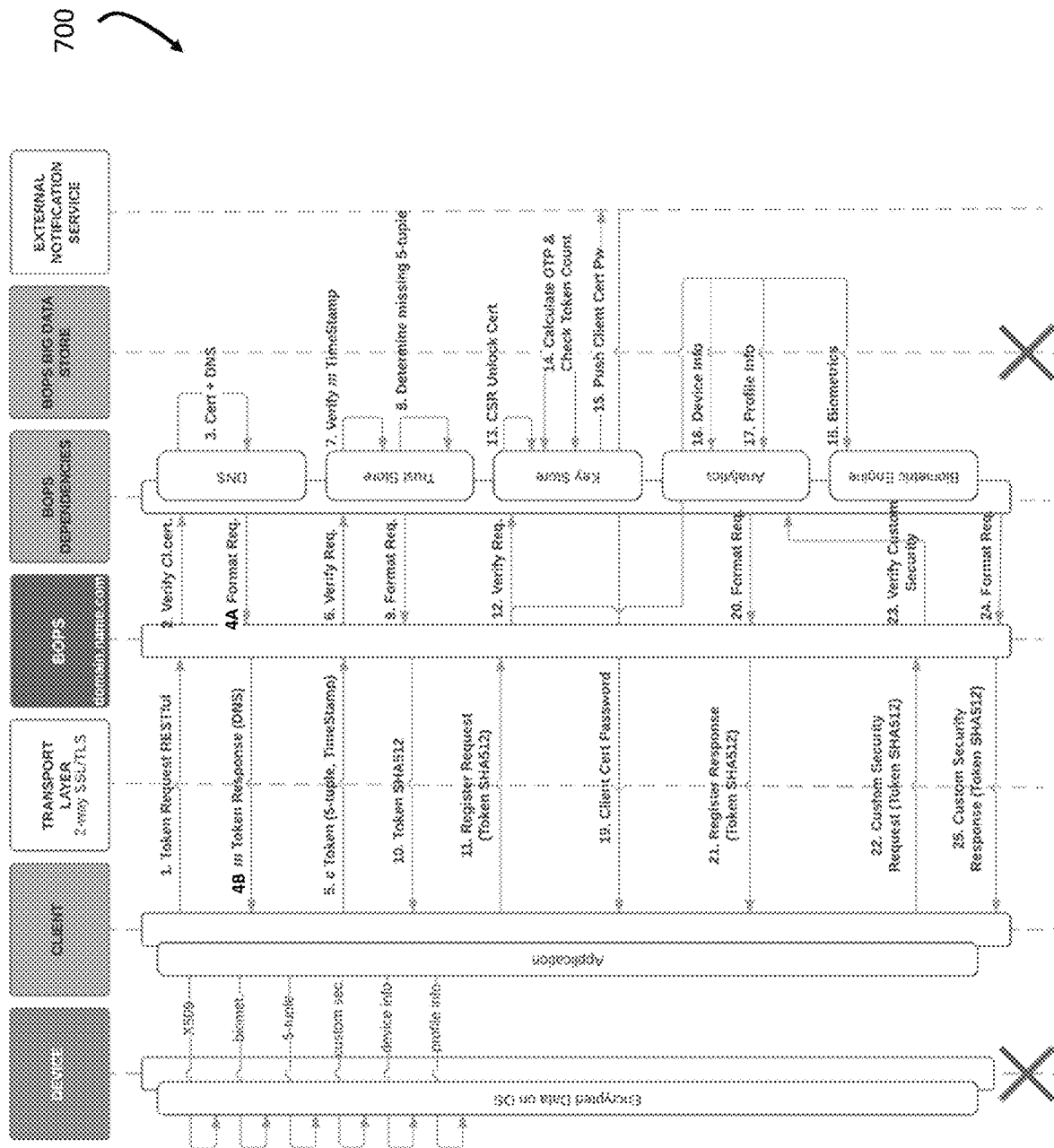
FIG. 7 illustrates devices and steps associated with an example Enrollment process with particular emphasis on data confidentiality, in accordance with one or more implementations.

FIG. 7A illustrates devices and steps 700 associated with an example Enrollment process and related data confidentiality, in accordance with one or more BOPS implementations. Two-way SSL/TLS, which in the present application is built on top of one-way SSL/TLS, provides communication starting at the client device 104. The initial (e.g., Genesis) communication can define the origin of the client's 104 identity and pass a BOPS-compliant two-way certificate that the client device 104 can use for subsequent communications, in conjunction with the session-oriented identity assertion. In one or more implementations, the client application can have a preloaded two-way SSL/TLS key that allows for subsequent Genesis operations.

In accordance with one or more implementations, a BOPS server 102 receives a one-way SSL/TLS communication with two-way SSL/TLS identity from a client device 104. Communication is conducted via both one-way SSL/TLS and two-way SSL/TLS. In one or more implementations, the server 102 uses a data store to take trusted identity information and gather roles for processing on behalf of a respective identity. Moreover, auditing maximizes appropriate artifacts for continued verification and validation of the trusted access. The assurance can occur as a function of simplification and documentation of a multilevel access control mechanism. In one or more BOPS implementations, an administration console (hereafter "admin console") in a graphical user interface is provided following completion of a registration process, which allows for dynamic modification of users, groups and roles, and described in greater detail herein.

With reference to FIG. 7A, a token request (RESTful) is transmitted from a client device 104 (1) and is received from the BOPS server 102 and verified (2). A DNS entry for the BOPS Server's 102 hostname can be configured to have a key in the key store (3), and a request is formatted (4A) and m Token Responses are transmitted to the client device 104 via 2-way SSL/TLS (4B). Thereafter, a c Token (e.g., 5-tuple and a TimeStamp) is transmitted form the client device 104 (5), which is verified, including as a function of a m TimeStamp in the request (6, 7). Thereafter, the missing 5-tuplet is determined (8) vis-à-vis a Trust Store and a request is formatted (9) and a SHA512 Token is transmitted to the client device 104 (10).

Continuing with reference to FIG. 7A, a register request that includes the SHA512 Token is transmitted from the client device 104 (11) and received for verification by the BOPS server 102 (12) and the client signing request is processed to unlock the certification (13), including to calculate a one-time password and check a Token count vis-á-vis a Key Store (14) and to push a client certificate password out to an external notification service (15). In addition, the verification step in 12 branches to steps associated with analytics, and includes determining device information (16), profile information (17) and biometrics (as shown and described herein) (18).

In addition, the client device's certificate password is transmitted back to the client device 104 (19), as well as a formatted request (2) and a SHA512 Token (21). Thereafter, a custom security request, including the SHA512 Token is transmitted from the client device 104 (22), which is verified by the BOPS server 102 (23). A request is formatted (24) and a custom security response (including a SHA512 Token) is transmitted to the client device 104 (25).

In one or more BOPS implementations, an active intrusion detection system is provided, including via devices 112. The active intrusion detection system is effective for preventing a brute-force attack, denial-of-service (e.g., distributed or single denial of service), or other attacks. A custom rule can be defined and enforced that identifies and tracks attempts to forge two-way SSL/TLS certificate impersonation, session replay, forged packets, or a variety of circumvention techniques in an effort to compromise a BOPS server device 102.

In one or more BOPS implementations, visual cryptography is used to encrypt an initial biometric vector (IBV). This technique offers an advantage of fast recomposing of the IBV, such as by using an XOR operation on a particular device that performs a biometric match. For example, techniques developed by Moni Naor and Adi Shamir can be used, which provide for a secret sharing scheme. In an example operation, a vector is broken into N shares and recomposing the initial vector requires all N share parts. The respective devices include a BOPS Server 102 and Mobile Client Application 104, and the enrolled vector can be broken in 2 share parts with one being stored in a BOPS repository accessible by the BOPS server 102 and the other on the mobile computing device 104.

In one or more implementations of the present application, other forms of encryption and/or mechanisms to ensure data confidentiality can be employed. For example, elliptic curve cryptography can be used in place of (or potentially in addition to) visual cryptography.

Figure 8:
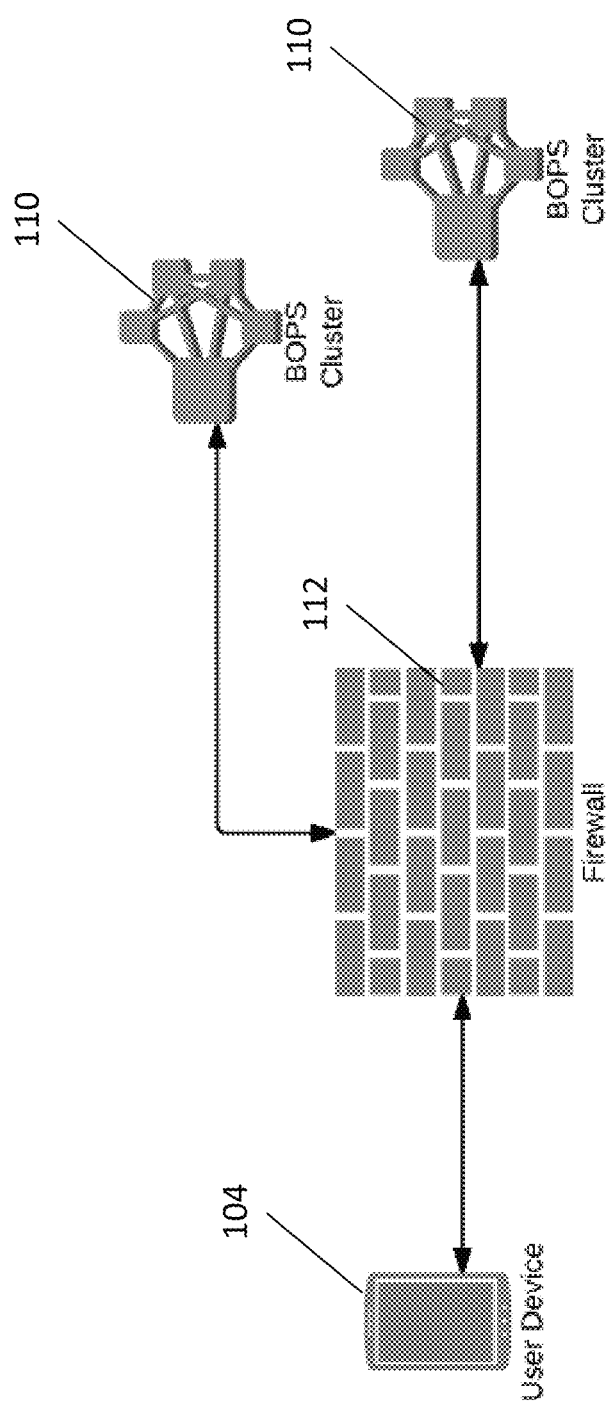
FIG. 8 illustrates an overview, including access and exchange of data, in connection with an Enrollment process.

During an example biometric authentication action, a newly acquired vector and both shares of an enrolled vector can be available in a single location (e.g., mobile computing device application 104 or BOPS server 102), or in multiple locations. In any case, using the enrolled vector shares, the initial vector can be recomposed in memory thereby supporting the authentication that occurs against it. FIG. 8 illustrates an overview, including access and exchange of data, in connection with an Enrollment process. With regard to the BOPS server 102, identify is provided as a function of a subject's account and device. The subject's account and device are part of profile information for the given subject. The profile information is stored in a clustered data store. For the match, the IBV is taken in shares, reconstituted and decrypted. If the match algorithm is not Euclidean matchable, the match then occurs as plaintext, otherwise the match occurs in the encrypted domain.

In an alternative implementation, homomorphic encryption is utilized, which allows for computations to be carried out on ciphertext and thus generate an encrypted result. Matching operations can in an encrypted space, thereby increasing privacy and security. For example, matching can occur in the encrypted space using a one-way encryption, thereby offering a high level of privacy, and effectively precluding the ability to obtain the original plaintext IBV.

In one or more implementation, an algorithm performs one-way encryption in such a way that it has two parts: one for the client and one for the server. If the match uses a Euclidean distance (e.g., a Hamming distance), as known in the art, then matching occurs in encrypted space. Alternatively, if the match does not use a Hamming distance, then matching in the plaintext space, as described herein.

In one or more implementations, a random one-time pad (ROTP) is used for performing a one-way encryption that allows for matching in the encrypted space. Alternatively, visual cryptography is used for a reversible cipher in the case of matching in plaintext. For example, in the case of not having a Hamming distance, then visual cryptography is used to return to plaintext for a match to occur in memory. Preferably, encryption and decryption use one of two encryption algorithms: 1. Bitmask or 2. Matrix transformation. Ideally, all match algorithms will have a Hamming distance and therefore the server never has a plaintext IBV.

The following is an example algorithm in connection with iris recognition that is performed as a function of computing the Hamming distance between two binary vectors. In the example algorithm, matching can be performed directly on the encrypted halves of the biometric without converting them to plain text as follows (^ denotes the bitwise XOR operation):

The server stores: Enrol vector ^ noise.
The phone sends: Verify vector ^ the same noise.
Comparison is done on the server: (Enrol vector ^noise) ^(Verify vector^ the same noise).
XOR is commutative and associative, therefore this can be rearranged to: (Enrol vector^Verify vector)^(noise^ the same noise).

XOR is self-inverse, therefore (noise^ the same noise)=I, where I is the identity element for XOR, which is 0.

Therefore, the expression simplifies to: (Enrol vector^Verify vector)^I=(Enrol vector^Verify vector).

The Hamming distance between A and B is a function of A^B.

Therefore, the Hamming distance between the noised vectors is identical to the Hamming distance between the original vectors.

In an example implementation On enrollment, the following occurs:

a). Enrolment vector:
00110011
b). Random sequence (first half of vector): store on server
01010101
c). Second half of vector (calculated): store on phone
01100110
On verification:
e). verification vector: (notice only the last bit changed between enrol and verify because this is a good match).
00110010
Second half of vector: stored on phone
01100110
f). Calculate approximation to the first half of the vector (from e and c):
01010100
On matching:
g). send this "verification 1st half" (f) to the server.
h). server now has:
enrolment vector 1st half b):
01010101
verification vector 1st half f):
01010100
flag all the bits that have changed between b and f with a 1:
00000001

The system can tell that only the last bit changed between enrol and verify, which represents a good match, but notice how the server was only dealing with scrambled data and that the actual vector is not known at the server, only the difference in the vectors can be computed.

In an alternative implementation, facial recognition is performed by calculating the Euclidean distance between template vectors, where the face cannot be reverse-engineered from the vector. When two face images are matched, for example, using a neural network, each face is first converted to a float vector of size 128 bytes. The representation of this float vector is arbitrary and cannot be reverse-engineered back into the original face. To compare the faces, the Euclidean distance of the two vectors is calculated. Two faces from the same person should have similar vectors and faces of different people should be further apart in Euclidean space. A verification vector can be calculated on the mobile device and transmitted to a remote server for matching to a stored enrolment vector. Accordingly, an original biometric (e.g., the face) will never leave the user's device, and all matching can be calculated on the server.

In yet another implementation, fingerprint recognition is performed by calculating the Euclidean distance between template vectors, where the fingerprints cannot be reverse-engineered from the vector. Similarly, as described above, a neural network can be applied for fingerprint matching. In such case, the fingerprint can be converted to a vector on the device and the vector would be transmitted, thereby eliminating a way to reconstruct the original fingerprint image from the network output vector.

In one or more implementations, an encryption key is randomly generated on the device, which is used to obfuscate the output vector from the neural network. For example, the Encrypted biometric vector=Encryption matrix×Plaintext biometric vector. In such case, the encryption matrix transformation has the special property that Euclidean distances are conserved, thus the matrix must be a rigid transformation. In such cases, the biometric vector does not leave the device in an unencrypted format, and the server compares two encrypted biometrics and calculate the Euclidean distance without knowing the plaintext. When the user wants to verify from a new device, the user can transfer the encryption data to the new device, such as via a QR code. This requires the old device to be available. If the old device is lost or otherwise unavailable, the user re-enrolls, as shown and described herein.

Accordingly, enhanced privacy is provided as a function of a biometric vector being is split and stored encrypted and across devices. No part of the biometric vector exists on the server in plaintext form either on disk or in memory. Further, the present application provides for enhanced analytics, as users who wish to do "what if" analysis on respective authentications and failed authentications can do so via an administration interface that supports facets, searches, analytics and the like.

Figure 9:
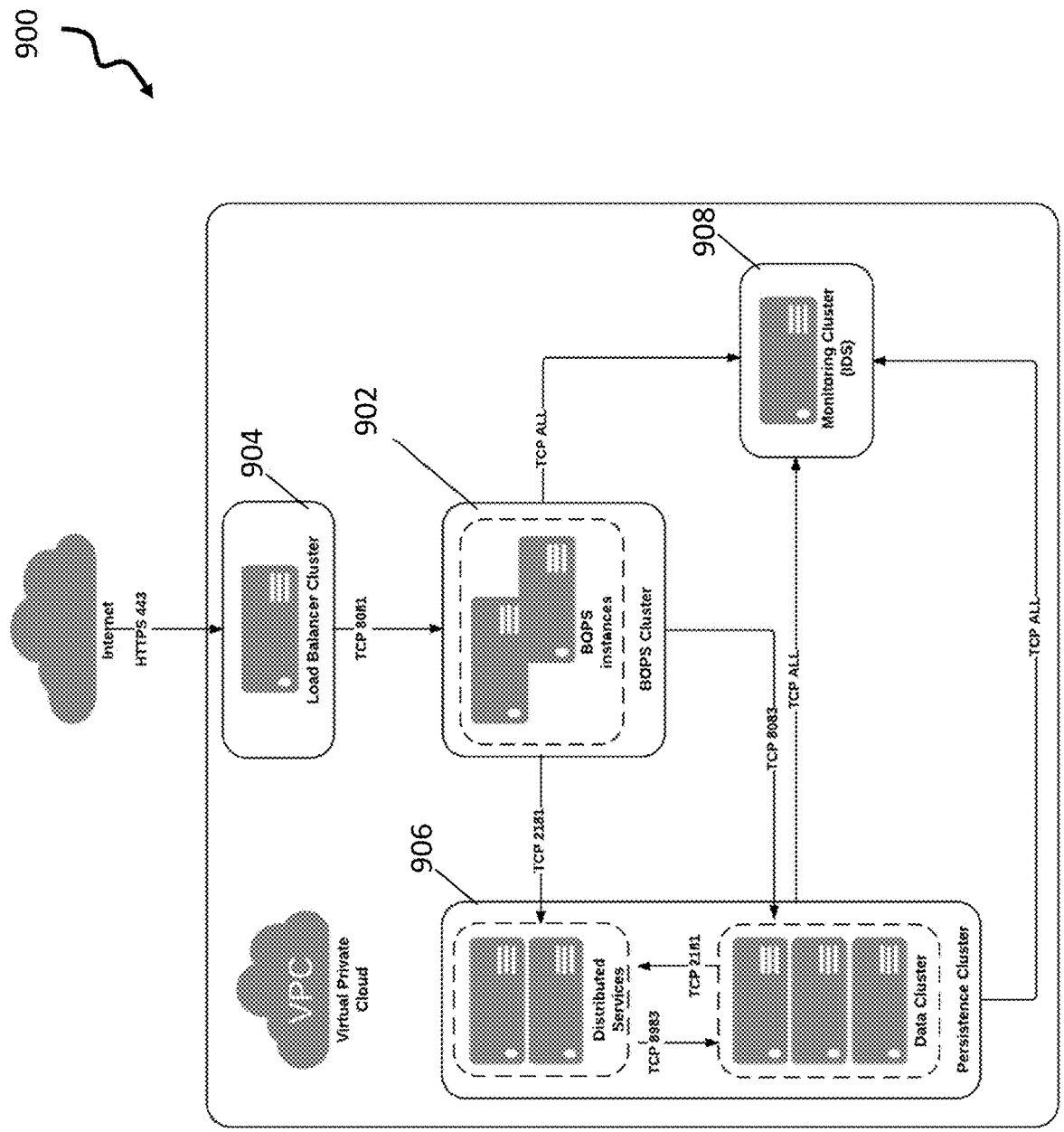
FIG. 9 illustrates components of a security architecture in accordance with one or more implementation of the present application.

FIG. 9 illustrates components of an example security architecture 900 in accordance with one or more BOPS implementations. As shown in FIG. 9, a BOPS security cluster 902 can be configured to run BOPS instances on virtual private networks (VPN). The core attributes of a Certificate Authority entity, the BOPS KeyStore and the BOPS TrustStore can be located, for example, on the BOPS instances. The BOPS instances can also contain data associated with and/or representing DNS, OTP library, notification services keys, business adapters, BOPS configuration properties. The load balancer cluster 904 can include one or more devices that ensure reliability and availability of BOPS services, distributed workload. A configured BOPS load balancer 904 can operate to maximize throughput, minimize response time, and avoid overload of any single resource in the BOPS architecture 900.

Continuing with reference to FIG. 9, a persistence cluster 906 can include one or more database security groups and can be configured for auto-scaling of BOPS data clusters. As authentication services deal with the large data objects, handle large data sets, a big data store, such as NoSQL and one or more horizontal partitions of data ("shards") of data can be employed to improve performance by reading from shards concurrently and merging the results. The database security architecture 900 implements a BOPS architecture and prevents centralized storage of sensitive data in a single location. Also illustrated in FIG. 9 is monitoring cluster 908, which can include IDS devices 112.

Figure 10A:
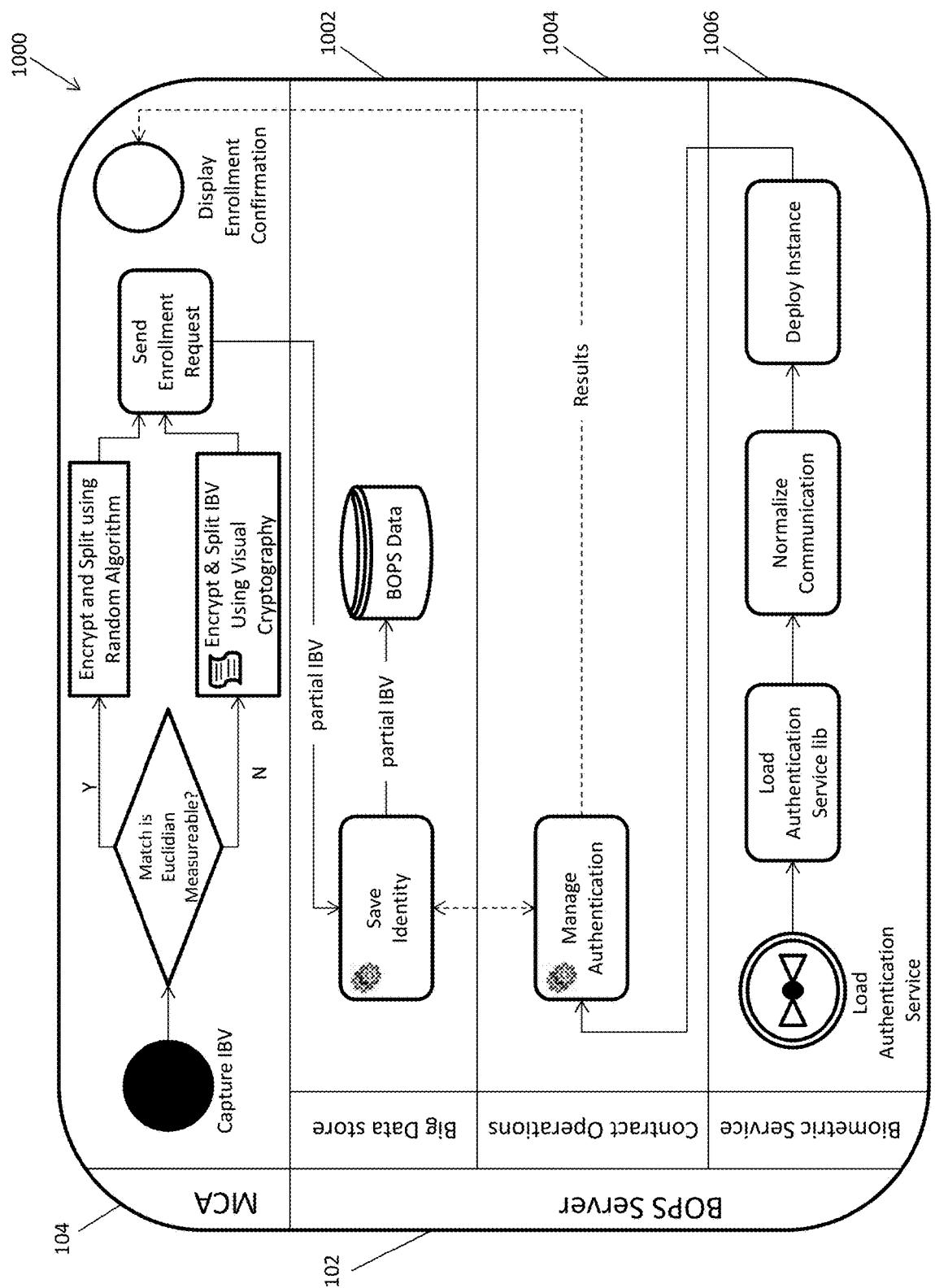
FIGS. 10A and 10B illustrate devices and steps associated with two respective and alternative Enrollment processes, in accordance with one or more implementations of the present application.
Figure 10B:
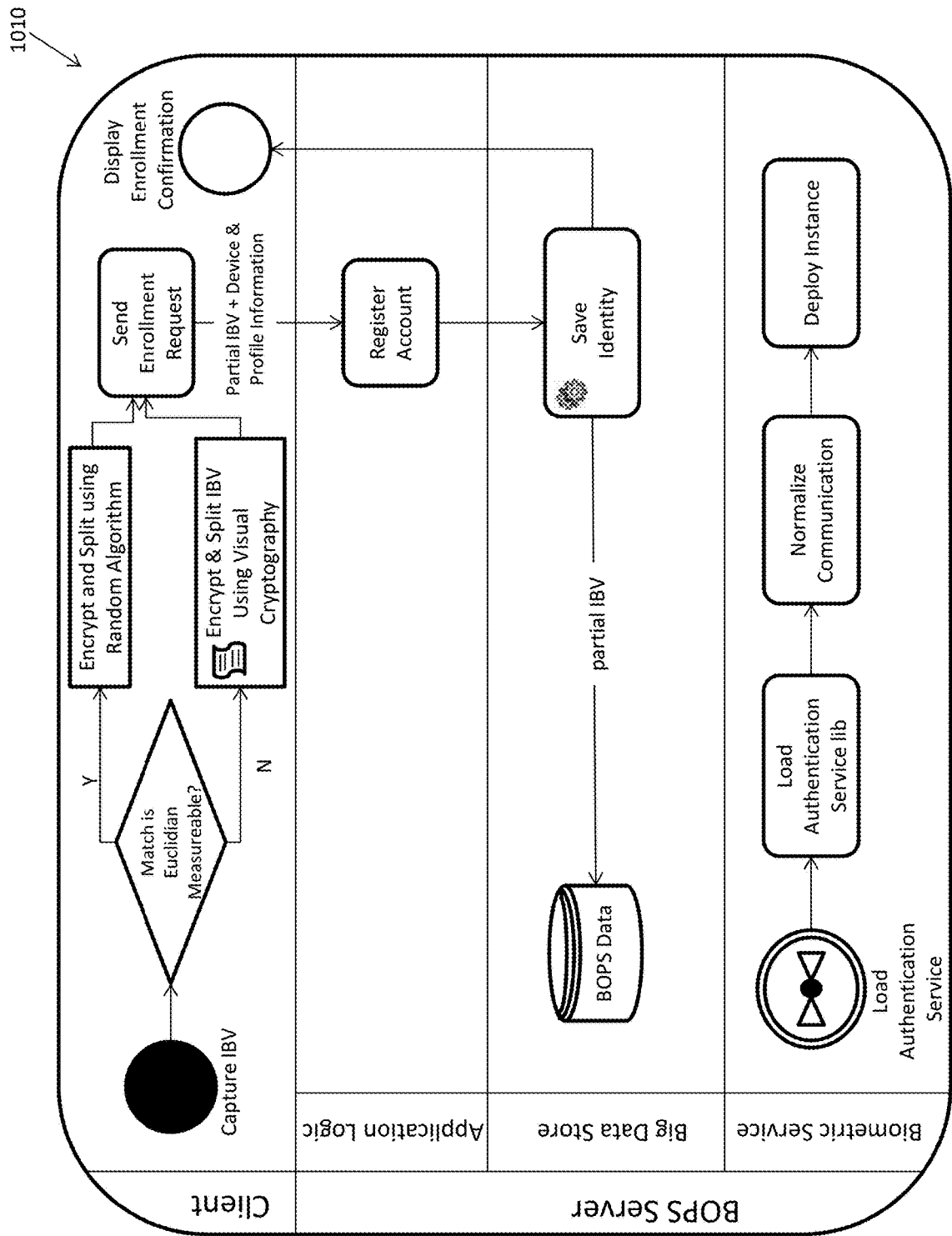

FIGS. 10A and 10B illustrate devices and steps associated with respective and alternative Enrollment processes 1000 and 1010, respectively, in accordance with one or more BOPS implementations. The implementations shown in FIGS. 10A and 10B provide for mechanisms to store encrypted biometric data associated with account or device, to store information about all biometric data changes, to load and use authentication services and their corresponding biometric libraries (e.g., FACE, 4F, IRIS), and to provide API operations to support new flows (e.g., enrollment and authentication).

In the implementation shown in FIG. 10A, a software application ("MCA") executing on a mobile computing device 104 provides for acquisition of an initial biometric vector (IBV), for performing a cryptographic split operation during Enrollment process and distributing this process for lower CPU load on a server side, for performing Enrollment request (registration) with the BOPS server 102 and for performing a cryptographic match operation, when the method for authentication flow is configured to take place on the client 104 side. The BOPS server 102 can be configured to save the user identity data together with the shared vector, for example in the BOPS Big Data store 1002 during an Enrollment process. Moreover, the BOPS server 102 can manage the authentication flow and integrate authentication service communication component (1004). An authentication service (1006) can dynamically load one or more authentication algorithms, biometric engines libraries, provide support for authentication engine versioning, to normalize communications between a BOPS server 102 and one or more biometric engines, to provide support for authentication Engines versioning, and to normalize communication between a BOPS server 102 and authentication engines. An authentication services functions as a wrapper for a biometric service in performing an authentication.

As explained herein, one or more mechanisms are provided for pluggable authentication services and their corresponding biometric engines. Accordingly, BOPS implementations can be configurable (e.g., via a location of authentication services and biometric libraries) and can load automatically the services available and register into the system.

As result, a list of enunciation services is available at system level, for instance: 4F-engine; FACE-engine; IRIS-engine; VOICE-engine. A list of Authenticators includes a FIDO authenticator or a BOPS authenticator.

The present application provides improvements to biometric integration authentication services by supporting the following features. One or more mechanisms can be provided to store encrypted biometric data in an account or device that accessible by the BOPS server 102. Further, a mechanism can be provided to store information representing biometric data changes that occur. In addition, a "generic" mechanism can be provided to access and use authentication services that includes (e.g., in connection with face, four fingers, and iris biometric authentication, such as shown and described in commonly assigned U.S. patent application Ser. No. 14/201,462, U.S. patent application Ser. No. 14/201,499, U.S. patent application Ser. No. 14/988,833, and U.S. patent application Ser. No. 14/819,639.

In one or more implementations of the present application, a mobile computing device 104 acquires an Enrollment vector, and performs a cryptographic split operation during an Enrollment process. This provides an improvement in computing functionality by distributing the process and lowering the CPU load on the server side. Further, mobile device 104 can perform an Enrollment request (Registration) to a BOPS server 102 and perform a cryptographic match operation when a "Biometric Validation" step from authentication flow is configured to take place on mobile.

In one or more implementations of the present application, the BOPS server 102 stores user identity information together with at least a portion of a shared vector, for example, in an APACHE SOLR repository during the Enrollment process. Moreover, the BOPS server 102 can be configured to manage authentication information and process flow and to integrate at least one biometric service communication component.

Other components provided in an architecture in accordance with the present application can include one or more authentication services and one or more biometric engines. The authentication service(s) can be configured to perform dynamic loading of one or more libraries configured to support versioning of one or more authentication services, to normalize communication between the BOPS server 102 and authentication services, and to offer one or more deployment scenarios, such as web application machines where one or more BOPS instances leave or be a separate cloud which can scale by itself.

In one or more implementations, biometric engines are configured to comprise unmanaged biometric libraries that are subject of an interface and defined and implemented by each respective library to be plugged into BOPS-implemented system. The biometric engines preferably offer a "Load" method to load an engine if needed, an "UnloadLoad" method to unload an engine to free resources (e.g., memory, temporary files), a "GetStatus" to provide status information (e.g., INIT_FAILED, OK, ERROR, OUT_OF_MEMORY), a "Split" method to encrypt an acquired vector during Enrollment, a "Match" method to authenticate a vector, for example, based on shared parts of an initial vector, an "Activate/Register" method and a description of the Engine. The description can include, for example, a Biometric Type Identifier, a Name and Description, an Engine Version and a Biometric Format. Using this information, one or more processes associated with the present application can automatically load and register a specific biometric engine.

In one or more implementations, a mechanism for pluggable Authentication Services is supported that enable the system to be configurable (Authentication Service location) and load available libraries automatically and register into the system. Each biometric library, called by the authentication service, can provide information, such as a constant string (Biometric Type), a respective version, a name and description, to describe itself. Additionally, information, such as the pair (BiometricType, BiometricVersion) can identify a unique biometric engine.

Example authentication services and their corresponding and lower level biometric engines can be listed and available at the system level, including, for example, 4F, FACE, IRIS and VOICE, such as shown and described in commonly assigned U.S. patent application Ser. Nos. 14/201,462, 14/201,499, 14/988,833, and 14/819,639.

As noted herein, in one or more BOPS implementations Genesis and Enrollment processes are effectively decoupled, which enables determining an identity of a subject without a direct requirement for a BOPS server 102 access to a biometric vector, certificate, or other confidential information otherwise needed for automated processing. Accordingly, a BOPS solution can be construed as "open" and can enable virtually any customization in Genesis and Enrollment. For example, Genesis can include using a username and password for access to ACTIVE DIRECTORY, a validating email or text message, or an officer of an organization for physically verifying the identity. Pre-registration of a user account, for example that may occur in batch, can be based on business requirements. Further, a Genesis process can form a full dependency on risk management and can, further, determine downstream processing. During an example post-Genesis process, a user enrolls his or her biometric(s), which can include a unique client certificate being issued for a respectively enrolled device. Additionally, a one-time password (e.g., a "seed") can be established between a client device 104 and a Server device 102, and an additional seed value can be used for replay attack prevention.

It is recognized herein that a single user may have many devices and/or a single device may have many users (i.e., a single device may have many biometrics). Thus, a form of a many-to-many relationship can occur as a function of separating the Genesis and Enrollment processes. Accordingly, an identified subject, via Genesis, can enroll many times with many biometrics. In one or more BOPS implementations, the Enrollment process uses a two-way Secure Socket Layers/Transport Layer Security (SSL/TLS) certificate, which can be server-generated. Such generation can occur after the Genesis process, thus assuring that the certificate is properly for the well-defined subject.

Moreover, one or more BOPS implementations can have various levels of provisioning, which provides flexibility for different security levels. For example, a high-level of Genesis includes a user being physically validated in front of someone, such as an officer. A low level, in the alternative, can include just defining a username and password in conjunction with a validating email that is received by a user. Various levels of Genesis and verification processes can be implemented as a function of one or more business decisions that can be unique or specific to one or more respective organizations. Furthermore, subsequent processing may change based on a respective Genesis level. For example, a system allows a $1000,000 transfer in connection with a high level of Genesis, but only a $100 transfer in connection with a lower level of Genesis.

Figure 11:
FIG. 11 is a block diagram illustrating possible requirements and examples associated with different levels of a Genesis process, in accordance with the present application.

FIG. 11 is a block diagram illustrating possible requirements and examples 1100 associated with different levels of Genesis, in accordance with the present application. As additional requirements are needed in verification processes, the respective security levels can correspondingly grow. In the example levels in FIG. 11, the first and second levels can be swapped based on the organizational considerations. For example, if a goal is to verify and give a Wi-Fi access to business visitors, then verification can be sent via a mobile device, and is considered herein to be a low verification level.

During an Enrollment phase, a mobile application executing, for example on a mobile computing device 104 enrolls biometrics based on respective built-in capabilities. For example, a mobile application built for a specific integration and which has required default biometrics can have such specifically hardcoded modules in the application.

One or more BOPS implementations addresses the speed of biometric authentication transaction and solves the problem of a virtualized threat on a mobile device. An example of such a threat is that an intruder decompiles the code on a copied virtual image of a mobile device, uses this source code to stop authentication calls, and attempts to get a control of a server that authenticates and grants permissions.

Figure 12:
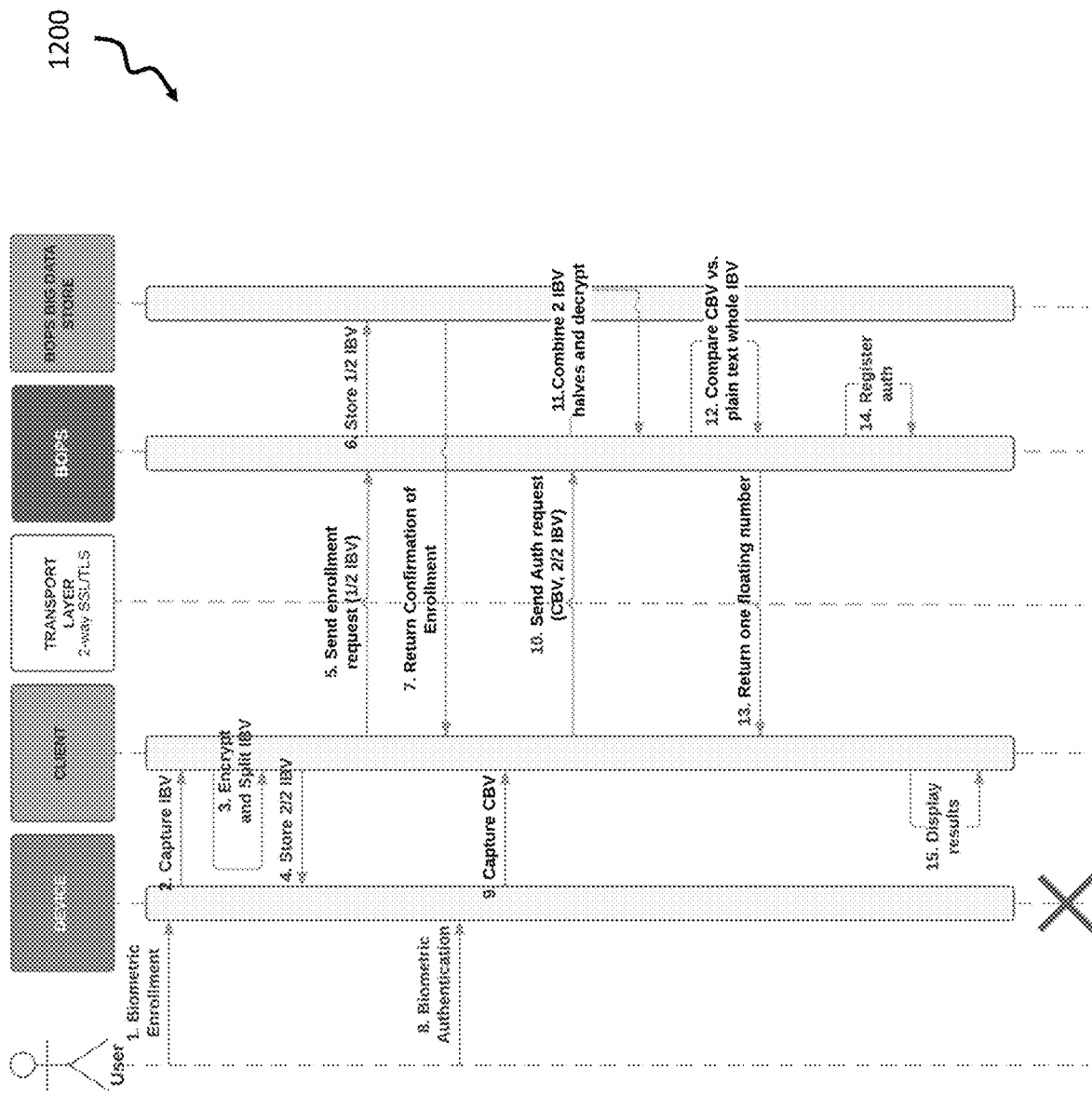
FIG. 12 illustrates an example flow of information associated with an initial biometric vector during enrollment and authentication processes.

To mitigate these risks, the process in a BOPS implementation encrypts the initial biometric value (IBV) without the encryption key, then half of the IBV is stored on the client device 104 and the other half is stored on or otherwise is accessible by server 102. The biometric matching can occur on the server 102. FIG. 12 illustrates an example flow of information 1200 associated with an initial biometric vector ("IBV") during Enrollment and authentication processes. In the example flow illustrated in FIG. 12, during Enrollment the IBV is captured and split, and a portion (e.g., half) of the IBV is stored on the client device 104. A portion (e.g., half or ½) of the IBV is transmitted in an Enrollment request to the BOPS server 102, and the portion is stored, for example, in a data store accessible by the BOPS server 102. Thereafter, confirmation of Enrollment is transmitted by the BOPS server 102.

Continuing with reference to FIG. 12, a current biometric vector ("CBV") is captured during a subsequent biometric authentication process, and sent in connection with an authentication ("Auth") request to the BOPS server 102 that includes a remaining portion (2/2). The BOPS server 102 is configured to combine the received portion of the IBV in the authentication request, and combine it stored portion of the IBV to decrypt. The received CBV is compared to the plain text whole IBV and, as function of the determination during the comparing, a number (e.g., a floating number) is returned to the client computing device 104. If there is a match, then the user can be registered as authenticated. Additionally, results can of the authentication process can be displayed on the client computing device 104.

Thus, and as illustrated in the steps shown in FIG. 12 and described herein, a BOPS implementation in accordance with the present application addresses speed of a biometric authentication transaction and solves problems associated with a virtualized threat on a client device. Such a threat can occur, for example, after an intruder decompiles software on a copied virtual image of, for example, a mobile device, uses the source code to stop authentication calls, and attempts to get a control of the server that authenticates and grants permissions.

To mitigate these risks, features associated with a BOPS implementation can operate to encrypt the IBV without an encryption key, store a portion (e.g., half) of the IBV on the client device and a portion (e.g., the other half) on the server or a device accessible thereby. Biometric matching can occur on the server. In this way, a stolen device cannot bypass authentication, at least partly because a compromised device or server renders no useful information to an attacker.

In accordance with one or more implementations, the following provides for establishing a processing agreement to biometrics authentication in one or more BOPS implementations. A biometric vector is split at least between the client and server, and the approach to authentication is biometric agnostic. For example, and in connection with face recognition, the size of the initial biometric vector can be approximately 20 KB, which could be minimized by the Up/down of an HTTP-request and HTTP-response, and therefore is accepted. The splitting algorithm for an IBV in connection with face recognition can be as follows: zero bit is the white and one bit the black. Accordingly, a BOPS implementation can correspond to Visual Cryptography (VC). As noted herein, the present application is usable with virtually any biometric, and provides a mechanism to take the IBV and encrypt with VC. With VC, the match occurs in plaintext. Alternatively, with Random, the match occurs in the encrypted domain.

With specific reference to FIG. 12, a user operating client computing device 104 proceeds with biometric Enrollment (1) and captures an initial biometric vector (IBV) (2). At step (3), the IBV is encrypted and split, and 2/2 of the IBV is stored locally on or with the client computing device 104 (4), and an Enrollment request is sent that includes ½ of the IBV is transmitted to the BOPS server 102 via a transport layer (via 2-way SSL/TLS) (5). The ½ IBV is stored by the BOPS server 102, such as in BOPS big data (6) and a confirmation of Enrollment is transmitted from the BOPS server 102 back to the client computing device 104 (7).

Continuing with reference to FIG. 12, following Enrollment, biometric authentication occurs at the client computing device 104 (8), and a current biometric vector is captured (9). Thereafter, an authentication request is sent via the transport layer (10) which is received by the BOPS server 102, combined with the 2/2 IBV and used for decryption (11). Thereafter, the CBV is compared with the plaintext IBV (12) and a floating number is transmitted back to the client 104 (14), and results are displayed (15).

Figure 13:
FIG. 13 illustrates a Visual Cryptography (VC) example that is implemented in connection with the present application.

Turning now to FIG. 13, a Visual Cryptography (VC) example 1300 that is implemented in connection with the present application is shown. VC provides good synergy with encryption, splitting an IBV and reconstruction of the IBV without a requirement for key management. In the visual cryptography example shown in FIG. 13, black can equal 1 and white can equal 0. In the example, the IBV is equal to 00100110. An XOR reconstruction is usable because the solution is Boolean. The original biometric vector encryption process can occur using visual cryptography, and the results can be two vectors noted as sheets, which contain only white noise. The mobile storage (e.g., client device 104) contains one of the sheets and the server device 102 contains or accesses the other. The verification process combines the two sheets using a simple Boolean operation which results in the original biometric vector fully reconstructed.

An example reconstruction of an IBV in connection with an XOR operation is shown below in Table 1.

TABLE 1

| | | | | | | | | |
|---|---|---|---|---|---|---|---|---|
| original | 0 | 0 | 1 | 0 | 0 | 1 | 1 | 0 |
| share 1 | 01 | 10 | 10 | 01 | 10 | 10 | 01 | 01 |
| share 2 | 01 | 10 | 01 | 01 | 10 | 01 | 10 | 01 |
| OR-reconstruction | 01 | 10 | 11 | 01 | 10 | 11 | 11 | 01 |
| XOR-reconstruction | 00 | 00 | 11 | 00 | 00 | 11 | 11 | 00 |

With reference to Table 1 and in connection with an example BOPS implementation, the original biometric vector encryption process can occur using visual cryptography, and the results of this encryption are two vectors noted as sheets that contain only white noise. As noted herein, storage associated with the client device 104 includes one of the sheets and the storage associated with the server device 102 contains the other. The verification process combines the two sheets using a simple Boolean operation which results in the original biometric vector fully reconstructed.

Figure 14:
FIG. 14 illustrates an example superposition of two shares (2,2) in a Visual Cryptography Scheme (VCS) where each bit encrypts into shares, in connection with an example BOPS implementation.

FIG. 14 illustrates an example superposition of two shares (2,2) in Visual Cryptography Scheme (VCS) where each bit encrypts into shares in connection with an example BOPS implementation. In the example shown in FIG. 14, the choice of shares for a zero and one bit is a random process. When encoding zero or one bit, a value is taken from the table for one share and the adjacent value in the table for the other share. At the end of the process, neither of shares provides any clue about the original bit. Superimposing the two shares (using OR or XOR) determines the value of the original bit.

Continuing with reference to the example shown in FIG. 14, a superposition of two shares (2,2) is shown in a Visual Cryptography Scheme (VCS), where each bit encrypts into shares. Note that the choice of shares for a zero and one bit can be implemented in a random process. When encoding zero or one bit, a value is taken from a table (e.g., Table 1) for one share and the adjacent value in the table for the other share. At the end of the process, neither of shares provides any clue about the original bit. Thereafter, superimposing the two shares, for example, using OR or XOR, determines the value of the original bit. This is an example for (2,2) VCS. VCS can extend to more than two shares by changing the random process probability. Changing the probability of the random process from 0.5 to 0.25 results in the shares having 4 bits instead of the two bits present in the 0.5 example. Additionally, changing the probability of the random process to 0.125 results in an encryption of 8 bits for each input bit.

With regard to detecting a match, one or more modules in an example BOPS implementation employs multiple initial biometric vectors. There are then two RESTful web services calls that communicate via SSL/TLS, one for each biometric. One call can include halves of IBVs, in addition to a current biometric in an authentication session, and return a floating point value that represents the strength of the match. Another call can offer one IBV (half) at a time and the current biometric, and return a floating point value representing the strength of the match. For the second call, there can be several consecutive calls: e.g., one IBV at a time to determine a match.

The sizing calculations per a matching agreement in connection with an example BOPS implementation, can be as follows: 20 kb per face vector, 5 frames per second; for 10 seconds=50 vectors; 50×20 kb=1000 kb.

An example of matching logistics in connection with the above-identified implementation is described as follows. The 1,000 KB is sent to the server for matching. If there is no match, the second 100 KB is sent, and so on, until a floating point value is determined. In one or more BOPS implementations, a minimum threshold is defined and the floating point value is at least within the minimum threshold. According to an example matching algorithm, the current frame requires 200 milliseconds plus a 125-millisecond up/down time to the server. The frame transmission thus brings the transaction speed to 325 milliseconds per frame, plus the match. When the match is upper bounded at 100 milliseconds, the frame transmission is roughly at 425 milliseconds. In the even that fails, a batch of frames (e.g., five at a time) can be transmitted and a match can be attempted again. Preferably, matching is conducted in less than a second of time, although in certain less favorable case, matching could take longer, such as in seconds of time.

As shown and described herein, the flexible and authenticator and biometric agnostic nature of the present application enables organizations to define a respective authenticator and biometric that is usable for authentication and that can be defined as a default biometric. Absent a specification of a biometric as part of a downstream transaction, the default biometric can be specified via one or more user interfaces, such as at the organizational level, group user level, or transaction level.

In one or more implementations, an administration console can be configured in a graphical user interface and accessible to respective authorized users. The administration console can include graphical controls that, when selected, result in configuring for a default biometric type. For example, an organization, ACME Plumbing, specifies that for certain access the face is to be used for the default biometric for all employees of ACME. Further, ACME Plumbing specifies that in other contexts 4 fingers is to be used for the biometric for all customers, and still further specifies in yet other contexts that both 4 fingers and face are to be used for all employee transactions that are in excess of $10,000. These options are presented in the administration console for an ACME Plumbing administrator to define. Thus, the present application provides for flexible and dynamic application of one or more biometrics.

With regard to authentication, a plurality of sources of information for biometrics can be used in a specific organization setup such as, for example: a condition engine; a member profile; and a member definition. The condition engine can be based on dynamic rules that are defined in the system. For an example, any transactions over $1K require at least two forms of biometric verification. The member profile defines user roles and corresponding privileges. For an example, member profile "Information Security—First Responders" may require authentication every 10 minutes or other condition, such as every commit transaction. The member definition can define a default authentication at the organizational/integration level. For example, if there are four types of biometrics available in the system—4F, FACE, IRIS, —and for a specific BOPS/Enterprise implementation the default biometric is "FACE," then facial authentication is available as a default, and can be provided as such, for example, in a dashboard provided via a graphical user interface and referred to herein, generally, as a BOPS Admin Dashboard. Moreover, respective conditions such as described above can indicate priorities. For example, the member definition can be considered the lowest priority and the condition engine can be considered the highest. The highest priority becomes the authentication method(s).

The following represents example steps associated with an Enrollment process in accordance with the present application. A mobile computing device 104 configured with a mobile client application acquires a biometric vector, performs encryption and then makes a registration API call. In particular, after acquiring a biometric, the registration call to a BOPS server 102 includes half of an IBV, which gets stored for access by server 102. The registration process can be used to initiate a BOPS implementation within an organization. Although many of the descriptions and figures shown herein represent a BOPS implementation to appear as a cluster, it is considered that BOPS can be configured as a business component. Prior to a BOPS administrator ("BOPS admin") sets up an environment, an organization registers for a respective API key from a BOPS server 102. The individual developers can, in various implementations, apply for the API key as well.

Figure 15:
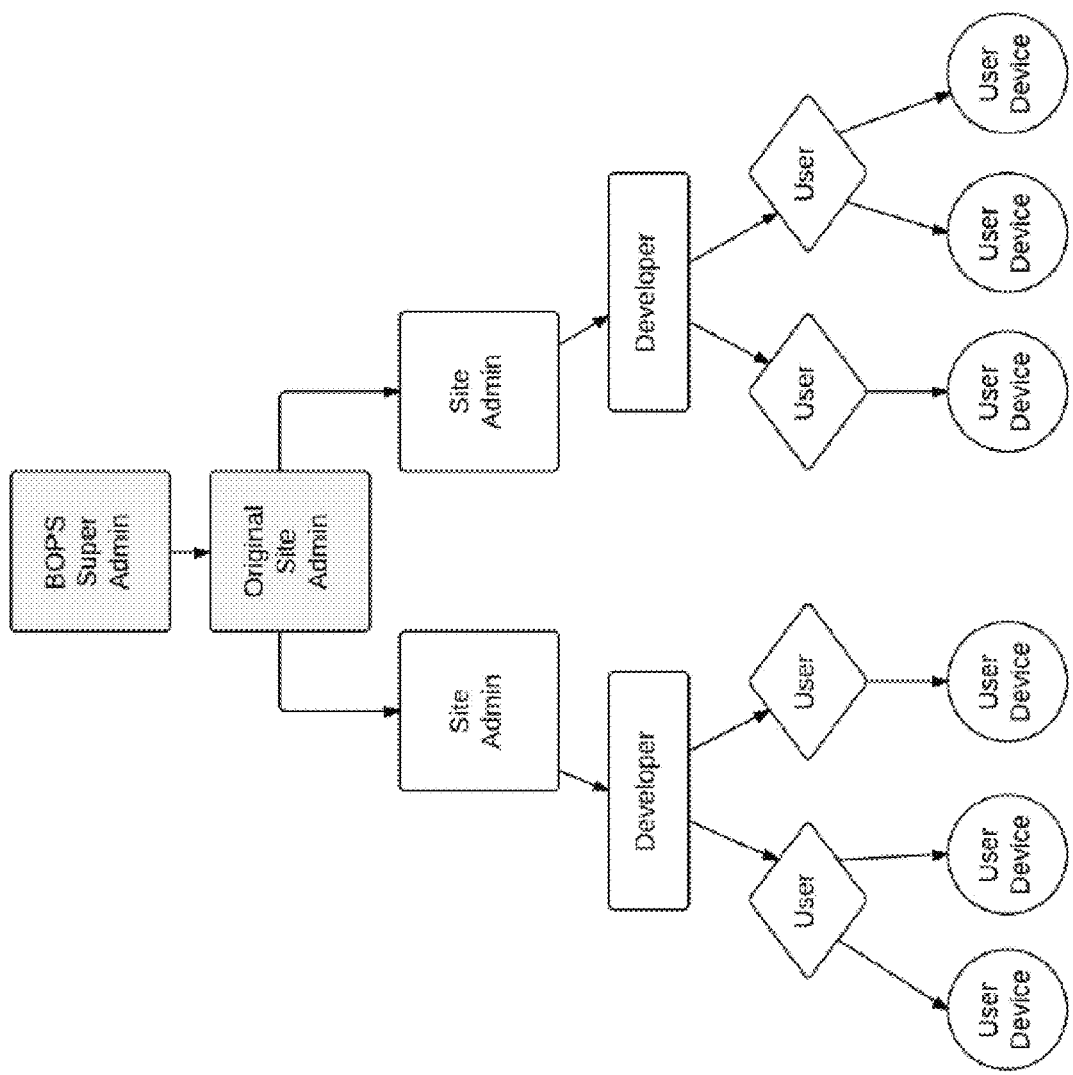
FIG. 15 illustrates an instance of a roles hierarchy in accordance with the present application.

Following completion of the Enrollment process, an original site administrator ("original site admin") can create additional site administrators ("site admins"). Enrollment information, including associated with various site admins, can be associated with a respective API key associated with an organization. In one or more implementations, the API registration can pertain to two domains: the enrolled original site admin; and the issued API key, which can be based on the Enrollment information, the organization, and the use case. After an application commencement is agreed upon, the registration process is complete. Thereafter, a BOPS admin creates an original site admin for an organization, and the original site admin may create a site admin (see, for example, the roles hierarchy chart shown in FIG. 15).

Prior to a development process that utilizes the BOPS service a developer preferably registers, for example, using options in a BOPS admin console. By providing an application name and using a question-oriented identification mechanism to identify the developer, a new account can be established, and an API key created, which would be identified with the application name and associated with the application.

In one or more BOPS implementations, communication between an application operating on a client device 104 and the BOPS server 102 is established on top of the two-way SSL/TLS. The Genesis processes establish such a connection and specify how users identify themselves to the BOPS server 102, such that the server 102 can generate a private key to set up the two-way SSL/TLS communication. Providing secret questions is one mechanism for users to identify themselves, which is an axiomatic approach and that respective parties (e.g., vendors) can provide a set of questions that uniquely describe an individual during the "Genesis" phase.

The client application operating on the user computing device 104 is responsible for providing a unique identifier (ID) that identifies the device 104 of the end user. The application can use the device 104 and the associated API to notify the BOPS server 102 about the link between the user and the user's device 104. 5-tuple is one such mechanism that can be used to identify devices 104.

In one or more BOPS implementations, respective RESTful calls and/or behavior usable for a system to defeat attacks and attack vectors is specified. Additionally, a format of requests to protect data in real time from known and unknown attacks is specified, and can be present in an IDS (via, for example, devices 112). For example, replay mitigation can be used in a cryptographic one-time token to validate access. In such case, the IDS is a third tier that verifies that the client 104 and server 102 are aware of each other, thus ensuring the server 102 is completely protected at the application layer.

Figure 16:
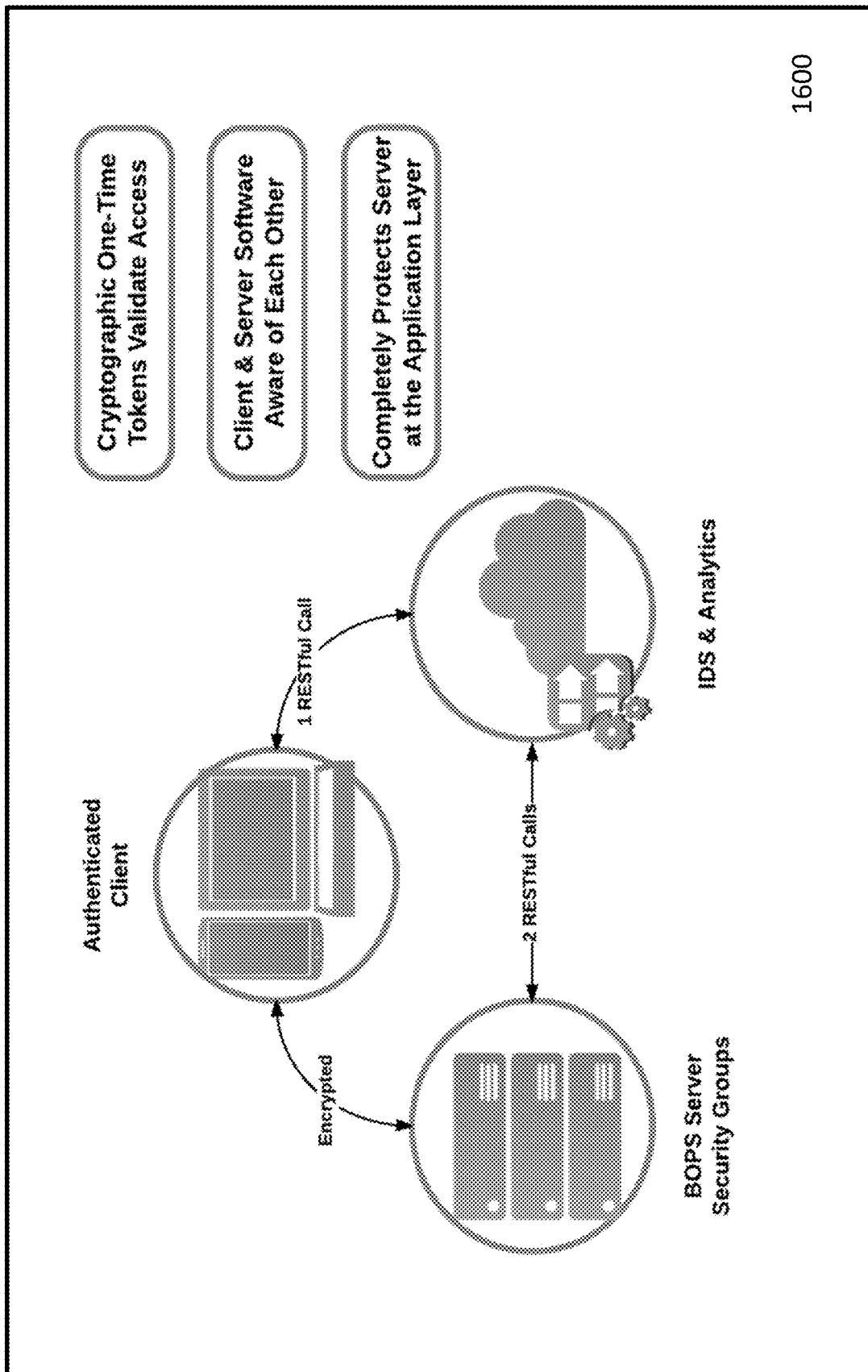
FIG. 16 is a block diagram illustrating devices and transmission flow in connection with replay prevention, in accordance with an example implementation.

FIG. 16 is a block diagram 1600 illustrating devices and transmission flow in connection with replay prevention. As shown in FIG. 16, cryptographic one-time tokens validate access and protects the server 102 at the application layer from International Standards Organization (ISO) Layer 7 cyberattacks, including replay, distributed denial of service (DDoS) and other attacks. The combination of the token and the IDS is useful to detect International Standards Organization (ISO) Layer 7 cyberattacks, including replay, distributed denial of service (DDoS) and similar attacks. The Token is valid for one use and is usually passed from the client 104, to the server 102, and then returned to BOPS using RESTful calls.

Figure 17:
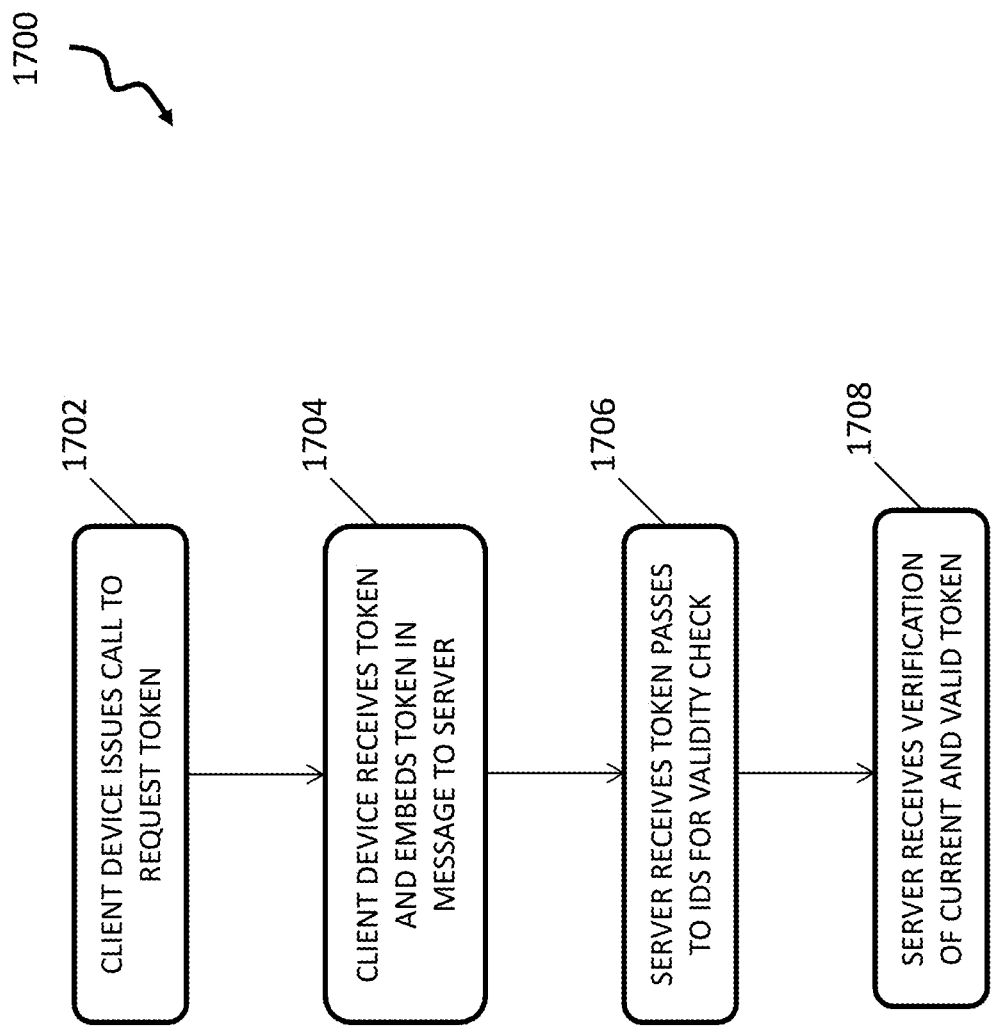
FIG. 17 is a high-level flow illustrating steps associated with a token's accordance with an example implementation.

A premise in one or more BOPS implementations is that for DDoS detection every token should be distinct, and at least one algorithm employed between the client and server takes into account that time may vary, and that the values must differ from client to client as well as access to access. FIG. 17 is a high-level flow illustrating steps 1700 associated with a Token's algorithm in accordance with an example BOPS implementation. At step 1702, during the Genesis step a web, mobile or embedded device (client device 104) issues a RESTful call to request a Token. The Token is then received and embedded in an encrypted message from the client 104 to the server 102 (1704). The server 102 receives the token and checks the validity of the message by passing the token to the IDS (1706), which then verifies that the token is valid and ensures the difference between the creation time and the current time falls within a specified 60 second time period (1708).

Figure 18:
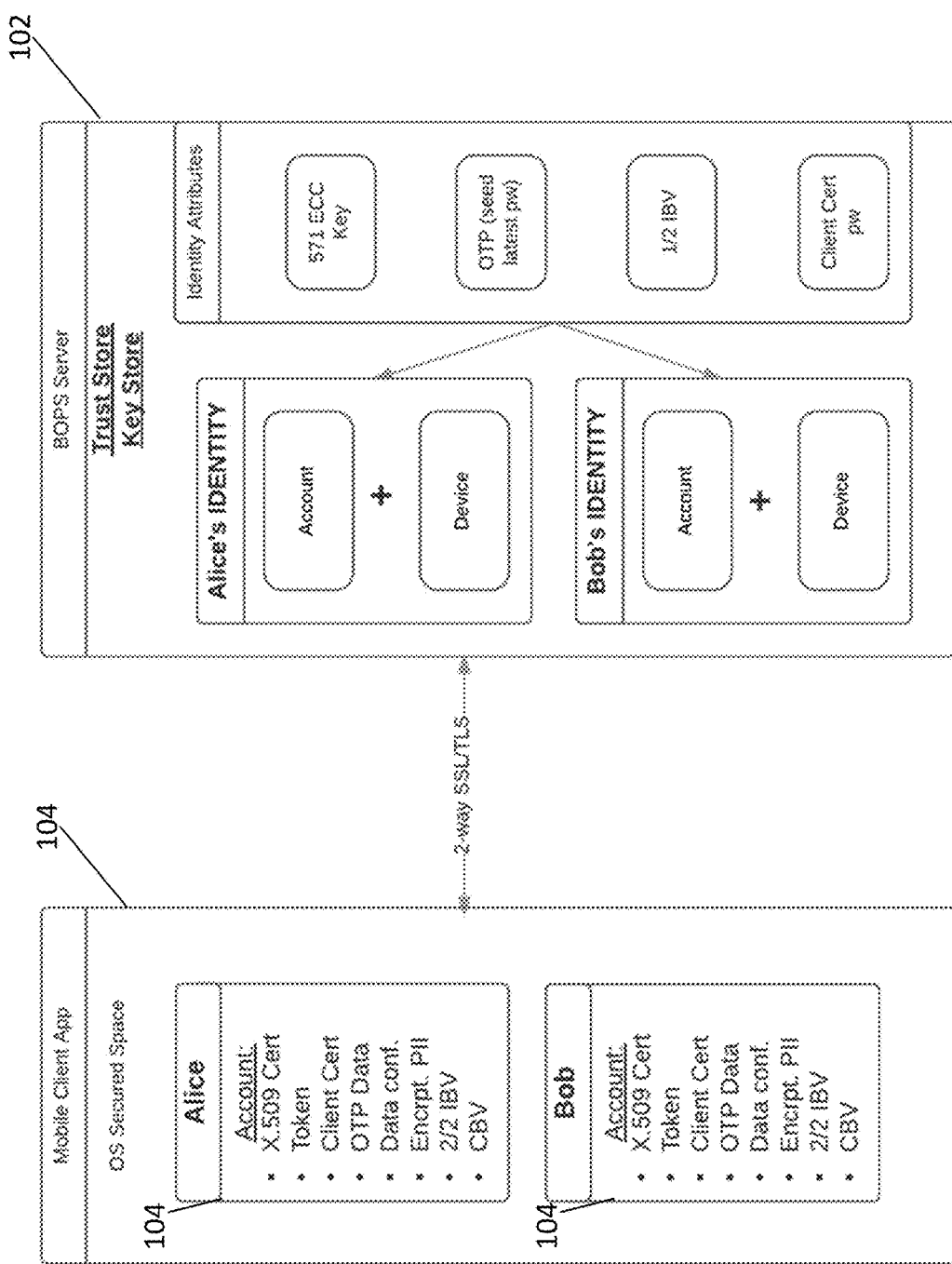
FIG. 18 illustrates example devices and features in connection with a Genesis process in a many-to-many relationship.

FIG. 18 illustrates products of Genesis/Enrollment and User/Device in a many-to-many relationship. On the mobile client 104, identity elements that are linked with each account are shown. On the server side of FIG. 18, the BOPS server 102 is illustrated as in connection with identity attributes, accounts, and devices in the relevance to each identity. To fulfill data encryption and secure client/server communication with a high level of assurance, identity information is in connection with secure elements through which users account (as an example, Alice's or Bob's accounts shown in FIG. 18) are properly authenticated as a function of their corresponding identities.

To initiate the Genesis step, the client device 104 may choose to establish a five tuple by specifying any or all of the respective values shown in Table 2, below. The IDS can determine any of the five values that are not set by the client and can return a Token to the client in a RESTful format. The client 104 and the server 102 share the same five tuple, which is then used to compute a timestamp which is, in turn, SHA512 encoded and compared by the IDS or BOPS server 102. The computed timestamp moves backwards to a time based on the 5 tuple and is unique for each call.

Accordingly, in one or more implementations the Token does not contain the timestamp itself, as all values in the Token are converted into a SHA512 sum for comparison. This allows the values to change on each minute value interval to prevent Blind replay. Moreover, the Token's minute range can be configured to be 3 (and not 60) to allow a sufficiently large entropy (48,771,072) and, therefore, prevent trial and error attacks.

In addition, a semantic engine can be configured to allow a security administrator to create additional custom parameters for attack detection and prevention that may be outside of any international standard and provide further checks and balances against a wide variety of attacks.

In one or more implementations, replay detection works off of a five tuple. The values, such as represented in Table 1 above, can be provided to the server 102. Alternatively, the server 102 can randomly select values. In accordance with replay, an acceptable range of values and the entropy is initially determined. If no values of the five tuple are specified during the Genesis step, the algorithm can use the following values.

TABLE 2

| VALUE | ENTROPY |
|---|---|
| Year 0 to Current Year (2016) | 2017 |
| Month 0-11 | 12 |
| Day 0-27 | 28 |
| Hour 0-23 | 24 |
| Minute 0-2 (The minute entropy is 3 so that the value will only be the same for 3 minutes which limits the number of concurrent attacks) | 3 |

Total Entropy = 2016 * 12 * 28 * 24 * 3 = 48,771,072

In accordance with an example implementation, an algorithm is executed that rotates backwards. If a respective month is less than or equal to the current month, then the year may be equal. Alternatively, if the month is greater than the current month, then the year must rotate back. These two cases illustrate the algorithm.

TABLE 3

| GMT = 2016-08-10 15:30 | | |
|---|---|---|
| | Genesis | Value |
| Genesis Example 1 | | |
| Year | 5 | 2011 |
| Month | 11 | 11 |
| Day | 4 | 8 |
| Hour | 6 | 12 |
| Minute | 2 | 28 |
| Genesis Example 2 | | |
| Year | 5 | 2015 |
| Month | 4 | 4 |
| Day | 4 | 8 |
| Hour | 6 | 12 |
| Minute | 2 | 28 |

Since Example 1's current month is 8 (August) and the Genesis value for month is 11, and 11>8, we then scope the year down on an interval of 5 and the year becomes 2011. The remaining values are multiples of the Genesis that are less than the actual date value.

In connection with the second example using the same current date and time, the current month is 8 (August) and the Genesis value for month is 4 and 4<=8. The year is scoped down to an interval of 5 which is equivalent to 2015. Thus, the year becomes 2015 and the remaining values are multiples of the Genesis that are less than the actual date value.

In one or more BOPS implementations, various levels of data privacy can be provided and each can include encrypted biometric information in order to preclude someone from resetting and/or compromising the biometric information. One privacy level can define that all non-biometric data is stored (passivated) in plain text. This simplifies reporting and analytics of usage patterns and authentication records, and can include other factors, such as non-repudiation, location, date and faceted search. For example, with relative ease one can see a number of failed authentication attempts in Cleveland during June of 2016, and information relating to individuals and devices can be provided. This first privacy level can be achieved as a function of sophisticated tools that operate on plain text passivated data. Another and higher level of privacy can define that all non-biometric data is stored in encrypted format but does not require a separate decryption key per clients. Thus, client devices 104 can be configured to use the same decryption key, which is considered safer than the previously described first level of privacy in that an insider may not have access, or most likely does not have, access to the decryption key. Yet a higher level of privacy can require that all non-biometric data is stored in encrypted format and the decryption key is unique per each identity. This provides increased privacy and separation, as each user's data are encrypted with a key associated with a biometric. At high levels of privacy, it is envisaged herein that user data, including, for example, personally identifiable information ("PII"), is always encrypted on the client devices 104, except perhaps at the moment when the match occurs in-memory. In one or more BOPS implementations, a user authenticates to authorize the transaction and authenticate in order to decrypt user data (e.g., login credentials, files, or the like). Moreover, data at rest, (e.g., passivated data) are encrypted on the server computing device 102 and on the client device 104 at all times. Plain text data preferably exists only in memory at time when a match process is occurring.

In one or more BOPS implementations, open platforms are provided to enable virtually any customization for Genesis flow. Some examples of Genesis can include a username and password access to ACTIVE DIRECTORY, a validating email or text message, or an individual's identify can be physically verified, such as a function of a driver's license, a birth certificate, a passport, a social security number or other suitable credential.

Pre-registration of user account can occur in a batch process that implements business rules, and organizational policies and procedures can contribute to those business rules. Business rules can be integrated with an access management platform, which organizes users into groups or directories determining the level of the privileges and other attributes that would suit some particular needs in the roles administration. This provides flexibility to allow developers to construct formulations of member profiles (e.g., a user profile, admin profile, manager profile, and a super admin profile), which can be applied as input of a member definition accessed by a BOPS server 102. The Genesis process in accordance with the present application can form a full dependency on risk management and, accordingly, determine downstream processing.

Figure 19A:
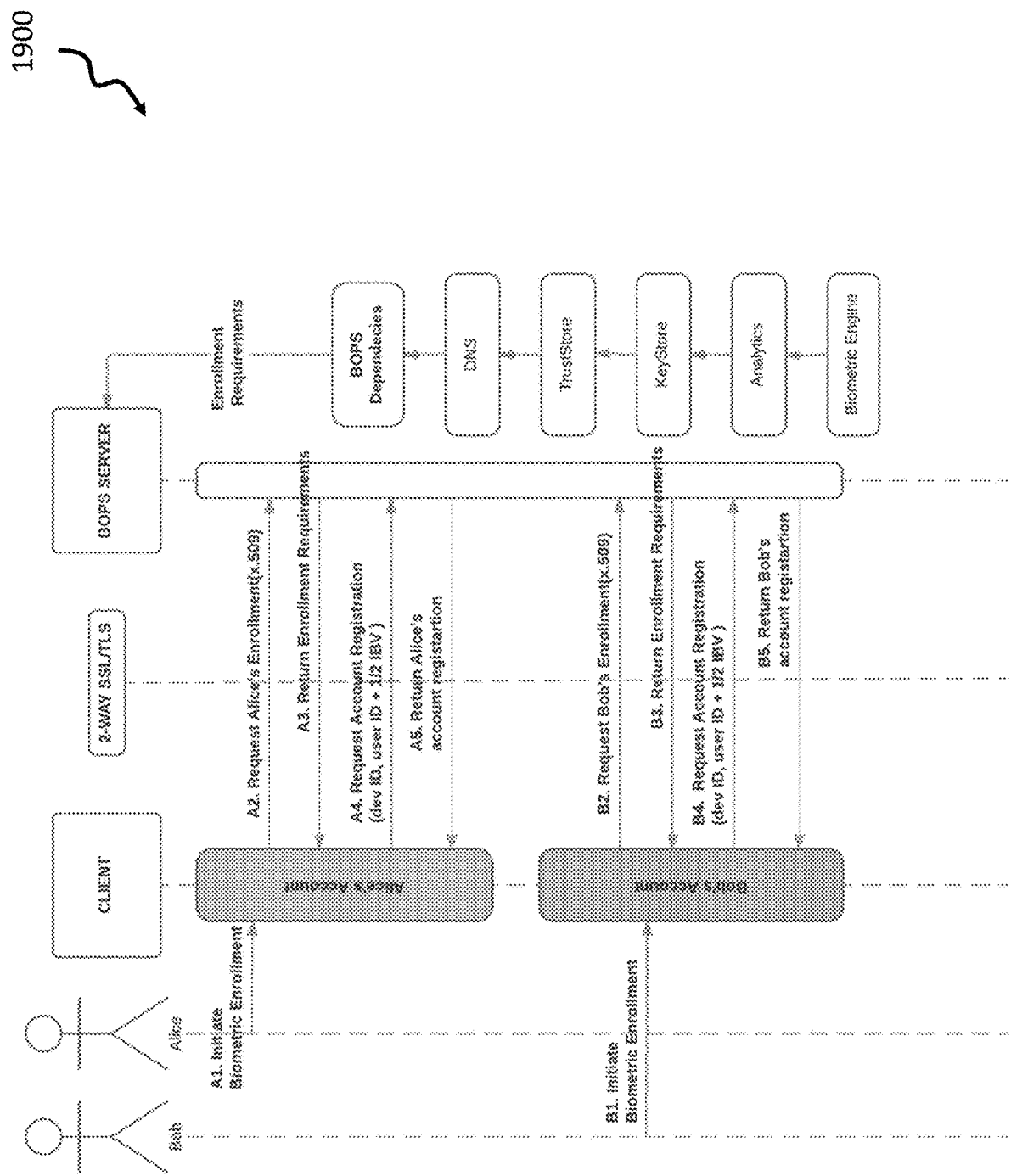
FIG. 19A depicts multiple users initiating an example enrollment process on a single client device.

FIG. 19A depicts devices and steps 1900 associated with multiple users initiating Enrollment on a single client device 104. The relationship between user and device 104 can be "many-to-many" (M:M). First Enrollment steps can be added (A1, Initiate Biometric Enrollment, A2 Request Enrollment (x, 509), A3 Return Enrollment Requirements, A4 Request Account Registration (dev ID, user ID+½ IBV), A5 Return Registration). These steps can be repeated for a second user (B1-B5). Many-to-many relationship can occur as a function of a separation of Genesis and Enrollment. Moreover, the identified subject through Genesis may enroll many times with many biometrics. To initiate client/server communication users capture his or her biometrics on the client device, which brings into a motion Enrollment process of a unique client certificate issued for the client device. Once the security part of Enrollment is done, registration of user's biometric information comes in place, which concludes the Enrollment process. A user may have many devices (clients), a device (client) may have many users. A device (client) may support many biometrics.

Figure 19B:
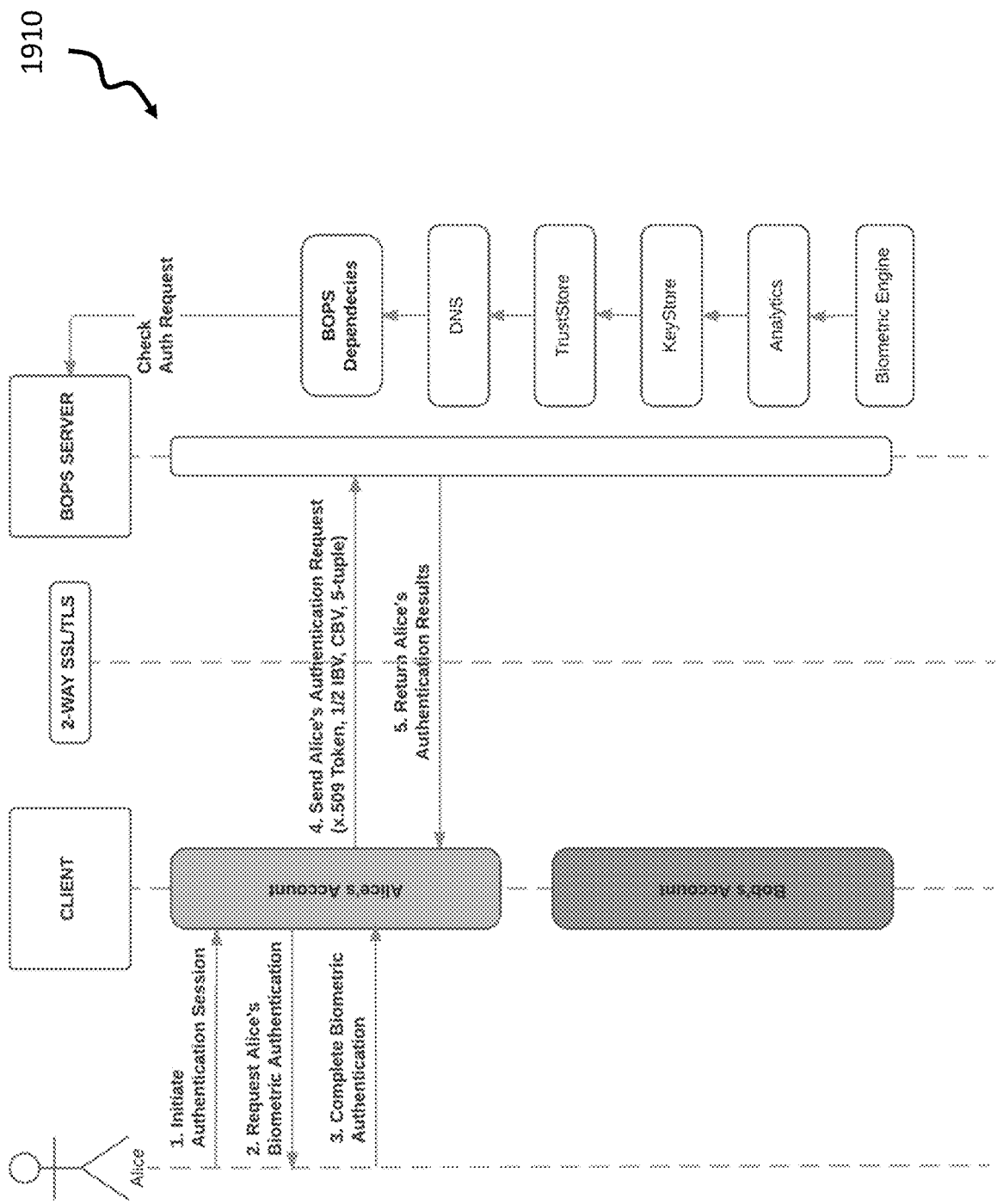
FIG. 19B illustrates one example user initiating an authentication session from a client device, which stores information regarding multiple user accounts.

FIG. 19B illustrates devices and steps 1910 in connection with one example user, Alice, initiating an authentication session from a client device 104, which stores information regarding multiple user accounts. In the example shown in FIG. 19B, Alice starts the authentication session (1), and the application operating on the client device 104 requests biometric authentication (2). After biometric authentication is complete (3), the application operating on the client device 104 configures the device 104 to send Alice's identity attributes via TLS (4). Thereafter, the BOPS server 102 processes the authentication request considering integrity of all Enrollment elements, and returns the results (5).

With reference to the example shown in FIG. 19B, in the even that Alice mistakenly initiates the authentication session using Bob's account, the client device 104 does not render any request to the server because CBV would be different from the IBV that was created during Enrollment, and authentication would not succeed.

Figure 19C:
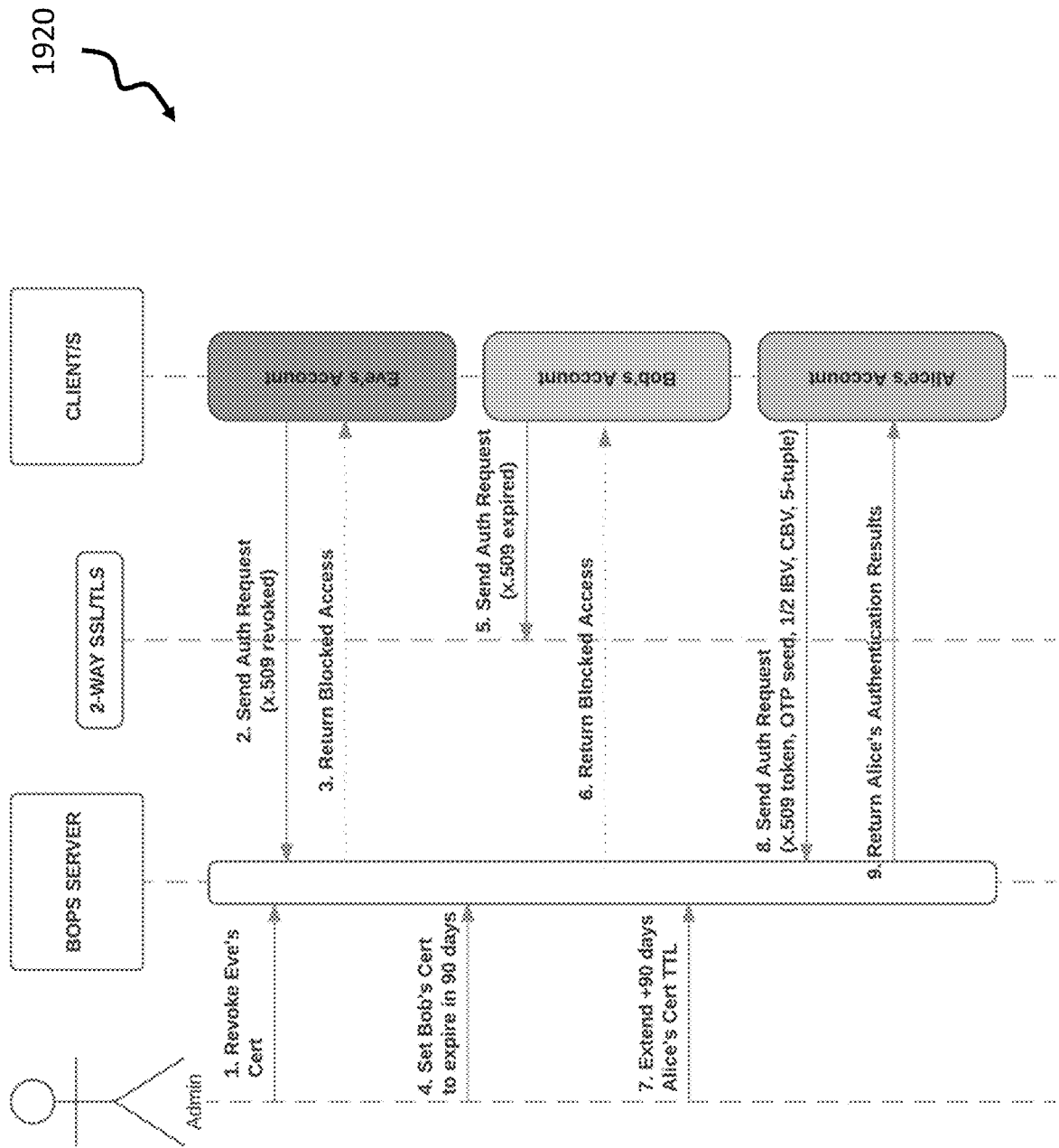
FIG. 19C illustrates example steps associated with revocation of a user's account.

FIG. 19C illustrates example devices and steps 1920 associated with revocation of a user's account. In the example shown in FIG. 19C, information associated with three users (Eve, Bob and Alice) is shown. One or more revocation rules can be defined by a user, such as via an admin console that is configured with an administrative graphical user interface. Roles associated with an administrator (who can be similarly biometrically authenticated) can be responsible for implementing rules. In the example shown in FIG. 19C, Alice's account has an active certificate, Bob's account has an expired certificate that gets blocked on the Transport Security Level, and Eve's account has been revoked by the BOPS admin. More particularly, after Eve's certificate had been revoked via the BOPS server 102 (1), an authentication request is received from a client device 104 associated with Eve's account (2). The BOPS server 102 returns a message or other suitable content representing that Eve's access is blocked (3). With regard to Bob's certificate, a 90-day period is defined, after which Bob's certificate expires ("TTL") (4). Thereafter, an authentication request is received from the client device 104 associated with Bob's account (5) and, similar to Eve's case, a message or other suitable content representing that Bob's access is blocked is transmitted by the BOPS server 102 to the client device 104 (6). With regard Alice's account, an additional 90-day period extension period is provided (7), and an authentication request is received from the client device 104 associated with Alice's account (8). The BOPS server 102 returns a message or other suitable content representing authentication results, such as shown and described herein, that Alice is authenticated (9).

One of the problems that is resolved in connection with the modules shown and described herein is prevention of replay attacks. In one or more implementations, for DDoS detection, every token, which is typically an identifier that links the profile on the server to an identity in the Common Name (CN) field, is distinct. An algorithm between a client 104 and server 102 takes into account that times can vary, and that the values must differ from client 104 to client 104, as well from access to access.

In one or more implementations, certificate distribution works as follows. An X.509 certificate is pre-loaded on a client device 104, including as a function of application software installed on client device 104. Prior to the Genesis process, the client 104 establishes a 5-tuple value by specifying any or all of the tuples (as shown and described herein). During the Enrollment process, the client 104 issues a RESTful call to request the Token from the BOPS server 102. When the Token is received, it's embedded in the client's encrypted message to the server. The server receives the token and checks the validity of the message by ensuring the difference between the creation time and the current time falls within a specified 60-second time period. The server 102 determines which of the 5-tuple values are missing and returns the Token to the client in a RESTful format. The client 104 and the server 102 share the same 5-tuple value, which is then used to compute a timestamp which is, in turn, SHA512 encoded and compared by the IDS, for an example as a function analytics. For example, and as described herein, the computed timestamp moves backwards to a time based on the 5-tuple and is unique for each call.

The present application can configure a length of time for a client certificate to remain valid (Time-to-Live or TTL). Revoked certificates of authenticated users can be silently replaced with new certificates. Thus, TTL is a "belt and suspenders" approach, which works in a conjunction with IBVs and CBVs to support user authentication. Token revocation can also be conditional to a user role and other factors to serve particular business needs for authorization. For example, a certificate can be blocked after 1 or x number of failed authentication attempts for a financial transaction, such as in case condition y and/or z are not met.

Figure 20A:
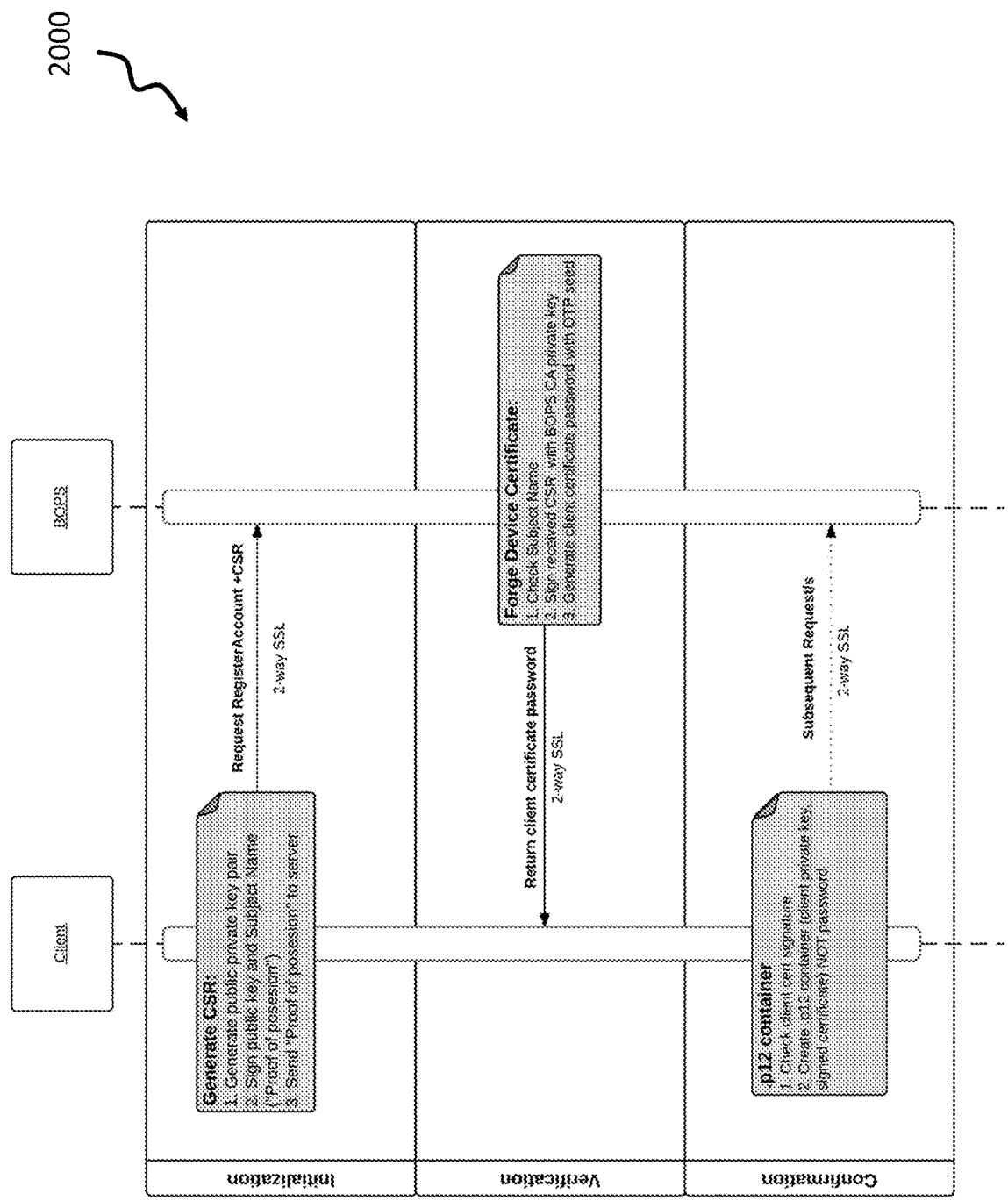
FIG. 20A is a simplified diagram that demonstrates steps associated with initialization, verification and confirmation of a client certificate between a client device and a BOPS server.

FIG. 20A is a simplified diagram that demonstrates steps 2000 associated with initialization, verification and confirmation of a client certificate between a client device 104 and a BOPS server 102. Steps associated with processing a client signing request ("CSR") can include generating a public-private key pair on the client device 104, signing a public key and a subject name (referred to herein, generally as performing "Proof of possession") which is transmitted to the BOPS server 102. As noted herein, the client sends a Register Account request using 2-way SSL. After checking the certificate's Subject Name, signing the client request with the BOPS Certificate Authority (CA) private key, and generating the client certificate's password with the OTP mechanism, the BOPS server 102 returns a client certificate password to the client device 104. The registered client checks certificate signature and creates a .p12 container to store client private key and signed certificate, but not the password. Preferably, passwords are never stored on client devices, because the OTP mechanism generates a one use password for each client request.

Figure 20B:
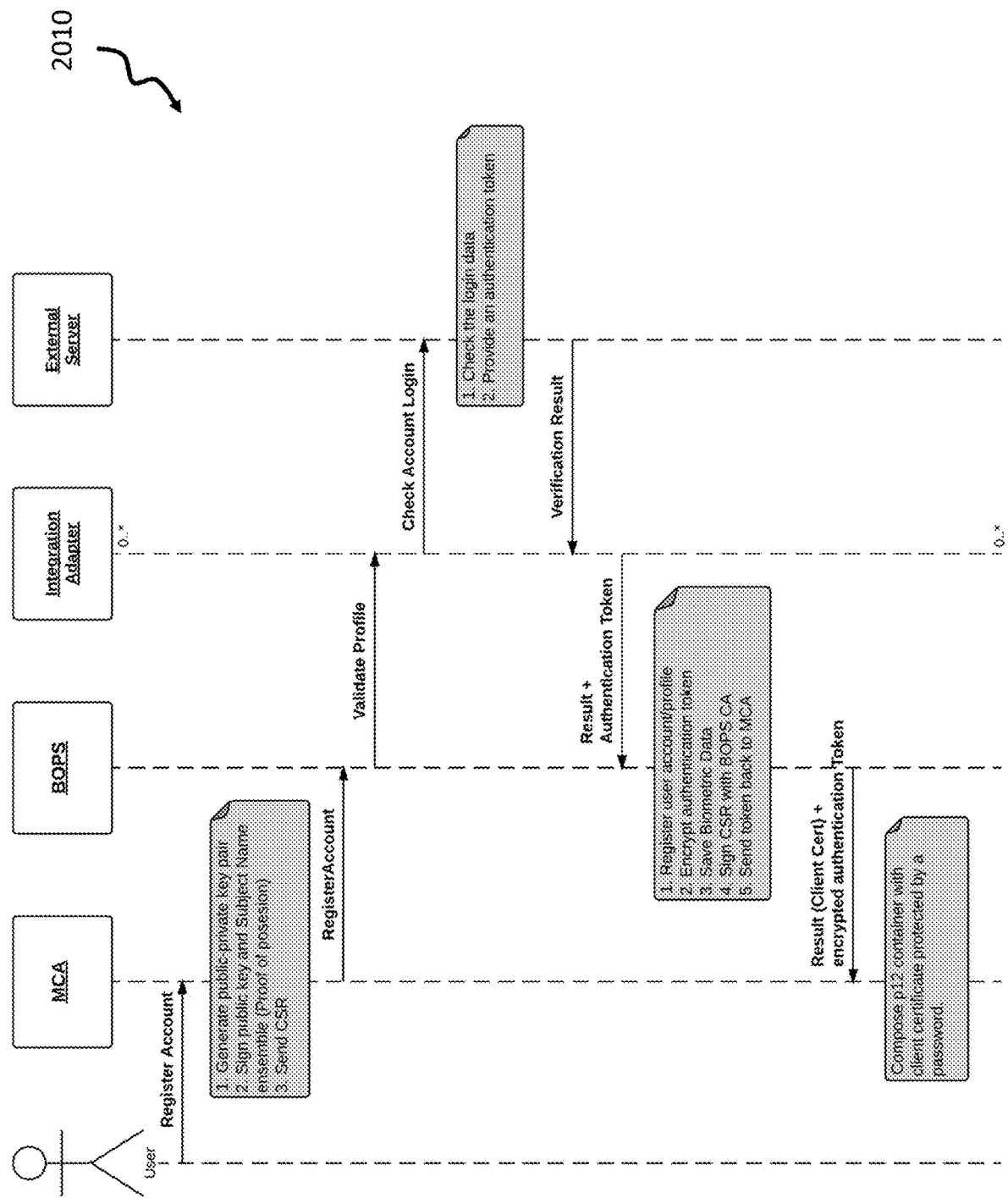
FIG. 20B illustrates an example client certificate registration in connection with a third-party server and BOPS server.

FIG. 20B illustrates a client certificate registration process 2010 in the third party server and BOPS integration example. The CSR process, for example as shown in FIG. 20A, is demonstrated broadly, and starting with user enrollment. In the example shown in FIG. 20B, "register user account" is used to describe steps associated with Genesis and Enrollment, and a client certificate represents an identity attribute, while an account represents an Identity Component.

In the example implementation shown in FIG. 20B, after a user initiates the Enrollment process and sends his/her biometric information with the account registration request to a BOPS server 102, a key pair/CSR generation is triggered on the client 104. Once a Register Profile request is received, the BOPS server 102 sends it further to an Access Management Adapter (which can be an access management solution/platform utilized by a third party enterprise), as shown in FIG. 20B representing profile validation, and then further to a third party server for Account Login verification and validation. The third party server provides an authentication token after validating the login data, then sends verification results back to the Access Management Adapter, which turns authentication results and authentication token back to BOPS server 102 to complete account/profile registration. The BOPS server 102 encrypts authentication token, stores biometric data, signs CSR with BOPS CA, sends encrypted authentication token to the client application. This represents an example implementation and integrated with an enterprise (e.g., a bank) that already has billions of accounts accumulated in its repository, for a higher degree of verification as a function of a biometric authentication.

Figure 21:
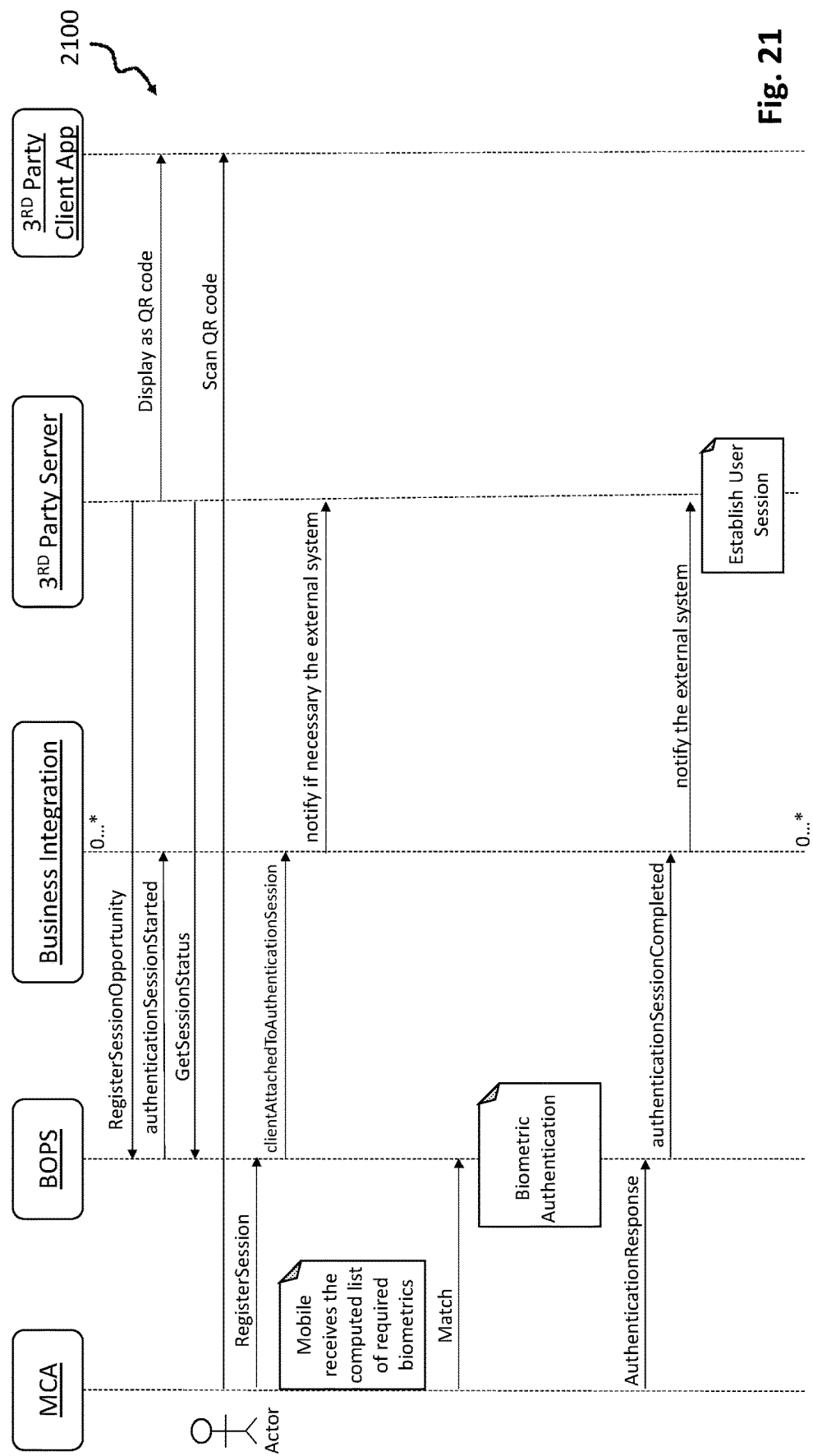
FIG. 21 illustrates an example QR code authentication flow, in accordance with an example implementation of the present application.

In one or more implementations, a quick response code (QR code) can be used to trigger execution of one or more modules shown and described herein. For example, a business partner (e.g., a bank) login page can be configured to display a QR code image that contains a respective session opportunity identifier. An MCA executing on a client computing device 104 can execute one or modules (e.g., an authentication wizard) to scan the QR code, register the session to signal that it is attached to the session, and authenticate with the user's biometrics in accordance with the teachings herein. FIG. 21 illustrates an example QR code authentication flow 2100, in which a third-party server registers a session opportunity with a BOPS server 102 and, in response, information usable for a new authentication session can be provided by the BOPS server 102 to the $3^{rd}$ party server, and the information can be provided (e.g., displayed) within an QR code. The $3^{rd}$ party server can transmit one or more requests for session status information. A user (designated an "actor") in FIG. 21 scans the QR code and registers a session with the BOPS server 102, which may notify an external $3^{rd}$ party server. Upon biometric authentication, as such as shown and described herein, a user session can be established, including with the $3^{rd}$ party server.

In one or more further implementations of the BOPS servers described and detailed herein, the BOPS server is used to implement a secure user identity model that provides authority-based issuance of claims and eliminates the need for 3rd-party identity providers during authentication. The described user identity model leverages blockchain technologies to assure exchange of verifiable credentials without the necessity of trusting sensitive biometric data to third parties. For example, the multiple cryptographic shares described in reference to FIG. 14 (and potentially redundant shares thereof spread across alternate off-chain storage (like a portable hard disk drive, mobile device storage, IPFS, Dropbox, Google drive, AWS, etc.) are retrieved by the BOPS servers. These encrypted shares are provided to the BOPS server such that user's verifiable credential is used as part of the verification system. The combination of at least two identity technologies (DID and BOPS) allows for the independent, platform agnostic, verification of a user's existence. Here, by integrating biometric-based protocols in an enrollment and authentication process, users are guaranteed to link a digital identity to a real-world physical presence. Additionally, the user has complete control over this digital identity. The user can add more data to this digital presence, or ask others to add additional information, or reveal some or all the data depending on the context. Moreover, users can record their consent to share data with others, and easily facilitate such sharing. Thus, the digital identity described herein is persistent, portable, and does not rely on any single third-party authorization or validation for its utility.

Figure 22:
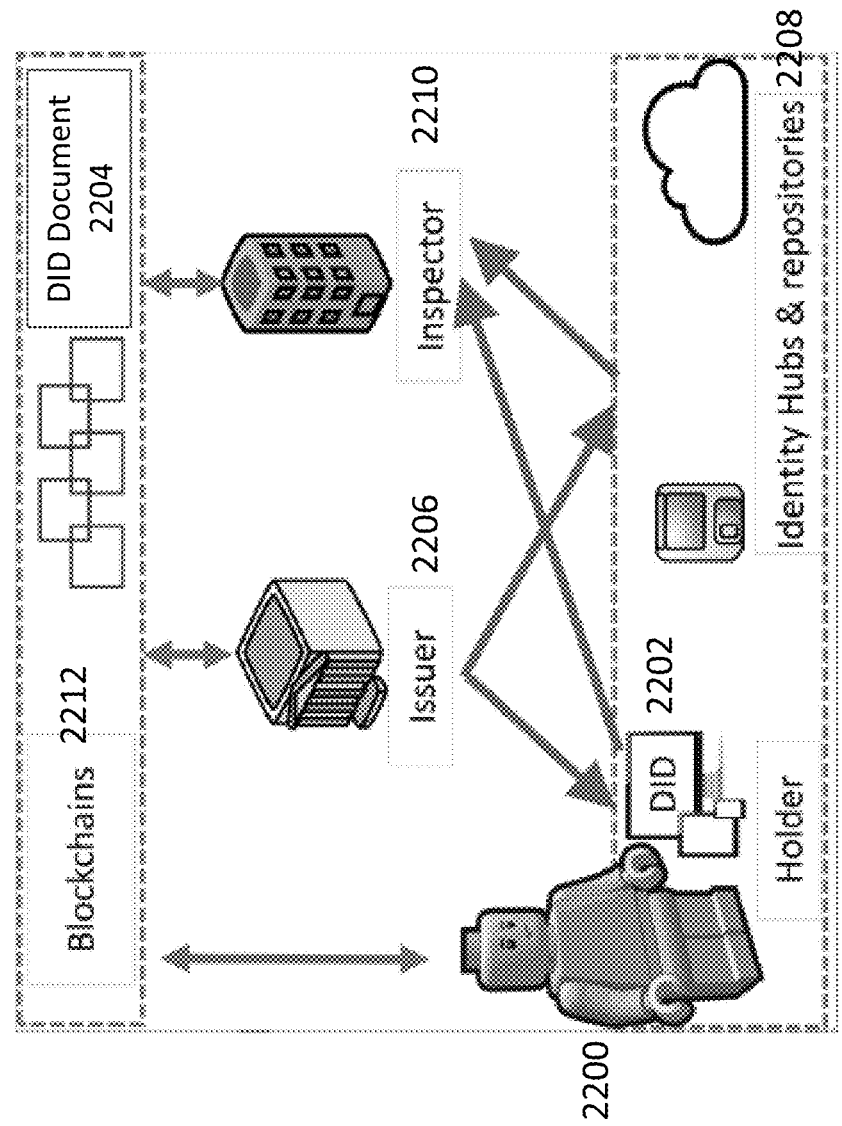
FIG. 22 illustrates an exemplary devices and features in connection with as authentication process using distributed ledgers and identity hubs.

With particular reference to FIGS. 22-25, a secure user identify model is implemented as a process or method for securely exchanging biometric credentials using the BOPS standard. Turning now to FIG. 22, the Biometric Open Protocol Standard (BOPS) discussed herein is implemented in a decentralized secure user identity model to provide users with control over the storage and use of their authentication and identity data.

As a brief aside, those possessing an ordinary level of skill in the requisite art will appreciate that the described BOPS protocol can be extended to a combination of on-device (e.g. FIDO UAF compatible), server-side or a multi-distribution models that utilize remote storage and a distributed authentication processes to permit user control over authentication. The foregoing explanation are for ease of description only and are not intended to limit the additional approaches that are enabled by the integration of the BOPS standard and one or more distributed ledger technologies. Indeed, the in one particular configuration, the BOPS standard allows for off-device biometric credentials to be used to participate in authentication challenges and other network-based identity verifications. However, in one or more further implementations, biometric data used for authentication is distributed by BOPS servers to decentralized storage locations as well as being persisted to one or more distributed ledgers using blockchain technology so as to provide cryptographic based assurances that biometric data is secure and tamper resistant.

As shown with continued reference to FIG. 22, a user 2200, such as an end user (or simply "user"), is someone that retains control over the user's respective identification and/or identity data. In one non-limiting example, users 2200 are students, employees, customers, and others. However, in alternative configurations, a user 2200 can designate a holder (for example BOPS server 102) to maintain control over the user's respective identification and/or identity data. For example, a holder can be one or more services, companies or institutions that have permission from a user 2200 to engage in identification-based transactions on their behalf. In one or more implementations, permitted holders include web services, mobile apps, or native applications installed on a user's personal devices (e.g. client device) or accessible therefrom. As used herein, holders generally refer to any entity that receives decentralized identification information, accesses stored decentralized identity information, and/or provides such decentralized identity information to resource access providers in exchange for access to resources. In one particular implementation, the BOPS server 102 previously described is configured to function as a holder for various users 2200.

Each user 2200 that seeks to enroll with an access control platform or identity authorizer, provides a variety of biographic and/biometric data as part of the enrollment process. As such, a collection biographic and biometric data can be thought of as a digital representation of the user's identity. In one particular implementation, such a collection of biographic and biometric information is encapsulated or packaged as a portable file or data structure. In one non-limiting implementation, the DID Document 2204 functions as a portable container or file for such biographic and biometric information. In one or more implementations, the DID Document 2204 is a data file, container, code or digital document that contains at least the metadata needed to interact with a remote authentication system that seeks to confirm a user's identity. In yet a further example, the DID document 2204 is a single JSON object. In yet a further implementation, the DID document 2204 is a JSON object conforming to RFC7159 specification. In one or more non-limiting implementations, a DID document 2204 described herein can include authentication and authorization information. In a particular configuration, the DID Document 2204 does not contain personally identifiable information (PII).

In a particular configuration of the systems, methods and computer products described herein, a verifiable credential is stored off of the blockchain and includes at least one or more authentication data sets or values, in addition to other personal information or credentials. In a particular configuration, the authentication data set includes a set of mechanisms that may be used to authenticate a user to an authentication system (e.g., public keys, biometric templates, or even encrypted share of biometric data). Additionally, the authentication data set included in a DID Document 2204, in one configuration, encompasses authorization information that outlines which entities may modify the DID Document 2204. For example, where a user has given a holder permission to alter the user's DID Document 2204, the DID Document 2204 itself will include data indicating such authorized users. Furthermore, the authorization data can also include a set of service endpoints that are used to initiate trusted interactions with an entity, such as a service provider.

Figure 25:
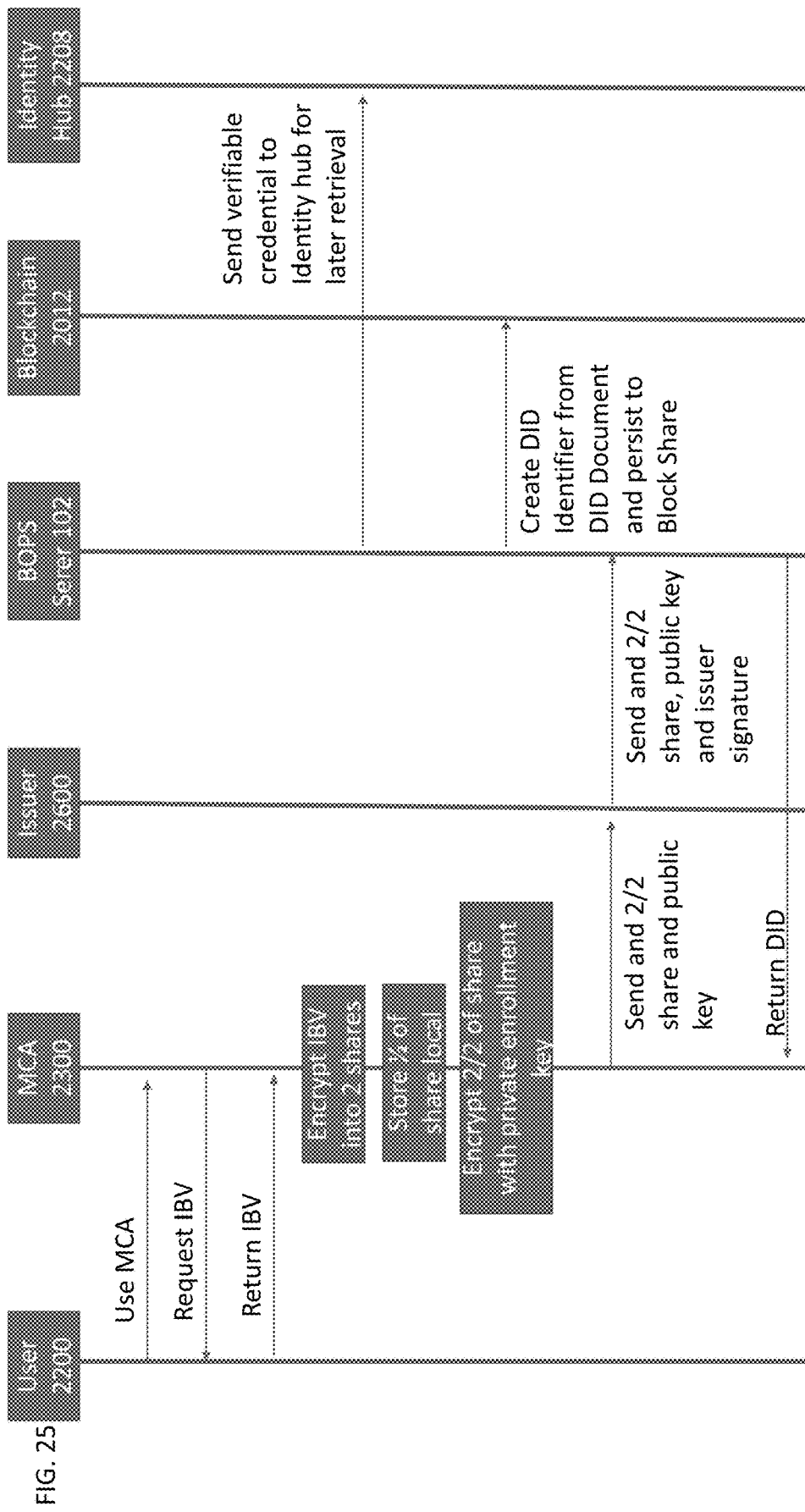
FIG. 25 is simplified diagram that demonstrates steps associated with enrolling a user with an identity provider.

As further shown in FIG. 22, an issuer 2206 is an entity that creates the DID documents 2204. For example, an issuer 2206 is a server or processor that is configured, by code executing thereof, to generate the DID Document 2204 in response to a request from a user 2200 to enroll in an identity model. In one implementation, the issuer 2206 receives information about a prospective enrollee (e.g. biographic and biometric information) and transforms that received information into a DID document 2204. However, as shown in FIG. 25, the issuer 2206 itself can delegate the processor generating the DID Document 2204 to a holder system or server, such as a BOPS server 102.

While any entity can be an issuer 2206, including the holder, some additional examples of issuers 2206 include corporations, governments, non-profits and/or individuals. The issuer 2206 in one or more configurations, transmits the generated DID identifier 2202 and/or DID document 2204 it to a holder. In a further implementation, the Issuer 2206 transmits the generated DID document 2204 to an identity hub 2208.

With continued reference to FIG. 22, a verifiable credential has been generated, it is stored in a secure location for further use. For instance, the verifiable credential is stored in one or more identity hubs and repositories 2208. Here, identity hubs and repositories 2208 are secure personal data repositories where the verifiable credential are stored and retrieved. For example, identity hubs and repositories 2208 are one or more local or remote access data storage devices that are accessible to the user 2200, holder 102 or Issuer 2206 in order to store, modify or retrieve verifiable credential. Likewise, identity hubs and repositories 2208 relay or transmit messages and data to one or more Inspectors 2210. In one or more implementations, the identity hubs 2208 are configured as a database or storage system, flat file system, relational database, or bulk storage facility accessible by a user 2200 or holder 102. For example, an identity hub can include Dropbox, Google drive, AWS, Storj, and other similar "cloud" based storage facilities.

In a further arrangement, the issuer 2206 (or holder 102) also generates a decentralized identifier (DID) 2202 that provides a reference to the DID Document 2204. Here the DID identifier 2202 is a unique identifier that allows for the retrieval or access of a DID Document 2204 without providing a third party with direct access to the personal information referenced by the verifiable credential. In one non-limiting implementation, a DID identifier 2202 is composed of a unique bits, numbers, values, strings or sequences that are the result, at least partially, of cryptographically hashing a user's identity information contained within the DID Document 2204. In further implementations, the DID identifier 2202 is a text string, a number sequence, an alphanumeric or hexadecimal sequence or any combination thereof. Furthermore, such combinations can be embodied in one or more data files, modules or code snippets. In yet a further configuration, the DID identifier 2202 is a URI scheme conformant with RFC3986. For example, the DID identifier 2202 consists of a unique string sequence followed by an optional path and/or fragment. For instance, the issuer 2206 generates the DID identifier 2202 by hashing the authentication information stored in a DID Document 2202. In an alternative configuration, the DID identifier 2202 is a unique value that corresponds to the hashed value of the contents of the DID document 2204 and the storage location of the DID Document 2204.

Upon generation of the DID identifier 2202, a transaction record that contains the DID is added as a transaction to one or more distributed ledgers 2212. Unlike the DID Documents 2204, the DID identifier 2202 itself is thus not stored in the identity hub 2208. Instead, the DID identifier 2202 is stored as a transaction in a distributed ledger or blockchain. Storing the DID identifier 2202 as a transaction in a distributed ledger functions as an immutable index of the DID Document 2204 as well as an immutable record of the contents of the DID Document 2204 at the time of DID identifier 2202 generation. Because the DID Document 2204 and the DID identifier 2202 are cryptographically linked, the DID identifier 2202 when added as a transaction record to a distributed ledger 2212, provides an audit trail of permitted exchanges between the issuer 2206, the holder/user 2200, and any third party wishing to verify the user's identity (e.g. an inspector 2210).

Without being limited to any particular implementation or configuration of distributed ledger techniques, implementations or specifications, the use of the term "blockchain" refers to one or more technologies that provide a publicly transparent and decentralized ledger that tracks and stores digital transactions in a publicly verifiable and secure configuration in order to prevent tampering or revision to the underlying identity data. In one particular implementation, the blockchain or distributed ledger 2212 is a database organized as a public ledger configured to maintain a continuously growing list of data records. Here, entries to the ledger form a blockchain by recording and connecting data records through the use of hashing. For example, every time a new transaction is added to the blockchain (e.g. a new DID identifier 2202) the new block includes a hash of a prior block. In this manner, each additional block creates additional security for the validity of the entire blockchain. Each block records and confirms the sequence and timing of transactions as they are created and/or recorded. Thus, in a particular implementation, the DID identifier 2202 is stored as a transaction on the blockchain. In a particular implementation, the holder or issuer generates a DIDs identifier 2202 upon receiving notification that a user (or holder) has provided information to enroll into an authentication platform.

Where a user 2200 seeks to access protected resources, the Inspector/Verifier 2210 (which controls access to such protected resources) requests claims in the form of DIDs 2202 from the user or a holder representing the user in order to give the user 2202 access to the protected resources. The inspector 2210 verifies that the credentials provided in support of a user's identity (e.g. the DID identifier 2202 and in the DID document 2204) are fit-for-purpose and checks the validity of the DID identifier 2202 in the blockchain 2212. By way of non-limiting examples, the inspector 2210 can include systems and servers maintained and provided by employers, security personnel, and websites.

Figure 23:
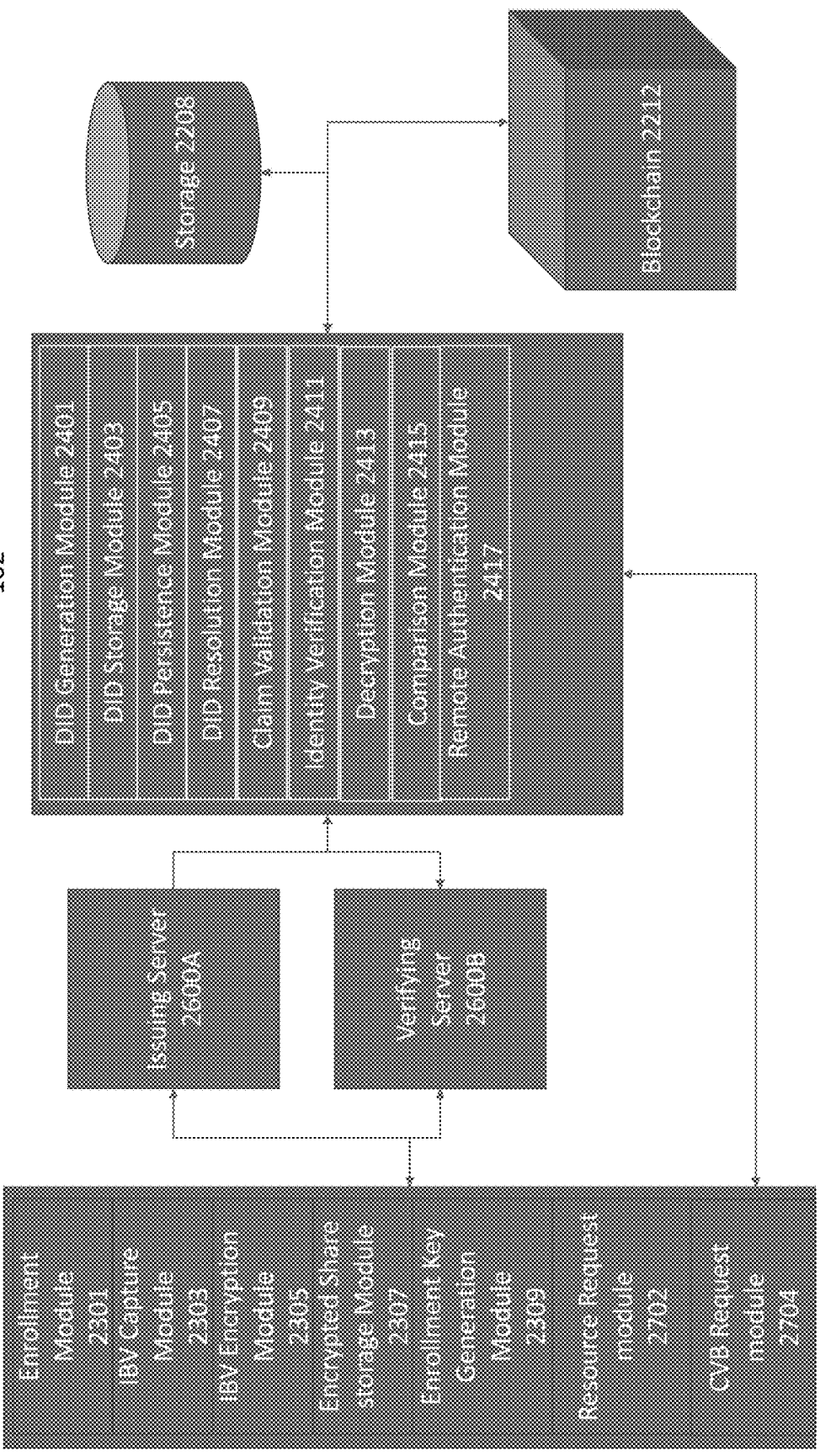
FIG. 23 is a block diagram that depicts devices and connections between users and authentication providers in an enrollment and resource access processes.

Turning now to FIG. 23, in one or more particular implementations of the systems, methods and computer implemented products described herein, one or more BOPS servers 102 are configured to act as a holder of biometric shares (as described previously) and enroll a user with a service provider. Turning to the flow diagram of FIGS. 23 and 24, as well as the block diagram of FIG. 25, a user 2202 enrolls with an issuer 2206. Here, a user (via a browser user-agent) is prompted by the user device 2300, or a software application thereof e.g. MCA, configured by one or more enrollment modules 2301 to enroll the user's biometric information with a service provider acting as an issuer 2206. In a particular implementation, the user device 2300 is configured by an IBV module 2303 to capture an initial biometric vector (IBV) of the user (e.g. some biometric data), as shown in step 2103.

In a further implementation, the captured biometric vector (IBV) is encrypted into at least two shares while still local to the user device 2300, as shown in step 2105. For example, the user device 2300 is configured by encryption modules 2305 to visually encrypt the IBV into two (2) or more shares. Here, at least one of the encrypted shares of the encrypted IBV is reserved on the local mobile device, as shown in step 2107. In one or more implementations, algorithms such as visual cryptography and Shamir secret sharing are utilized by the user device 2300 to generate larger number of shares. In one non-limiting configuration, the user device 2300 is configured by an encrypted share storage module 2307 that causes one or more local memory devices of the user device 2300 to store the encrypted share for later retrieval.

Continuing with FIG. 23, the user device 2300 is further configured by a key generation module 2309 to generate a public and private key. Here, as shown in step 2109 of FIG. 24, the user device associates the public key with at least one share of the IBV. The public key and the encrypted share associated with the public key are transmitted, from the user device 2300, to the issuing server 2600A, as shown in step 2111.

While those possessing an ordinary level of skill in the relevant art will appreciate that at least one additional encrypted share of the IBV could be stored in one of an RDBMS or persistence cluster (e.g., Apache SOLR) backend, the issuing server 2600A instead sends the encrypted share and the public key to the BOPS server 102 along with the issuer signature data, as in step 2013. Here, the issuer signature data can be any hash, code, cryptographic value or data set that identifies that the issuer server 2600A was the source of the encrypted share and public key. For instance, the issuer signature data itself can be a public key or a public key/private key pair where the issuer is the holder of the private key.

As detailed previously, the BOPS server 102 generates a DID document 2204 using both the issuer data, as well as the encrypted share and public enrollment encryption key. For example, the BOPS server 102 is configured by a DID generation module 2401 to generate the DID document 2204 using the issuer signature, the enrollment public key and/or the encrypted share as shown in step 2115. Likewise, the DID generation module 2401 is further configured to generate the DID identifier 2202 for use with the DID Document 2204. For instance, the contents and location of the DID Document are used to generate a unique DID identifier 2202 value. Such a value can represent a hash or some or all of the contents of the DID Document 2204, as well as the particular storage location, file reference, index number or other data needed to identify or retrieve the underlying DID Document 2204.

As shown with respect to step 2117, the BOPS server 102 is configured by DID storage module 2403 to store the DID Document to the identity hub 2208. For example, the BOPS server 102 is configured by one or more APIs to access a cloud-based storage repository 2208 and store the DID Document 2204 in one or more portable storage formats.

Additionally, the BOPS server 102 is further configured by the DID persistence module 2405 to add the generated DID identifier 2202 to a selected blockchain 2212 for persistence. In this manner, the DID identifier 2202 provides a blockchain agnostic method for resolving DID Documents 2204. The DID persistence module 2405 configures the processor of the BOPS server 102 to generate a transaction block to add to an existing blockchain or distributed ledger. Alternatively, where no such ledger exists, the DID persistence module causes the generation of a distributed ledger and adds a new transaction to the ledger. Those possessing ordinary levels of skill in the requisite art appreciate that additional functions, such as transaction block hashing are appreciated and understood.

In one arrangement, after the BOPS server 102 has registered the associated DID on a blockchain 2212, as in step 2117, the mobile device 2300 is notified of success (or failure) of user's enrollment. As shown in step 2119, upon successful enrollment of the user with a service provider, the user will receive the DID Identifier 2202 that corresponds to the user's DID Document 2204.

Turning to a further implementation of the user enrollment system described, FIG. 25 details exchanges of data and prompts between a user 2200 and the enrollment service provider 2600. For example, a user 2200 uses a mobile app client 2300 to begin the enrollment process. The mobile app client 2300 requests a IBV from the user 2200. For example, the mobile app client 2300 causes one or more imaging devices of a mobile computing platform to acquire one or more images of the user 2200 enrolling with the service provider. As further shown in FIG. 25, the biometric vectors can be converted into cryptographic shares. As shown in the implementation of FIG. 25, the biometric shares are converted using the mobile client application 2300. Of the shares generated from the IBV, one of the shares is stored locally on the mobile application. Additionally, where the mobile client app 2300 provides a public/private enrollment key pair, the private key is used to encrypt the cryptographic share not stored locally on the mobile client.

The encrypted share and the public key of the enrollment key pair are sent to the service provider 2600 for enrollment. From here, as shown with respect to the implementation of FIG. 25, the service provider 2600 provides an issuer signature (such as a public key from the service provider 2600). The issuer signature, enrollment public key and the encrypted share are passed to a BOPS server 102. The BOPS server 102 functions as a holder for the user seeking enrollment. The BOPS server 102 generates the DID Document 2204 using the issuer signature, the encrypted share and the public key. Once generated, the DID Document 2204 serves as the basis for generating a DID identifier 2202 that is appended to a specified and compliant blockchain 2212. Once the DID identifier 2202 is generated and the corresponding DID Document is stored to the blockchain, the DID identifier 2202 is passed back to the mobile client application 2300 such that the user retains possession of half of the encrypted IBV share and a copy of the DID identifier 2202.

Figure 24:
FIG. 24 is a flow diagram that illustrates one example of a user initiating an authentication session from a client device, which stores information for authentication purpose.

It will be appreciated that while it is possible to store multifaceted data on the blockchain, including biometric shares, the presently described approaches do not store any personally identifiable information to the distributed ledger or blockchain 2212. The biometric shares included in DID Documents 2204 are persisted "off-chain" via identity hubs or personal storage providers 2208, and only a reference to those "off-chain" data sets, in the form of the cryptographically lined DID identifier 2202 is placed within the public ledger systems. As such, the encrypted biometric share generated in the enrollment process provided in FIGS. 24-25 are still within an encrypted envelope, but reference to the encrypted share is now available via the blockchain through the associated DID identifier 2202. Thus, DID identifier 2202 can be used as a as part of an authentication claim utilizing the same BOPS server 102 (as shown in FIG. 23) or different BOPS server in connection with a verifier. Here, such verification is possible because any change in the stored DID Document 2204 will become apparent when the transaction records of the DID identifier 2202 are accessed from the blockchain 2212.

Figure 26:
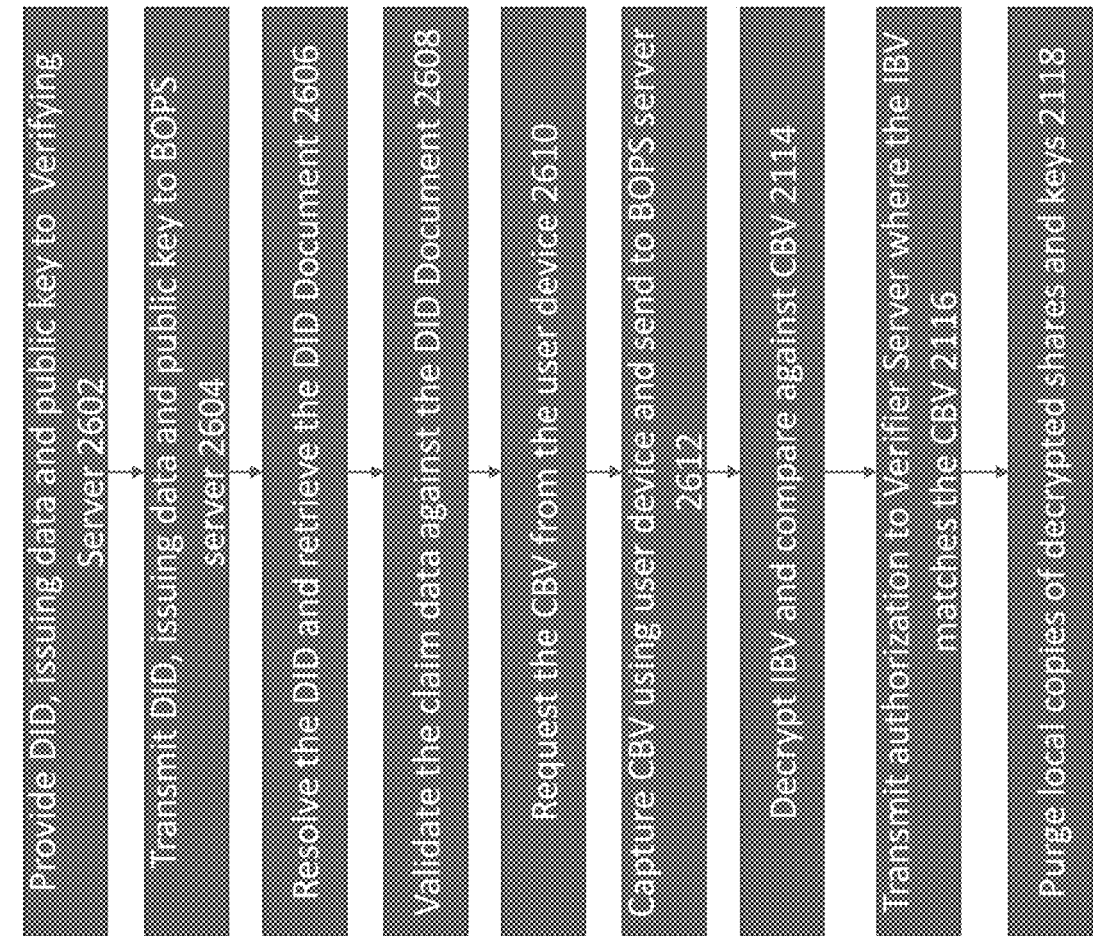
FIG. 26 is a flow diagram that illustrates one example of a user gaining access to a resource using an authentication verifier
Figure 27A:
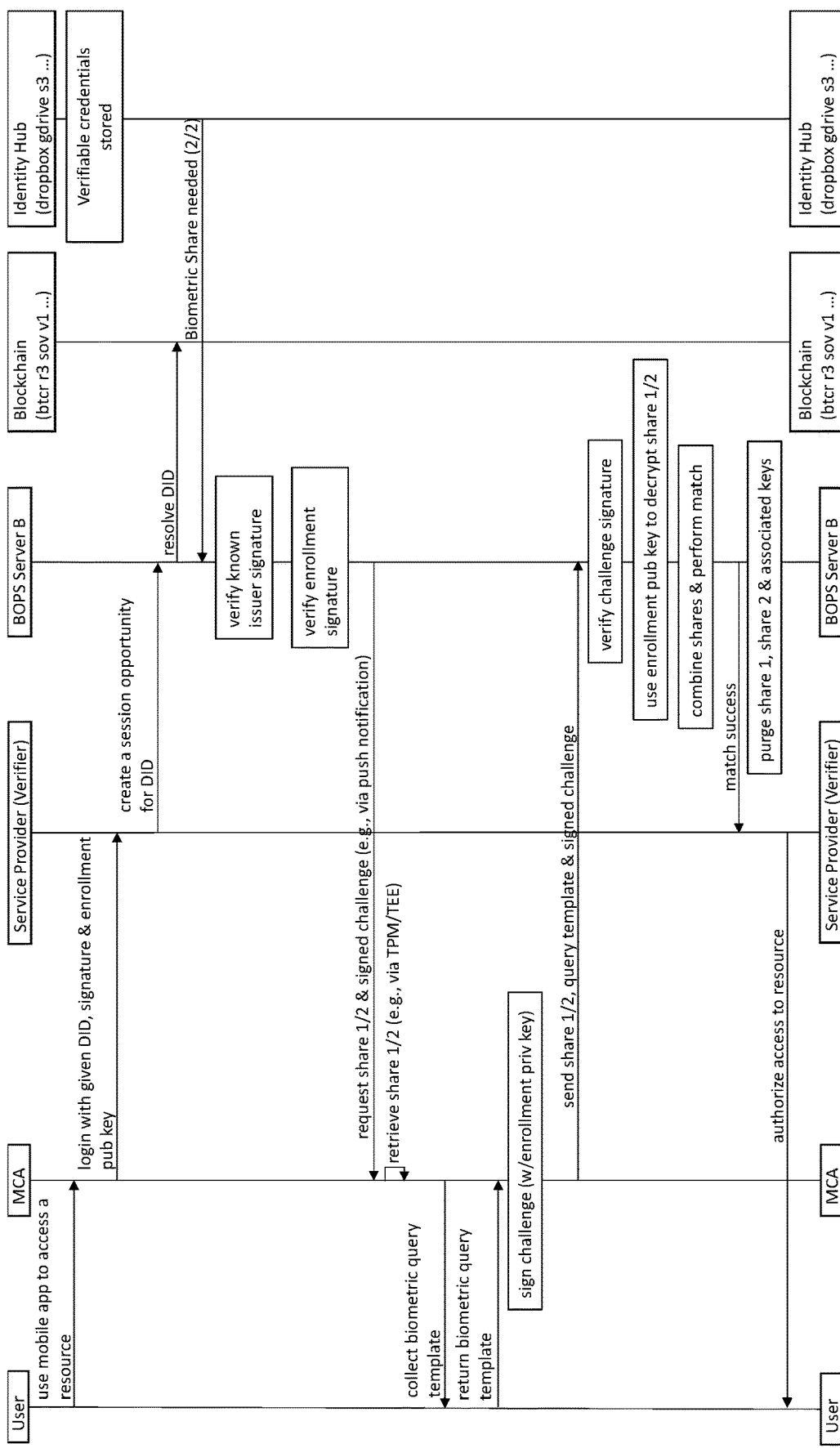
FIG. 27A is a simplified diagram that demonstrates steps associated with verifying a user identity with an identity verifier.
Figure 27B:
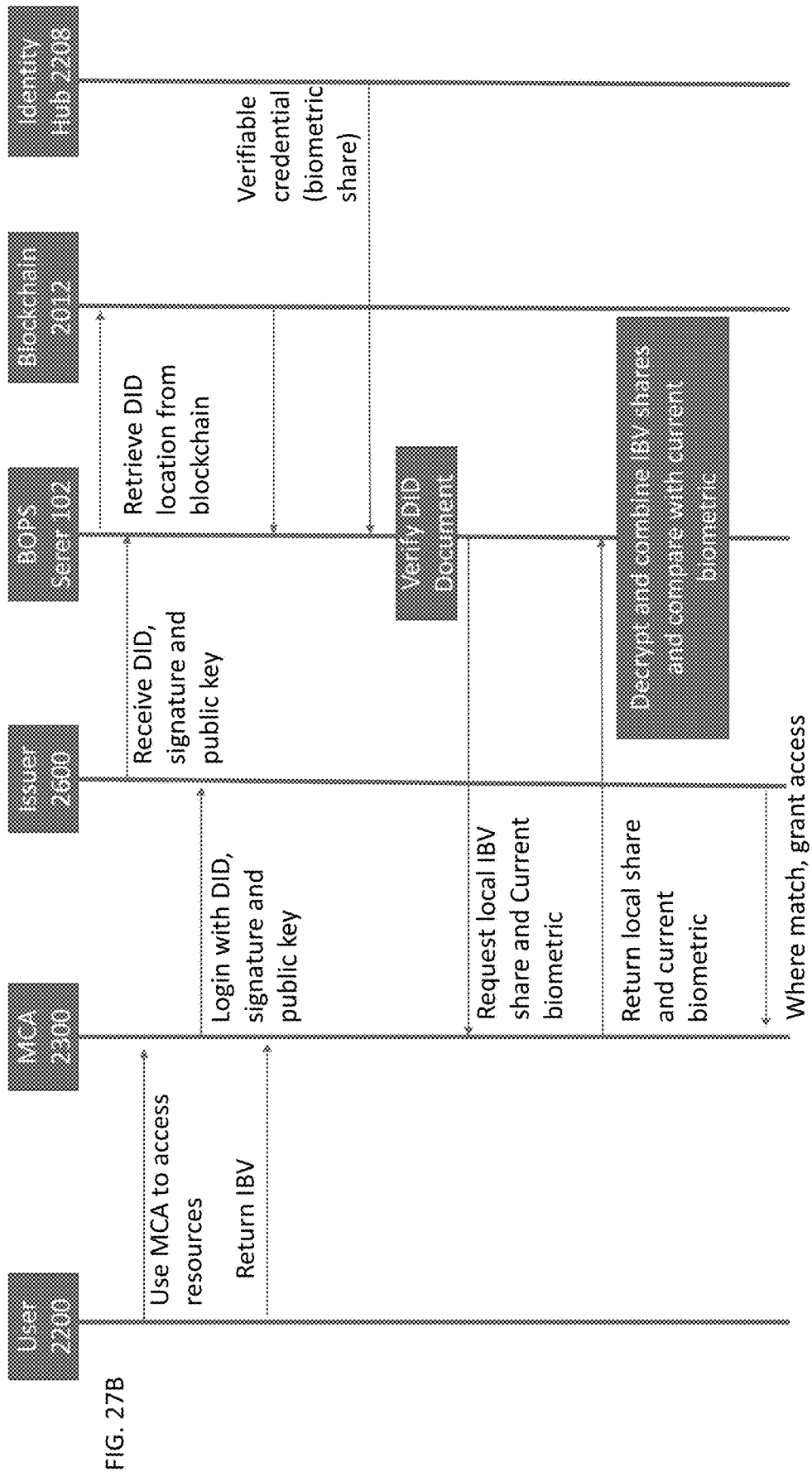
FIG. 27B is a variation of the simplified diagram of FIG. 27A, that demonstrates steps associated with verifying a user identity with an identity verifier.

Turning to FIGS. 26, 27A and 27B, once a holder has associated a DID Document 2204 and DID identifier 2202 with their personal identity and provided the user with the DID identifier 2202, such information can used to gain access to protected resources that are controlled by a verifier server 2600B.

In a particular implementation, the BOPS server 102 provides the interface between the user's data store 2208 and the verifying server 2600B. However, in a further configuration, a different BOPS server having the same or similar functionality is provided, such that the enrollment functions carried out by issuing server 2600A according to FIG. 23 and FIG. 24 are carried out by a different server than the functions carried out by verifying server 2600B.

In a non-limiting example shown in FIG. 26, the user 2200 seeks access to a resource (e.g. content or data) on a web site (e.g., the service provider) using a mobile client application (MCA) 2300. In this configuration, the user 2200 has already set up and enrolled using the BOPS mediated enrollment platform as provided in FIG. 24-25. Here, the user's particular DID identifier 2202 was created and persisted to the blockchain by the holder/issuer (as in FIG. 23-25) and a public key created at enrollment (as in step 2109) is stored in the DID document 2204.

As part of the user's request, the user sends to the service provider (verifier) the DID identifier 2202, and the public key created in step 2109. In additional implementations, the user request also includes the issuer signature. The service provider (verifier) 2600 passes this data to the BOPS server 102 along with a request to resolve the DID Identifier 2202 via a blockchain and fetch the corresponding DID Document 2204. For instance, the BOPS server 102 receives the DID identifier 2202, issuing data and public key from the verifying server 2600B.

Much like URIs uniquely characterize web resources via URNs and URLs, DID identifier 2202 characterize the associated DID Document 2204 using one or more blockchain ecosystems. Here, the BOPS server 102 acts as a resolver for given a DID identifier 2202 that enables the holder (BOPS server 102) to locate the corresponding DID Document 2204. For example, the BOPS server 102 is configured by a DID resolution module 2407 to look up the received DID in one or more blockchains and use the stored transaction information to identify the relevant verifiable credential from the "off-chain" storage as in step 2606.

As noted, in one or more configurations, the DID identifier 2202 and its corresponding DID Document 2204 are cryptographically associated with each other. As such, any change in the DID Document 2204 will cause the DID identifier 2202 to no longer cryptographically match the DID Document 2204. Using this relationship, the BOPS server 102 is configured to evaluate (e.g. resolve) the DID Document 2204 using the DID identifier 2202 and verify that the DID Document 2204 contents have not been changed since the issuance of the DID identifier 2202 using the claim validation module 2409. For example, a new DID identifier 2202 is generated for the retrieved DID Document 2204. Where the DID identifier 2202 received from the user does not match the newly generated DID identifier, the authentication process is terminated.

Once the BOPS server 102 has accessed the DID Document 2204, the DID Document 2204 itself is further evaluated to determine if the data values contained therein match the claim sent by the verifying server 2600B. For instance, the BOPS server 102 is configured by the claim validation module 2409 to compare the issuer signature stored in the DID Document 2204 with the issuer signature sent from the user device 2300 by way of the verifying server 2600. In a further configuration, the claim validation module 2409 also configures the BOPS server 102 to compare the public key contained within the DID Document 2204 against the public key provided in the access request sent by user device 2300. Where the data cannot be validated against the DID Document 2204 data, then the process halts and no authorization is granted.

Alternatively, where the DID document 2204 is a valid claim, for example because the DID identifier 2202 and the DID Document can be cryptographically matched and the contents of the DID Document 2204 match the issuer and encryption signatures sent by the user device 2300, the BOPS server 102 is configured by a verification module 2411 to determine if the user can be authenticated.

For example, the BOPS server 102 is configured by the verification module 2411 to request from the user device 2300 a biometric data set to compare against the stored encrypted shares provided in the DID document. For example, the BOPS server sends a request to the user device 2300 for the user's candidate biometric vector (CBV), as in step 2610. Here, the CBV is a biometric vector that is of the same type of biometric identifier used to generate the IBV (as in step 2103). For instance, where the IBV includes facial recognition data and voice recognition data, the CBV requested from the user will also include both facial recognition and voice recognition data. The user device 2300, configured by a CVB request module 2704 captures the CBV from the access requesting user 2200 and transmits the CVB and the locally stored encrypted share directly to the BOPS server 102.

Upon receiving the locally stored encrypted share and CBV from the user 2200, the BOPS server 102 is configured by a decryption module 2413 to decrypt the received cryptographic share and encrypted share stored in the DID Document 2204, as in step 2114. In a further implementation, the decrypted shares are combined to regenerate the original IBV. Here, the IBV is compared to the CBV. For example, the BOPS server 102 is configured by a comparison module 2415 to compare the pixel, vector or other data of the IBV against the same data of the CBV.

As shown in step 2116, where values of the CBV matches the IBV (or is within a pre-determined threshold of the IBV), a match is determined, and an access verification notification is sent to the verifying server 2600B.

Upon receipt by the verifying server 2600B, the verifying server 2600B permits the user device 2300 to access the resources provided by the service provider (service provider). Once the user 2200 has been verified, the decrypted shares, IBV, CBV and public keys are purged from the memory of the BOPS server 102.

As shown in FIGS. 27A-B, a particular configuration of the resource access system is described. Here, the user 2200 uses the MCA 2300 to access a resource (e.g. banking information, social media account etc.) from the service provider 2600. To request access, the MCA (operating on behalf of the user 2200) sends the user's enrollment public key, the DID identifier 2202 and the issuer signature. Here the issuer signature is, in one implementation, a public key obtained from the issuer 2600 during the enrollment process provided in FIGS. 24 and 25. Upon receipt of these user credentials, the service provider creates a session with the BOPS server 102 that functions as the holder for the user 2200.

Here, the BOPS server 102 uses the DID identifier 2202 to resolve the location of the DID Document 2204. In one further implementation, the BOPS server 102 first verifies the validity of the DID identifier by evaluating the transaction record on the blockchain. As shown in FIGS. 27A and 27B, upon resolution of the location of the DID document 2204, the DID Document 2204 is accessed and returned to the BOPS server 102. Likewise, the verified credential stored in the identity hub 2208 is accessed and returned to the BOPS server 102. In one or more configurations, the verified credential is encrypted share (2/2) of the user's enrolment identity. The issuer signature stored in the DID document 2204 is evaluated and verified. Additionally, the user's supplied public key is compared and verified against the public key stored in the DID Document 2204.

Continuing with the configuration provided in FIGS. 27A-B, the BOPS server 102 sends a request to the MCA 2300 for the local copy of the encrypted IBV share and a signed challenge. Here, the signed challenge can be for a current biometric vector. For instance, once the MCA 2300 receives the request from the BOPS server 102, the MCA prompts the user to obtain a biometric identifier and encrypt the biometric identifier with the private key of the enrollment key pair. The encrypted biometric identifier, the encrypted share and the signed challenge As further shown in FIGS. 27A-B, the signed challenge is verified by the BOPS server 102 and the encrypted share received from the MCA is decrypted using the enrollment public key. Once decrypted, the IBV shares are decrypted and combined to reform the IBV. The reformed IBV is compared to the current biometric identifier. Where there is a match, such that the current user and the enrolled user are the same, access is provided to the user to the resource.

Figure 28:
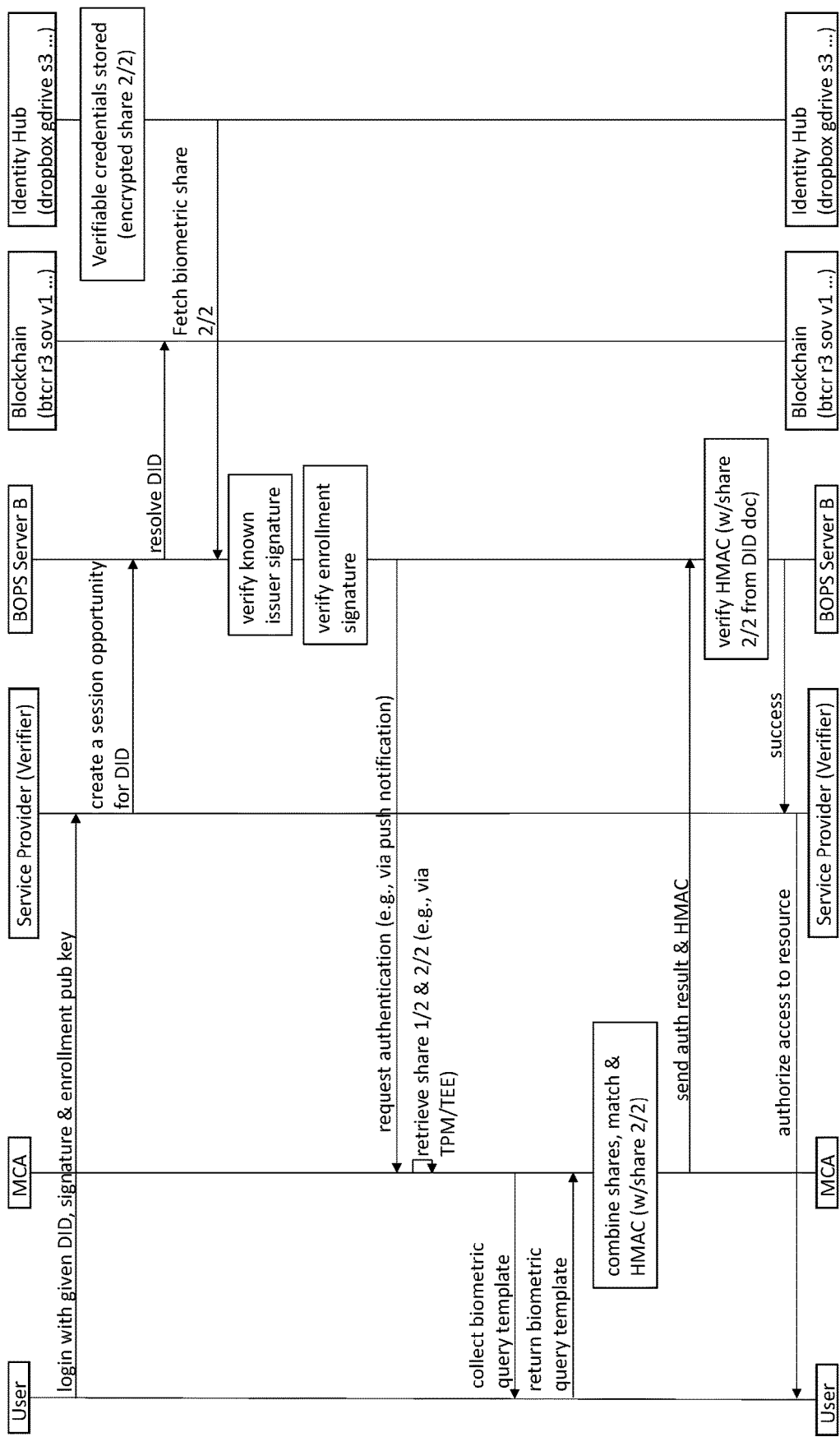
FIG. 28 is an alternative simplified diagram that demonstrates steps associated with verifying a user identity with an identity verifier.

Turning to FIG. 28, in one or more configurations, the user is remotely authenticated. Here, a new service provider (e.g. acting as a verifier), uses one or more BOPS servers 102 configured to with a remote authentication module 2417, to authenticate a user 2200 even though this user has never registered with the new service provider. In this configuration, the BOPS server acts as a holder. As shown with respect to the work-flow of FIG. 28, authentication can be effectively carried out using only the user 2200 and verifying server 2600. This configuration is in contrast with, and an improvement upon, other "first instance" authentications, such as SAML or OAuth, that rely on 3rd party identity providers (IdPs) to broker identity claims in traditional single sign-on (SSO) systems. Here, the configuration of elements provided supports the user having control over the authentication data through the use of blockchain technology to secure credentials issued by one or more valid authorities (i.e., issuers) for later use with a new service provider.

In one or more further configurations, the user (e.g. user 2200) can locally authenticate the users' identity when requesting access to a protected resource that the user has not previously enrolled with. For example, the holder can access issued claims like the encrypted biometric shares on behalf of the user during authentication but require biometric authentication to be conducted locally. As shown, the local configuration mode of BOPS server 102 permits the combination of biometric shares to occur on the mobile device 2300. As shown in particular detail with regards to FIG. 28, the portion of the biometric share stored in or with the DID Document 2204 is retrieved by resolving the DID identification 2202 referencing from the corresponding DID document 2204. However, unlike the work-flow of FIG. 24, here the accessed biometric share is transmitted to the client by the service provider and the corresponding BOPS server 102. In one particular implementation, the biometric share sent to the user, via the service provider and BOPS server, is opaque to the service provider and BOPS server. However, the server is provided with sufficient information to know that the corresponding share (of the biometric share sent from the DID Document 2204) on the mobile device is used for matching due to the HMAC of the encrypted second share. It should be appreciated that the enrolled share is never sent to the device, but both shares are kept locally as per BOPS local configuration mode. The mobile device must hold the private key associated with the enrolled share for the DID because it computes an HMAC using the share and sends it to the server. The server can compare the HMAC key with the opaque encrypted share from the DID document and provide access to the protected resources.

Figure 29:
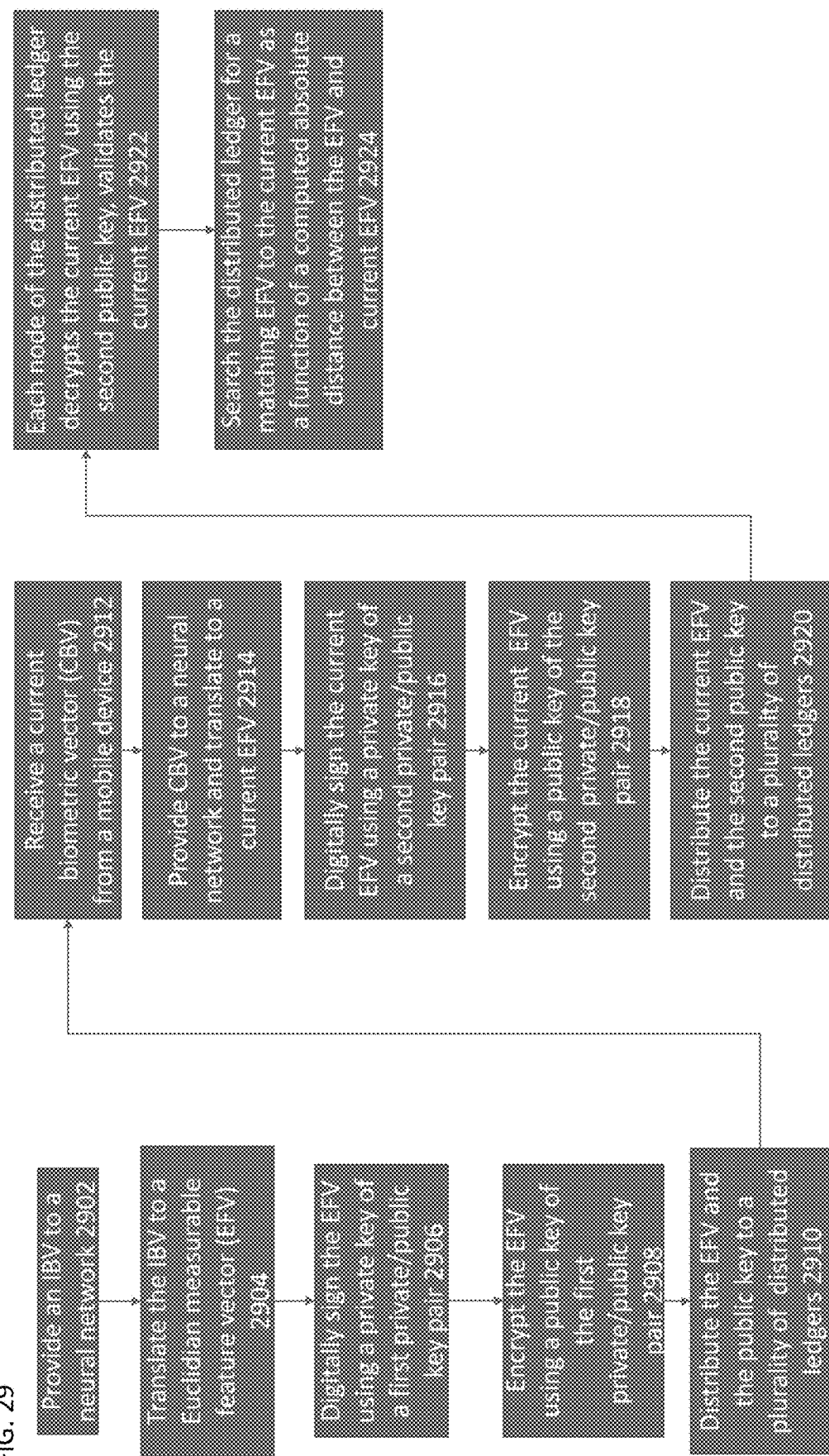
FIG. 29 is a flow diagram that demonstrates steps associated with one implementation of the verifying user identity with an identity verifier system described herein.

In a further implementation of the systems, platforms and approaches described herein, a computer implemented method is provided for matching a biometric input record with a biometric record that is stored on a plurality of distributed ledgers. Here, the biometric identifier, or DID Document 2204, is stored directly in the blockchain (as opposed to only a reference though the DID 2202). In one particular implementation as shown in FIG. 29, an initial biometric vector is provided to a neural network as in step

2902. The neural network is configured to translate the initial biometric vector to a Euclidian measurable feature vector as in step 2904. Moving to step 2906, the Euclidian measurable feature vector is digitally signed using a private key of a first public key/private key pair. The signed Euclidian measurable feature vector is encrypted using a public key of the first public key/private key pair as in step 2908

In a further arrangement, the encrypted Euclidian measurable feature vector is distributed, by way of the BOPS server 102, among a plurality of ledgers (for example, one or more identified blockchains) as shown with respect to step 2910. Here, the Euclidian measurable feature vector is stored on respective nodes of the blockchain 2212 with at least the public key of the first public key/private key pair.

Each node of the respective distributed ledger (blockchain) decrypts the Euclidian measurable feature vector using the public key of the first public key/private key pair and validates the Euclidian measurable feature vector. Additionally, each node is further configured to append the Euclidian measurable feature vector to the nodes respective ledger 2212.

The described method further includes receiving, from a mobile computing device 2300 over a data communication network, a current biometric vector representing the encrypted biometric input record as shown in step 2912. The received current biometric vector is provided, as shown in step 2914, to the neural network, wherein the neural network translates the current biometric vector to a current Euclidian measurable feature vector.

In one configuration, the current Euclidian measurable feature vector is signed as in step 2916 and encrypted as in step 2918 using a private key of a second public key/private key pair. The signed and encrypted current Euclidian measurable feature vector is distributed among the plurality of ledgers 2212 stored on respective nodes along with the public key of the second public key/private key pair as in step 2920.

As further detailed, each of the respective nodes of the plurality of distributed ledgers is configured to decrypt the current Euclidian measurable feature vector using the public key of the second public key/private key pair and validate the current Euclidian measurable feature vector as in step 2922. Furthermore, each respective node is further configured to conduct a search of at least some of the stored Euclidian measurable feature vectors in the ledger using the current Euclidian measurable feature vector. For example, as shown in step 2924, the biometric input record is matched with at least one biometric record as a function of an absolute distance computed between the current Euclidian measurable feature vector and a calculation of each of the respective Euclidian measurable feature vectors in the portion of the ledger.

As used herein, "processor" or "computer" refers one or more electronic devices (e.g. semiconductor-based microcontrollers) configured with code in the form of software, to execute a given instruction set. For example, the evaluation server 102, database(s) 108 and remote access devices 104, include one or more processing or computing elements executing commercially available or custom operating system, e.g., MICROSOFT WINDOWS, APPLE OSX, UNIX or Linux based operating system implementations. In other implementations, evaluation server 102, database(s) 108 and remote access devices 104 each include custom or non-standard hardware, firmware or software configurations. For instance, the processor or computer can include one or more of a collection of micro-computing elements, computer-on-chip, field programmable gate arrays, graphical processing units, home entertainment consoles, media players, set-top boxes, prototyping devices or "hobby" computing elements. Such computing elements described are connected, directly or indirectly, to one or more memory storage devices (memories) to form a microcontroller structure. The memory is a persistent or non-persistent storage device that is operative to store an operating system for the processor in addition to one or more of software modules. In accordance with one or more embodiments, the memory comprises one or more volatile and non-volatile memories, such as Read Only Memory ("ROM"), Random Access Memory ("RAM"), Electrically Erasable Programmable Read-Only Memory ("EEPROM"), Phase Change Memory ("PCM"), Single In-line Memory ("SIMM"), Dual In-line Memory ("DIMM") or other memory types. Such memories can be fixed or removable, as is known to those of ordinary skill in the art, such as through the use of removable media cards or modules. object-oriented database, a hybrid relational-object database, a key-value data store such as HADOOP or MONGODB, in addition to other systems for the structure and retrieval of data that are well known to those of skill in the art. The database 108 includes the necessary hardware and software to enable a processor local to the content evaluation server 102 to retrieve and store data within the database 108.

The computer memories may also comprise secondary computer memory, such as magnetic or optical disk drives or flash memory, that provide long term storage of data in a manner similar to the persistent memory device. In one or more embodiments, the memory of the processors provides for storage of application programs and data files when needed.

The processors or computers described are configured to execute code written in a standard, custom, proprietary or modified programming language such as a standard set, subset, superset or extended set of JavaScript, PHP, Ruby, Scala, Erlang, C, C++, Objective C, Swift, C #, Java, Assembly, Go, Python, Perl, R, Visual Basic, Lisp, Tensor-Flow for ML, mClust, or Julia or any other object oriented, functional or other paradigm based programming language.

In one particular implementation, the processor computers are implemented as one or more of a server, computing cluster, cloud platform or computing array, configured to directly, or through a communication linkage, communicate and exchange data with the one or more remote access device, such as mobile phone, tablet computers, workstations, desktop computer or other computing elements.

As provided in the illustrated implementations, the computers and processors are configured by code executing therein to accept electronic data queried from one of more remote data storage locations (e.g. databases) and evaluate the queried or accessed data according to pre-determined or dynamic rules, logic, instructions or algorithms. The physical structure of the database(s) may be embodied as solid-state memory (e.g., ROM), hard disk drive systems, RAID, disk arrays, storage area networks ("SAN"), network attached storage ("NAS") and/or any other suitable system for storing computer data. In addition, the database may comprise caches, including database caches and/or web caches. Programmatically, the database may comprise flat-file data store, a relational database, an object-oriented database, a hybrid relational-object database, a key-value data store such as HADOOP or MONGODB, in addition to other systems for the structure and retrieval of data that are well known to those of skill in the art. The database includes the necessary hardware and software to enable a processor local to the such servers to retrieve and store data within the database or database.

As used herein, remote access devices are used to exchange data, such as electronic messages, data packages, streams or files, over a network to the one or more local or remote computer or processors (e.g. server). In one implementation, the remote access device(s) connects to the servers directly, such through an internal local network. Alternatively, remote access devices are configured with suitable software and hardware to connect to the servers by first connecting to the Internet. As used herein, the remote access device is a general or single purpose computing device configured by hardware or software modules to connect to a network and receive data. For example, the remote access device can be a personal communication device (smartphone, tablet computer, etc.), configured by one or more code modules to exchange data with the content one or more computers or processors. Remote access devices are configured utilize wired or wireless communication means, such as, but not limited to CDMA, GSM, Ethernet, Wi-Fi, Bluetooth, USB, serial communication protocols and hardware to connect to one or more access points, exchanges, network nodes or network routers. In a particular configuration, the remote access devices are also configured, through hardware and software modules, to connect to more remote servers, computers, peripherals or other hardware using standard or custom communication protocols and settings (e.g., TCP/IP, etc.) either through a local or remote network or through the Internet In one implementation, the remote access devices, processors, and computers execute commercially available or custom operating system, e.g., MICROSOFT WINDOWS, APPLE OSX, UNIX or Linux based operating system implementations. In other implementations, remote access devices, processors, and computers are custom or non-standard hardware, firmware or software configurations. The remote access devices, processors, and computers can communicate with the one or more remote networks using USB, digital input/output pins, eSATA, parallel ports, serial ports, FIREWIRE, Wi-Fi, Bluetooth, or other communication interfaces.

While this specification contains many specific implementations and details, these should not be construed as limitations on the scope of any configuration, arrangement, implementation or embodiment or of what can be claimed, but rather as descriptions of features that can be specific to particular implementations or one or more particular embodiments. Certain features that are described in this specification in the context of separate implementations can also be implemented in combination in a single configuration or arrangement. Conversely, various features that are described in the context of a single implementations can also be implemented in multiple configurations or arrangements separately or in any suitable sub-combination. Moreover, although features can be described above as acting in certain combinations and even initially claimed as such, one or more features from a claimed combination can in some cases be excised from the combination, and the claimed combination can be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the embodiments described above should not be understood as requiring such separation in all embodiments, and it should be understood that the described program components and systems can generally be integrated together in a single software product or packaged into multiple software products.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

It should be noted that use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain embodiments, multitasking and parallel processing can be advantageous.

Publications and references to known registered marks representing various systems are cited throughout this application, the disclosures of which are incorporated herein by reference. Citation of any above publications or documents is not intended as an admission that any of the foregoing is pertinent prior art, nor does it constitute any admission as to the contents or date of these publications or documents. All references cited herein, including issued and pending patents and patent applications, are incorporated by reference to the same extent as if each individual publication and references were specifically and individually indicated to be incorporated by reference.

While the invention has been particularly shown and described with reference to a preferred embodiment thereof, it will be understood by those skilled in the art that various changes in form and details may be made therein without departing from the spirit and scope of the invention. As such, the invention is not defined by the discussion that appears above, but rather is defined by the points that follow, the respective features recited in those points, and by equivalents of such features.

What is claimed is:

1. A computer implemented method for registering an identity with an authentication system, the method comprising:
   receiving, from a mobile computing device over a data communication network, at least one encrypted cryptographic share of an initial biometric vector (IBV) and a public key of a first public key/private key pair generated mathematically using a seed, the at least one encrypted cryptographic share having been encrypted using a private key of the first public key/private key pair;
   generating a first identity data set that includes at least an authorization system signature, the public key of the first public key/private key pair and the at least one encrypted cryptographic share;
   storing the first identity data set in at least one remote storage location;
   generating an identity reference value associated with the first identity data set, where the identity reference value resolves to the at least one remote storage location where the first identity data set is stored;
   cryptographically associating the identity reference value with the generated first identity data set;
   distributing, among each of a plurality of ledgers stored on respective nodes, a transaction record that includes at least the identity reference value;
   providing, to the mobile computing device, at least the identity reference value.

2. The method of claim 1, wherein the received encrypted share of the IBV is generated by providing the initial biometric vector to a neural network, wherein the neural network translates the initial biometric vector to a Euclidian measurable feature vector and encrypting the Euclidian measurable feature vector using the private key of the first public key/private key pair.

3. The method of claim 1 where the IBV is visually encrypted using Shamir Secret Sharing Schema algorithm.

4. A system for providing a user with access to a resource provider, the system comprising:
   a processor having a memory and configured by one or more modules to:
   receive, from a mobile computing device over a data communication network, at least:
     an identity reference value associated with a first identity data set, where the identity reference value resolves the storage location of the first identity data set and is cryptographically associated with the first identity data set, the first identity data set including at least an authorization system specific data value, a public key of an enrollment public key/private key pair generated mathematically using a seed and at least one remote encrypted cryptographic share of an initial biometric vector of a user requesting access;
     an authorization system signature value;
     the public key of the enrollment public/private key pair;
   locate, among a plurality of ledgers stored on respective nodes, a transaction record that includes at least the identity reference value,
   determine, from the located transaction record, a storage location of a corresponding first identity data set;
   access the cryptographically associated first identity data set;
   verify the authorization system signature value and enrollment public key of the first identity data set;
   receive, from the mobile computing device, a current biometric vector and a local encrypted biometric cryptographic share;
   decrypt the received local encrypted cryptographic share and remote encrypted cryptographic share using the public key of the enrollment public key/private key pair;
   combine the decrypted local cryptographic share and the decrypted stored cryptographic share to form a combined cryptographic vector;
   compare the combined cryptographic vector with the current biometric vector; and
   where the combined cryptographic vector matches the current biometric vector, causing the resource provider to provide the user with access to the resource.

5. The system of claim 4, wherein comparing the combined cryptographic vector with the current biometric vector includes,
   providing a combined cryptographic vector and the current biometric vector to a neural network, wherein the neural network translates the combined cryptographic vector and the current biometric vector to respective Euclidian measurable feature vectors.

6. The system of claim 5, wherein the combined cryptographic vector is matched with the current biometric vector as a function of an absolute distance computed between the respective Euclidian measurable feature vectors of the combined cryptographic vector and a calculation of each of the respective Euclidian measurable feature vectors of the current biometric vector.

7. The system of claim 5, wherein the processor is further configured to:
   classify the Euclidian measurable feature vector; and/or
   classify the current Euclidian measurable feature vector, wherein the classifying is performed at least in part using one or more distance functions.

8. The system of claim 7, wherein the classifying the Euclidian measurable feature and/or the current Euclidian measurable feature vector returns floating point values, and a Frobenius algorithm is utilized to compute an absolute distance between each floating point and its average.

9. The system of claim 7, wherein the search is conducted in Order log(n) time.

10. The system of claim 7, wherein the processor is further configured to:
    using a Frobenius algorithm to classify the Euclidian measurable biometric vectors;
    traverse a hierarchy of the classified Euclidian measurable biometric vectors in Order log(n) time; and
    identify that a respective Euclidian measurable biometric vector is the current Euclidian measurable feature vector.

11. The system of claim 5, wherein the processor is further configured to:
    identify, for each respective Euclidian measurable biometric vector, a plurality of floating point values; and
    use a bitmap to eliminate from an absolute distances calculation any of the plurality of values that are not present in every vector.

12. The system of claim 5, wherein the processor is further configured to:
    identify, for each respective Euclidian measurable biometric vector, a plurality of floating point values; and
    define a sliding scale of importance based on the number of vectors a respective one of the floating point value appears.

13. The system of claim 5, wherein the neural network is configured with a variety of convolutional layers, together with a rectifier (ReLU) and pooling nodes.

14. The system of claim 5, wherein the neural network is configured to use pooling as a form of non-linear down-sampling, and further wherein one or more pooling nodes progressively reduce the spatial size of a represented Euclidean-measurable feature vector to reduce the amount of parameters and computation in the neural network.

15. The method of claim 14, wherein the processor is further configured to:

compute, for each of a plurality of stored Euclidian measurable feature vectors, a relative position difference between an average face vector and the respective Euclidian measurable feature vector;

square the relative position difference;

sum the values; and calculate the square root.

16. The system of claim 5, wherein performance of the neural network is determined as a function of a cost function, in which a number of layers given as a spatial size of an output volume is computed as a function of an input volume size W, a kernel field size of layer neurons K, a stride with which the layers are applied S, and an amount of zero padding P used on a border.

17. The system of claim 5, wherein the neural network translates the initial biometric vector, the current biometric vector as a function of matrix multiplications for each respective layer and uses a Euclidean distance algorithm based on a Euclidean cost function.

18. A computer implemented method for matching a biometric input record with a biometric record that is stored on a plurality of distributed ledgers, the method comprising:

providing an initial biometric vector to a neural network, wherein the neural network translates the initial biometric vector to a Euclidian measurable feature vector;

digitally signing the Euclidian measurable feature vector using a private key of a first public key/private key pair;

encrypting the Euclidian measurable feature vector using a public key of the first public key/private key pair;

distributing, among the plurality of ledgers stored on respective nodes, at least the encrypted Euclidian measurable feature vector and the public key of the first public key/private key pair, wherein each respective node:

decrypts the Euclidian measurable feature vector using the public key of the first public key/private key pair;

validates the Euclidian measurable feature vector; and appends the Euclidian measurable feature vector to the nodes respective ledger;

receiving, from a mobile computing device over a data communication network, a current biometric vector representing the encrypted biometric input record;

providing the current biometric vector to the neural network, wherein the neural network translates the current biometric vector to a current Euclidian measurable feature vector;

digitally signing the current Euclidian measurable feature vector using a private key of a second public key/private key pair;

encrypting the current Euclidian measurable feature vector using a public key of the second public key/private key pair;

distributing, among the plurality of ledgers stored on respective nodes, at least the current Euclidian measurable feature vector and the public key of the second public key/private key pair, wherein each respective node:

decrypts the current Euclidian measurable feature vector using the public key of the second public key/private key pair;

validates the current Euclidian measurable feature vector; and conducts a search of at least some of the stored Euclidian measurable feature vectors in the ledger using the current Euclidian measurable feature vector, wherein the biometric input record is matched with at least one biometric record as a function of an absolute distance computed between the current Euclidian measurable feature vector and a calculation of each of the respective Euclidian measurable feature vectors in the portion of the ledger.

19. The method of claim 18, wherein the Euclidian measurable feature vector is validated as a function of decrypting the Euclidian measurable feature vector using the private key of the first public key/private key pair, and verifying no alteration of the Euclidian measurable feature vector occurred by comparing the Euclidian measurable feature vector at each node with the decrypted Euclidian measurable feature vector.

20. The method of claim 18, wherein signing the Euclidian measurable feature vector comprises:

generating a hash value associated with the Euclidian measurable feature vector; and encrypting the hash value using the private key of the first public key/private key pair, wherein the hash value is decrypted by each respective node using the public key of the first public key/private key pair and compared with the hash value that is decrypted using the private key of the first public key/private key pair.

* * * * *